US010078517B2

(12) United States Patent
Pechanek

(10) Patent No.: US 10,078,517 B2
(45) Date of Patent: Sep. 18, 2018

(54) METHODS AND APPARATUS FOR SIGNAL FLOW GRAPH PIPELINING IN AN ARRAY PROCESSING UNIT THAT REDUCES STORAGE OF TEMPORARY VARIABLES

(71) Applicant: Gerald George Pechanek, Cary, NC (US)

(72) Inventor: Gerald George Pechanek, Cary, NC (US)

(*) Notice: Subject to any disclaimer, the term of this patent is extended or adjusted under 35 U.S.C. 154(b) by 11 days.

(21) Appl. No.: 15/238,429

(22) Filed: Aug. 16, 2016

(65) Prior Publication Data
US 2016/0357569 A1 Dec. 8, 2016

Related U.S. Application Data

(63) Continuation of application No. 14/450,222, filed on Aug. 2, 2014, now Pat. No. 9,507,603.

(60) Provisional application No. 61/905,265, filed on Nov. 17, 2013, provisional application No. 61/862,075, filed on Aug. 4, 2013.

(51) Int. Cl.
*G06F 9/30* (2018.01)
*G06F 9/38* (2018.01)
*G06F 15/173* (2006.01)

(52) U.S. Cl.
CPC ........ *G06F 9/3838* (2013.01); *G06F 9/30043* (2013.01); *G06F 9/3851* (2013.01); *G06F 9/3895* (2013.01); *G06F 15/17387* (2013.01)

(58) Field of Classification Search
None
See application file for complete search history.

(56) References Cited

U.S. PATENT DOCUMENTS

| 6,167,502 A * | 12/2000 | Pechanek | G06F 15/8023 712/12 |
| 9,507,603 B2 * | 11/2016 | Pechanek | G06F 9/3895 |
| 2006/0050655 A1 * | 3/2006 | Shi | H04B 7/026 370/254 |
| 2009/0066366 A1 * | 3/2009 | Solomon | G06F 15/17387 326/41 |
| 2011/0258245 A1 * | 10/2011 | Blocksome | G06F 15/17318 709/201 |
| 2013/0201994 A1 * | 8/2013 | Beshai | H04L 45/44 370/401 |

(Continued)

*Primary Examiner* — William B Partridge

(57) ABSTRACT

A system for pipelining signal flow graphs by a plurality of shared memory processors organized in a 3D physical arrangement with the memory overlaid on the processor nodes that reduces storage of temporary variables. A group function formed by two or more instructions to specify two or more parts of the group function. A first instruction specifies a first part and specifies control information for a second instruction adjacent to the first instruction or at a pre-specified location relative to the first instruction. The first instruction when executed transfers the control information to a pending register and produces a result which is transferred to an operand input associated with the second instruction. The second instruction specifies a second part of the group function and when executed transfers the control information from the pending register to a second execution unit to adjust the second execution unit's operation on the received operand.

22 Claims, 43 Drawing Sheets
(16 of 43 Drawing Sheet(s) Filed in Color)

(56) References Cited

U.S. PATENT DOCUMENTS

2017/0048320 A1\* 2/2017 Farmahini-Farahani .................... H04L 67/1097

\* cited by examiner

A= Arithmetic logic unit
M=Multiply Accumulate unit
P=Permute unit

4*(9 32-bit INSTRUCTION PACKET) = 4*(HEADER+288-bits)
NEW 9 26-bit INSTRUCTION PACKET = 4*(HEADER+234-bits) A SAVINGS OF 4*54-bits=216-bits)
SAVES 28 REGISER FILE WRITES AND 36 REGISTER FILE READS PER 4-CEP EXECUTION

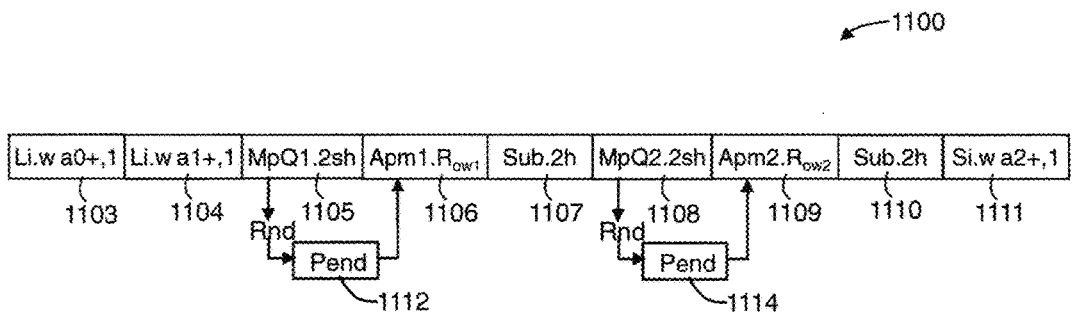

1103. Li.w a0+,1, $M_{g,h}$=0, 1OI2         :load word from $M_{g,h}$=0 to 1st OIPR Inst2=1OI2

1104. Li.w a1+,1, $M_{g,h}$=0, 2OI1         :load word from $M_{g,h}$=0 to 2nd OIPR Inst1=2OI1

1105. MpQ1.2sh, 1OI1,Rnd                    :4 results to 1st,2nd,3rd,& 4th OIPR-I1, Rnd 1106. Apm1.$R_{ow1}$, 2OI1                  :move result to row 1 2nd OIPR-I1

1107. Sub.2h, 1OI1                          :send result to 1st OIPR of I1

1108. MpQ2.2sh, 1O*MLFR0,1OI1,Rnd           :OIPR*T 4 results to 1st,2nd,3rd,& 4th OIPR-I1, Rnd 1109. Apm2.$R_{ow2}$, 2OI1                  :move result to row 2 2nd OIPR of I1

1110. Sub.2h, 1OI1                          :send result to 1st OIPR of I1

1111. Si.w a2+,1, $M_{g,h}$                 :store OIPR word to specified $M_{g,h}$

| Row 3 (Single Cycle Execution Units) | | | | |
|---|---|---|---|---|
| Load | M01 | P02 | A00 | Store |
| Li.a0 ←1202 | | | | |
| Li.a1 | | | | |
| Li.a0 | MpQ1^C&D | ←1204 | | |
| Li.a1 | | Apm1 | | |
| Li.a0 | MpQ1^C&D | | Sub1 ←1206 | |
| Li.a1 | MpQ2 | Apm1 | ←1208 | |
| Li.a0 | MpQ1 | Apm2 | Sub1 | |
| Li.a1 | MpQ2 | Apm1 | Sub2 ←1210 | |
| Li.a0 | MpQ1 | Apm2 | Sub1 | Si.a2 ←1212 |
| Li.a1 | MpQ2 | Apm1 | Sub2 | |
| Li.a0 | MpQ1 | Apm2 | Sub1 | Si.a2 |
| ⋮ | ⋮ | ⋮ | ⋮ | ⋮ |
| | | | | |
| | | | | |
| | | | | |
| | | | | |

1220 Prolog
1222 Body
1224 Epilog

Li=Load indirect, Si=Store indirect, Sub=Subtract
MpQ=MultiplyQuad, Apm=AddPermuteMove

FIG. 12A

| | 1241 EX1 | 1242 EX2 | 1243 EX3 | 1244 EX4 | 1245 EX5 | 1246 EX6 | 1247 EX7 | 1248 EX8 | 1249 EX9 | 1250 EX10 |
|---|---|---|---|---|---|---|---|---|---|---|
| ROW 0 1232 | Li.w a0+,1 | Li.w a1+,1 | MpQ1.2sh | Apm1.R$_{ow2}$ | Add.2h | MNOP | Pmv.R$_{ow1}$ | Add.2h | Si.w a2+,1 | |
| | | | Li.w a0+,1 | Li.w a1+,1 | MpQ1.2sh | Apm1.R$_{ow2}$ | Add.2h | MNOP | Pmv.R$_{ow1}$ | Add.2h |
| | | | | | Li.w a0+,1 | Li.w a1+,1 | MpQ1.2sh | Apm1.R$_{ow2}$ | Add.2h | MNOP |
| | | | | | | | Li.w a0+,1 | Li.w a1+,1 | MpQ1.2sh | Apm1.R$_{ow2}$ |
| | | | | | | | | | Li.w a0+,1 | Li.w a1+,1 |
| ROW 1 1234 | Li.w a0+,1 | Li.w a1+,1 | MpQ1.2sh | Apm1.R$_{ow3}$ | Add.2h | MNOP | Pmv.R$_{ow0}$ | Sub.2h | Si.w a2+,1 | |
| | | | Li.w a0+,1 | Li.w a1+,1 | MpQ1.2sh | Apm1.R$_{ow3}$ | Add.2h | MNOP | Pmv.R$_{ow0}$ | Sub.2h |
| | | | | | Li.w a0+,1 | Li.w a1+,1 | MpQ1.2sh | Apm1.R$_{ow3}$ | Add.2h | MNOP |
| | | | | | | | Li.w a0+,1 | Li.w a1+,1 | MpQ1.2sh | Apm1.R$_{ow3}$ |
| | | | | | | | | | Li.w a0+,1 | Li.w a1+,1 |
| ROW 2 1236 | Li.w a0+,1 | Li.w a1+,1 | MpQ1.2sh | Apm1.R$_{ow0}$ | Sub.2h | MNOP | Pmv.R$_{ow3}$ | Add.2h | Si.w a2+,1 | |
| | | | Li.w a0+,1 | Li.w a1+,1 | MpQ1.2sh | Apm1.R$_{ow0}$ | Sub.2h | MNOP | Pmv.R$_{ow3}$ | Add.2h |
| | | | | | Li.w a0+,1 | Li.w a1+,1 | MpQ1.2sh | Apm1.R$_{ow0}$ | Sub.2h | MNOP |
| | | | | | | | Li.w a0+,1 | Li.w a1+,1 | MpQ1.2sh | Apm1.R$_{ow0}$ |
| | | | | | | | | | Li.w a0+,1 | Li.w a1+,1 |
| ROW 3 1238 | Li.w a0+,1 | Li.w a1+,1 | MpQ1.2sh | Apm1.R$_{ow1}$ | Sub.2h | MpQ2.2sh | Apm2.R$_{ow2}$ | Sub.2h | Si.w a2+,1 | |
| | | | Li.w a0+,1 | Li.w a1+,1 | MpQ1.2sh | Apm1.R$_{ow1}$ | Sub.2h | MpQ2.2sh | Apm2.R$_{ow2}$ | Sub.2h |
| | | | | | Li.w a0+,1 | Li.w a1+,1 | MpQ1.2sh | Apm1.R$_{ow1}$ | Sub.2h | MpQ2.2sh |
| | | | | | | | Li.w a0+,1 | Li.w a1+,1 | MpQ1.2sh | Apm1.R$_{ow1}$ |
| | | | | | | | | | Li.w a0+,1 | Li.w a1+,1 |

FIG. 12B

Row 3 PICM Cycle 1 ~1501  1500

| LOAD | ALU | MPY | PRM | STORE |
|---|---|---|---|---|
|  |  | ... |  |  |
|  |  |  |  |  |
| Li.wa0+,1 |  |  |  |  |

└─ 1511

Row 3 PICM Cycle 2 ~1502

| LOAD | ALU | MPY | PRM | STORE |
|---|---|---|---|---|
|  |  | ... |  |  |
| Li.wa1+,1 |  |  |  |  |
| Li.wa0+,1 |  |  |  |  |

└─1512

Row 3 PICM Cycle 3 ~1503

| LOAD | ALU | MPY | PRM | STORE |
|---|---|---|---|---|
|  |  | ... |  |  |
| Li.wa1+,1 |  |  |  |  |
| Li.wa0+,1 |  | MpQ1.2sh |  |  |

└─1513

Row 3 PICM Cycle 4 ~1504

| LOAD | ALU | MPY | PRM | STORE |
|---|---|---|---|---|
|  |  | ... |  |  |
| Li.wa1+,1 |  |  | Apm1.R$_{ow1}$ |  |
| Li.wa0+,1 |  | MpQ1.2sh |  |  |

└─1514

Row 3 PICM Cycle 5 ~1505

| LOAD | ALU | MPY | PRM | STORE |
|---|---|---|---|---|
|  |  | ... |  |  |
| Li.wa1+,1 |  | Apm1.R$_{ow1}$ |  |  |
| Li.wa0+,1 | Sub.2h | MpQ1.2sh |  |  |

└─1515

Row 3 PICM Cycle 6 ~1506

| LOAD | ALU | MPY | PRM | STORE |
|---|---|---|---|---|
|  |  | ... |  |  |
| Li.wa1+,1 |  | MpQ2.2sh | Apm1.R$_{ow1}$ |  |
| Li.wa0+,1 | Sub.2h | MpQ1.2sh |  |  |

└─1516

Row 3 PICM Cycle 7 ~1507

| LOAD | ALU | MPY | PRM | STORE |
|---|---|---|---|---|
|  |  | ... |  |  |
| Li.wa1+,1 |  | MpQ2.2sh | Apm1.R$_{ow1}$ |  |
| Li.wa0+,1 | Sub.2h | MpQ1.2sh | Apm2.R$_{ow2}$ |  |

└─1517

Row 3 PICM Cycle 8 ~1508

| LOAD | ALU | MPY | PRM | STORE |
|---|---|---|---|---|
|  |  | ... |  |  |
| Li.wa1+,1 | Sub.2h | MpQ2.2sh | Apm1.R$_{ow1}$ |  |
| Li.wa0+,1 | Sub.2h | MpQ1.2sh | Apm2.R$_{ow2}$ |  |

└─1518

Row 3 PICM Cycle 9 ~1509

| LOAD | ALU | MPY | PRM | STORE |
|---|---|---|---|---|
|  |  | ... |  |  |
| Li.wa1+,1 | Sub.2h | MpQ2.2sh | Apm1.R$_{ow1}$ |  |
| Li.wa0+,1 | Sub.2h | MpQ1.2sh | Apm2.R$_{ow2}$ | Si.wa2+,1 |

PIC(K+1) ─1522
PIC(K) ─1521
└─ 1519

Prolog Instruction Code Address (PIC#)

FIG. 15

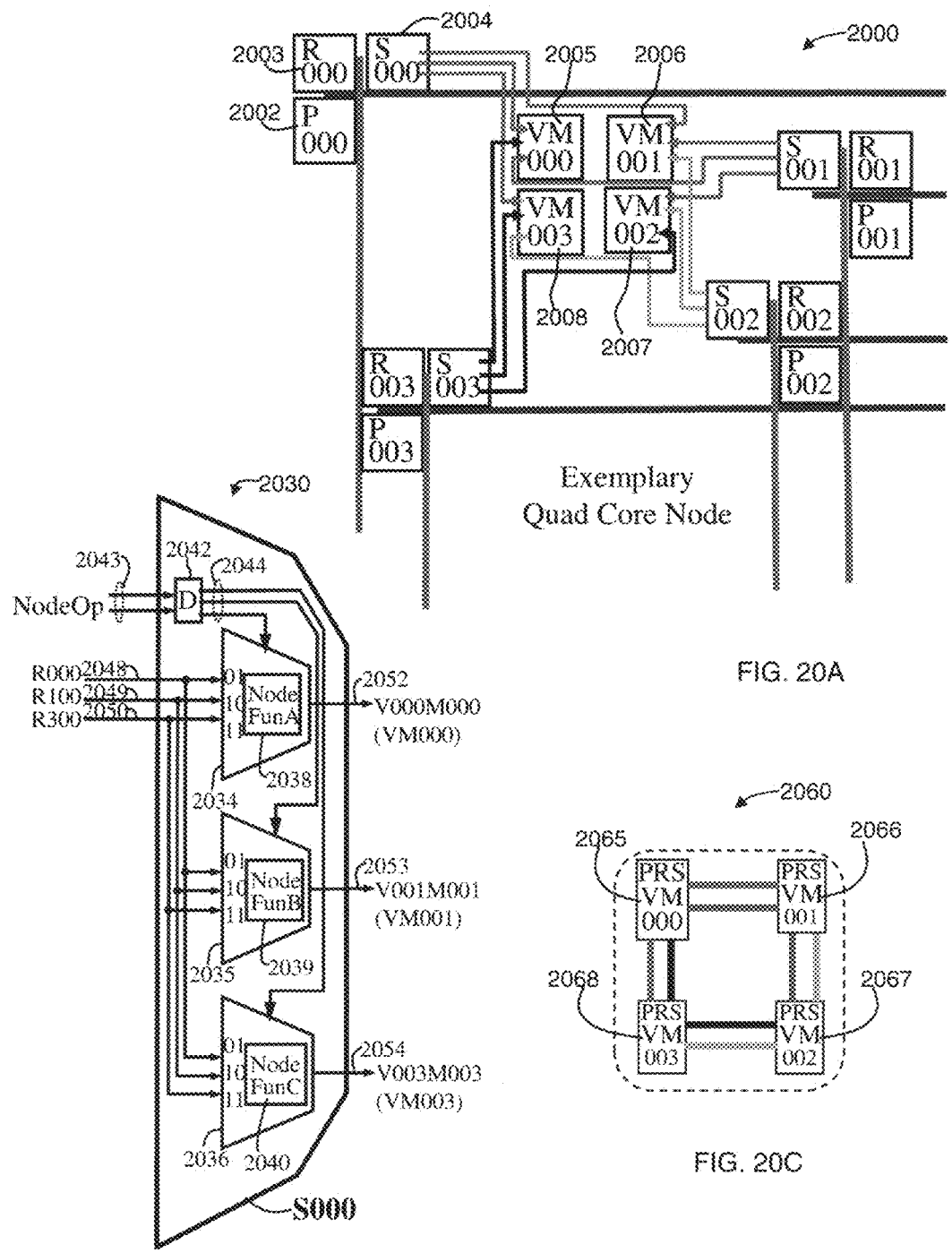

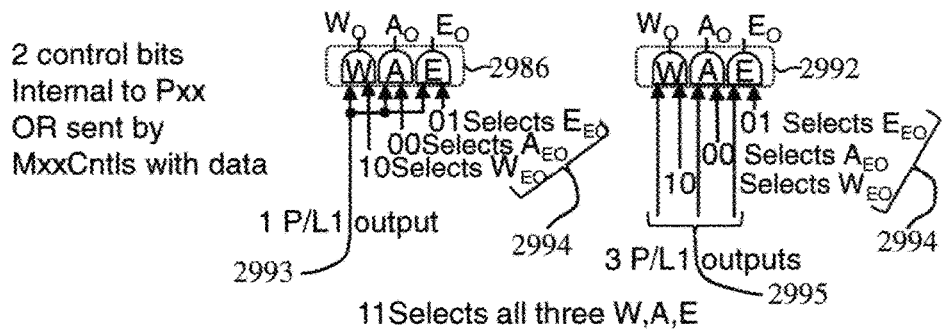
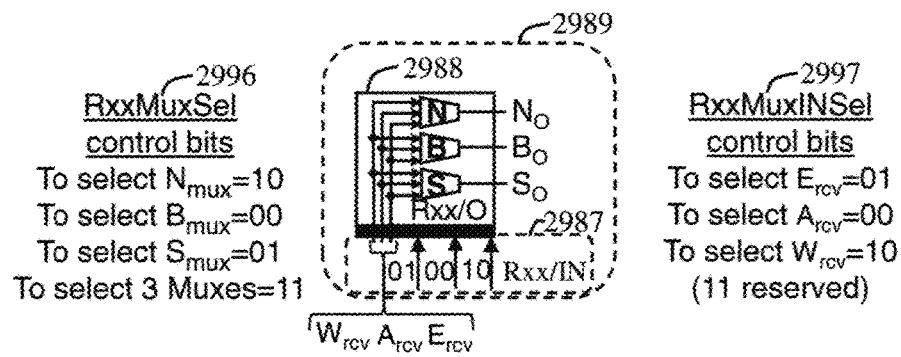
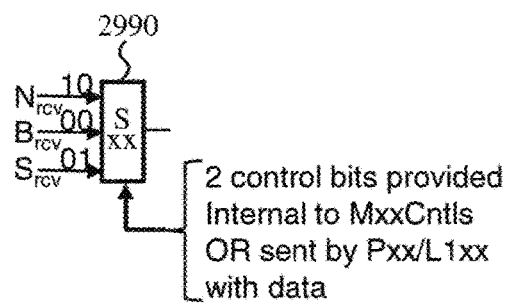
Fig. 29B

Wiring Plane P to R Horizontal Connection Paths
Pxx/O = P/L1xx/Output

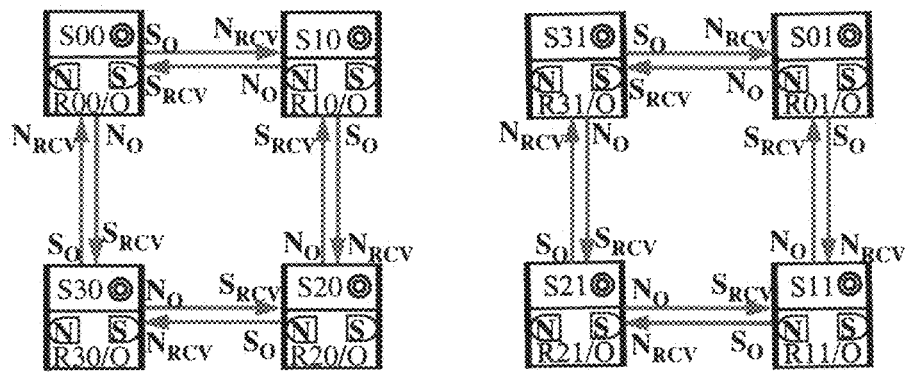
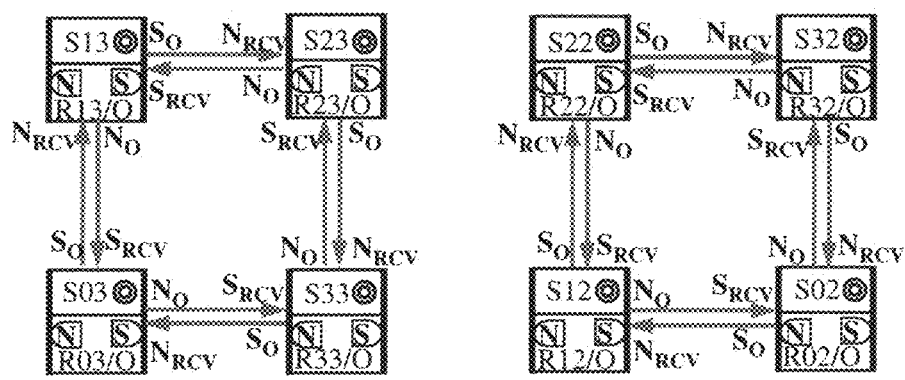
Wiring Plane R to S Vertical Connection Paths
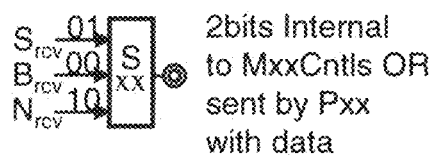
Fig. 32

← 3300
   
   
   
   
◉ = Sxx output to Mxx/L2 input
Memory Plane
Fig. 33

METHODS AND APPARATUS FOR SIGNAL FLOW GRAPH PIPELINING IN AN ARRAY PROCESSING UNIT THAT REDUCES STORAGE OF TEMPORARY VARIABLES

RELATED APPLICATION DATA

This present application is a continuation of U.S. application Ser. No. 14/450,222 filed Aug. 2, 2014 and claims the benefit of U.S. Provisional Application No. 61/862,075 filed Aug. 4, 2013 and U.S. Provisional Application No. 61/905,265 filed Nov. 17, 2013, both provisional applications entitled "Methods and Apparatus for Signal Flow Graph Pipelining that Reduce Storage of Temporary Variables" all of which are incorporated by reference herein in their entirety.

CROSS REFERENCE TO RELATED APPLICATIONS

The U.S. Pat. Nos. 7,581,079, 7,886,128, 8,156,311, and 8,443,169 and U.S. patent application entitled "Interconnection Network Connecting Operation-Configurable Nodes According to One or More Levels of Adjacency in Multiple Dimensions of Communication in a Multi-Processor and a Neural processor" U.S. application Ser. No. 13/792,039 filed on Mar. 9, 2013 have the same inventor, are related patents and application, and are hereby incorporated by reference in their entirety.

FIELD OF INVENTION

The present invention relates to unique and improved methods and apparatuses for processor architecture and organizations of processors and memory modules such that the processing of signal flow graphs which includes communication between the modules is efficient for reduced power drain. More specifically, this invention concerns a shared memory interconnection network and a processing system architecture and organization that efficiently supports signal flow graph pipelining that reduces storage of temporary variables.

BACKGROUND OF INVENTION

One of the problems associated with increasing performance in multiprocessor parallel processing systems is the efficient accessing of data or instructions from memory. Having adequate memory bandwidth for sharing of data between processors is another problem associated with parallel processing systems. These problems are related to the organization of the processors and memory modules and the processor architecture used for data communication between a processor, including execution units, and a plurality of memories and between processors. Various approaches to solving these problems have been attempted in the past, for example, array processors and shared memory processors.

Multiprocessor systems can be classified generally in terms of coupling strength for communication between processors. Those multiprocessor systems that communicate using a share memory facility between the processors and the shared memory over an interconnection network are generally considered tightly coupled. Loosely coupled multiprocessor systems generally use an input/output (I/O) communication process in each processor for communicating between the processors over an interconnection network, such as message passing process. A wide variety of interconnection networks have been utilized in multiprocessing systems. For example, rings, bus connected, crossbar, tree, shuffle, omega, and butterfly, mesh, hypercube, and ManArray networks, have been used in prior multiprocessor systems. From an application or use perspective, specific networks have been chosen primarily based upon performance characteristics and cost to implement tradeoffs.

Parallel processing and the distribution of data between functional execution elements may be described using Kronecker product expressions of signal transform functions, such as the fast Fourier transform (FFT) and other signal flow graph expressions. However, the underlying processor architecture may present limitations that affect the efficiency of implementing functions described using Kronecker product expressions and other signal analysis techniques.

SUMMARY OF THE INVENTION

It is appreciated that improvements to processor architecture, network design, and organizations of processors and memory are desired for the execution of signal flow graph expressions. Such improvements are provided by multiple embodiments of the present invention. In one embodiment of the present invention, a network of nodes is organized in stages according to dimensions of a row (R) by column (C) by plane (P) matrix that forms an R×C×P array having connectivity according to adjacency of connections between elements in corresponding dimensions of the R×C×P array which includes wrap around adjacent elements, the connectivity within the stages includes connections between nodes in the same position. The network has p planes of R×C arrays of $A_{r,c,p}$ nodes and p planes of R×C arrays of $R_{r,c,p}$ nodes having a different p that is the same for an R×C array of $A_{r,c,p}$ nodes and a corresponding R×C array of $R_{r,c,p}$ nodes, $p \in \{0, 1, \ldots, P-1\}$, each R×C array of $A_{r,c,p}$ nodes and each R×C array of $R_{r,c,p}$ nodes having a different r that is the same for each row r, $r \in \{0, 1, \ldots, R-1\}$, and for each row r, c varies as the column number $c \in \{0, 1, \ldots, C-1\}$, each $A_{r,c,p}$ node in each plane p is operable to output a data value. Also, each R×C array of $R_{r,c,p}$ nodes is directly coupled to a corresponding R×C array of $A_{r,c,p}$ nodes according to a 1 to N adjacency of nodes in a first dimension, N a positive odd integer, and R≥N and C≥N, wherein each $R_{r,c,p}$ node is operable to select a data value solely from directly coupled nodes $A_{r,c-\lfloor N/2 \rfloor,p}, \ldots, A_{r,c-2,p}, A_{r,c-1,p}, A_{r,c,p}, A_{r,c+1,p}, A_{r,c+2,p}, \ldots, A_{r,c+\lfloor N/2 \rfloor,p}$ and to output the $R_{r,c,p}$ node selected data value, wherein for a selected value of N, the $A_{r,c-\lfloor N/2 \rfloor,p}, \ldots, A_{r,c-2,p}, A_{r,c-1,p}$ sequence of nodes has $\lfloor N/2 \rfloor$ nodes and for N>1 the last node is $A_{r,c-\lfloor N/2 \rfloor,p}$ and the $A_{r,c+1,p}, A_{r,c+2,p}, \ldots, A_{r,c+\lfloor N/2 \rfloor,p}$ sequence of nodes has $\lfloor N/2 \rfloor$ nodes and for N>1 the last node is $A_{r,c+\lfloor N/2 \rfloor,p}$, wherein $\lfloor N/2 \rfloor$ is the floor of N/2 which is the largest integer less than N/2. The network also has p planes of R×C arrays of $S_{r,c,p}$ nodes having a different p that is the same for an R×C array of $R_{r,c,p}$ nodes and a corresponding R×C array of $S_{r,c,p}$ nodes, $p \in \{0, 1, \ldots, P-1\}$, each R×C array of $S_{r,c,p}$ nodes having a different r that is the same for each row r, $r \in \{0, 1, \ldots, R-1\}$, and for each row r, c varies as the column number $c \in \{0, 1, \ldots, C-1\}$. Also, each R×C array of $S_{r,c,p}$ nodes in each plane p is directly coupled to a corresponding R×C array of $R_{r,c,p}$ nodes according to a 1 to M adjacency of nodes in a second dimension, M a positive odd integer, and R≥M and C≥M, wherein each $S_{r,c,p}$ node is operable to select a data value solely from directly coupled nodes $R_{r-\lfloor M/2 \rfloor,c,p}, \ldots, R_{r-2,c,p}, R_{r-1,c,p}, R_{r,c,p}, R_{r+1,c,p}, R_{r+2,c,p}, \ldots, R_{r+\lfloor M/2 \rfloor,c,p}$ and to output the $S_{r,c,p}$ node selected data value, wherein for a selected value of M, the $R_{r-\lfloor M/2 \rfloor,c,p}, \ldots, R_{r-2,c,p}, R_{r-1,c,p}$ sequence of nodes has $\lfloor M/2 \rfloor$ nodes and for M>1 the last node is $R_{r-\lfloor M/2 \rfloor,c,p}$ and the $R_{r+1,c,p}, R_{r+2,c,p}, \ldots, R_{r+\lfloor M/2 \rfloor,c,p}$ sequence of nodes has $\lfloor M/2 \rfloor$ nodes and for M>1 the last node is $R_{r+\lfloor M/2 \rfloor,c,p}$, wherein $\lfloor M/2 \rfloor$ is the floor of M/2 which is the largest integer less than M/2. The network further has p planes of R×C arrays of $V_{r,c,p}$ nodes having a different p that is the same for an R×C array of $S_{r,c,p}$ nodes and a corresponding R×C array of $V_{r,c,p}$ nodes, $p \in \{0, 1, \ldots, P-1\}$, each R×C array of $V_{r,c,p}$ nodes having a different r that is the same for each row r, $r \in \{0, 1, \ldots, R-1\}$, and for each row r, c varies as the column number $c \in \{0, 1, \ldots, C-1\}$. Further, each $V_{r,c,p}$ node is directly coupled to P $S_{r,c,p}$ nodes having the same r and c as the $V_{r,c,p}$ node, $p \in \{0, 1, \ldots, P-1\}$, wherein each $V_{r,c,p}$ node is operable to select a data value from directly coupled P $S_{r,c,p}$ nodes and to output the $V_{r,c,p}$ node selected data value.

Another embodiment of the present invention addresses a method of executing a packet of chained instructions as part of a program executed by a processor. A chain of instructions is received that has operand dependencies between the instructions. A first instruction of the chain of instructions is decoded to determine a function specified by the first instruction, to identify an execution unit to provide the function, and to identify an operand input pipeline register (OIPR) of a destination instruction of the chain of instructions as a destination for the result generated by the identified execution unit in execution of the function. A first tag for the identified OIPR is generated based on a decoding of the destination instruction. The first instruction is dispatched to the identified execution unit. The first instruction is executed to produce the result which is transferred across a local network between execution units to the identified OIPR according to the first tag.

A further embodiment of the present invention addresses a method for executing a group function having a first instruction and a second instruction. A first instruction is decoded to determine a function specified by the first instruction, to identify control information encoded in the first instruction that is used for execution of a second instruction that is a pre-specified destination instruction placed in a sequence of instructions at a pre-specified location relative to the first instruction, and to identify an operand input pipeline register (OIPR) associated with the second instruction as a destination for a result generated by execution of the first instruction. The control information is transferred across a local network between execution units to store the control information in a pending register. The first instruction is executed to produce the result which is transferred across the local network between execution units to the identified OIPR. The second instruction is executed to fetch the result from the identified OIPR and operate on the result using the control information fetched from the pending register to adjust the second execution unit for executing the second instruction.

These and other features, aspects, techniques and advantages of the invention will be apparent to those skilled in the art from the following detailed description, taken together with the accompanying drawings and claims.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 11 illustrates assembler notation of instructions in row 3 CEP in accordance with an embodiment of the present invention;

FIG. 12A illustrates a pipeline diagram for Row 3 of the FFT signal flow graph of FIG. 10 in accordance with an embodiment of the present invention;

FIG. 12B illustrates a pipeline diagram with instruction executions per cycle for the FFT signal flow graph of FIG. 10 in accordance with an embodiment of the present invention;

FIG. 15 illustrates a cycle by cycle sequence chart of entries of Wings instructions in a prolog instruction code (PIC) memory in accordance with an embodiment of the present invention;

FIG. 20A illustrates an exemplary quad core node selected from a 16 quad core node network obtained by folding the WAM 4×4×4 network of FIG. 19 to overlap the 2D 4×4 PRS planes and 4×4 VM planes in accordance with an embodiment of the present invention;

FIG. 20B illustrates an exemplary S000 node, such as S000 node of the quad core node of FIG. 20A in accordance with an embodiment of the present invention;

FIG. 20C illustrates an exemplary quad core node symbol for the quad core node of FIG. 20A in accordance with an embodiment of the present invention;

FIG. 29B illustrates various selectors for a 1→3 adjacency network that interconnects the P/L1 nodes and memory nodes in the exemplary WAM16S network of FIG. 29A in accordance with an embodiment of the present invention;

FIG. 32 illustrates a wiring plane R to S vertical connection paths in a third layer in the 3D physical implementation that overlays the second layer in the 3D physical implementation of FIG. 31 in accordance with an embodiment of the present invention;

FIG. 33 illustrates a memory plane in a fourth layer in the 3D physical implementation that overlays the third layer in the 3D physical implementation of FIG. 32 in accordance with an embodiment of the present invention.

DETAILED DESCRIPTION

Figure 1:
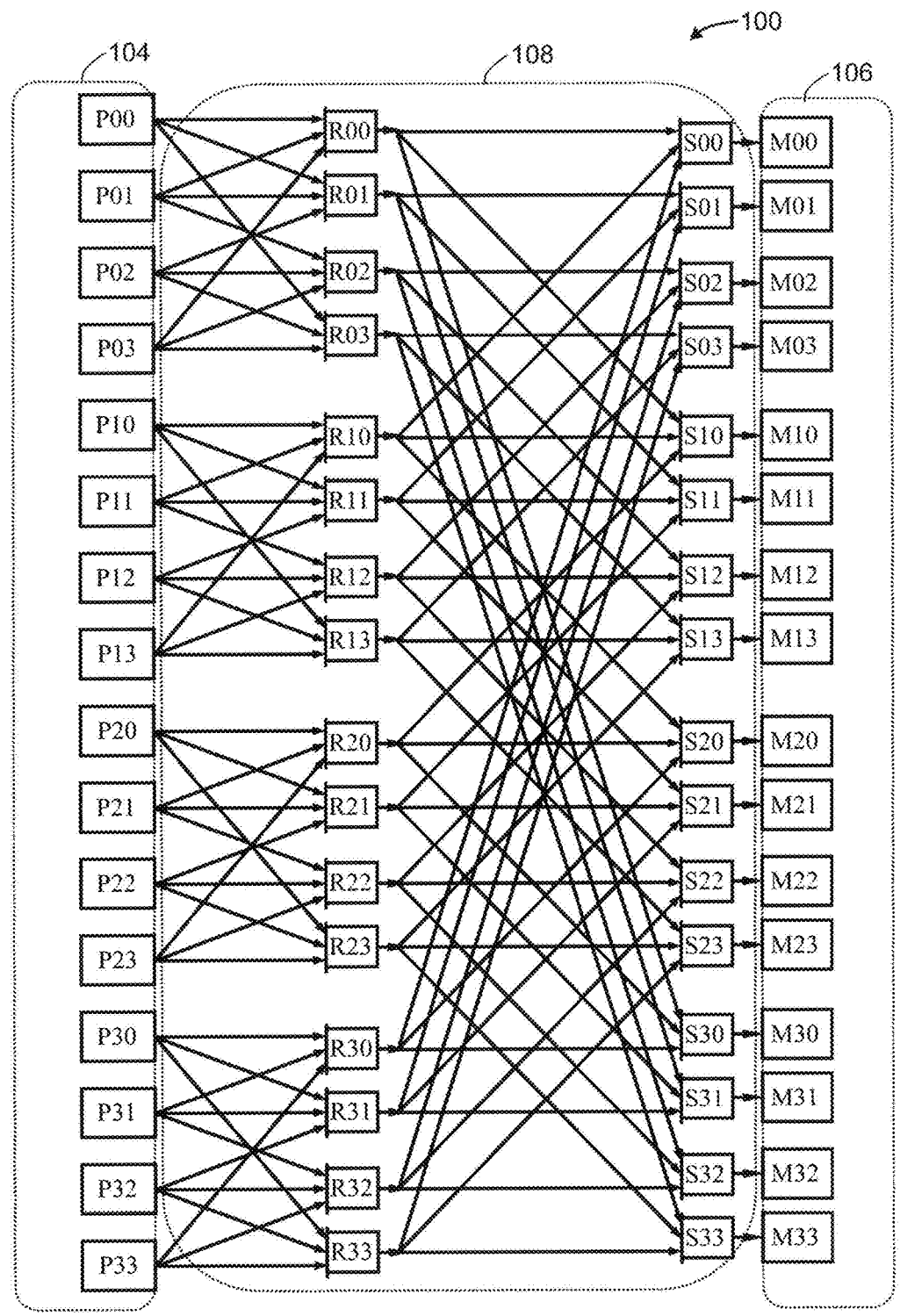
FIG. 1 illustrates a Wings array memory (WAM) sixteen processor network for store operations (WAM16S) in accordance with an embodiment of the present invention.

FIG. 1 illustrates a Wings array memory (WAM) sixteen processor network for store operations (WAM16S) 100 in accordance with an embodiment of the present invention. Processors 104 which comprise sixteen processors P00-P33 are illustrated as nodes that each can initiate a store operation to store data in a memory location in the memory blocks 106, consisting of sixteen memory blocks M00-M33, also referred to as memory nodes. The processor and memory block nodes are organized in linear arrays and identified according to a G×H matrix where, in this example, G equals four representing the number of rows in the matrix and H equals four representing the number of columns. A processor $P_{g,h}$, a memory block $M_{g,h}$, and internal nodes of the network are labeled in a row g by column h format where g∈{0, 1, ..., G−1} and h∈{0, 1, ..., H−1}. The processors are not directly connected to each other nor are the memory blocks directly connected to any of the other memory blocks. The processors are connected to the memory blocks over a two stage WAM network 108.

Figure 2:
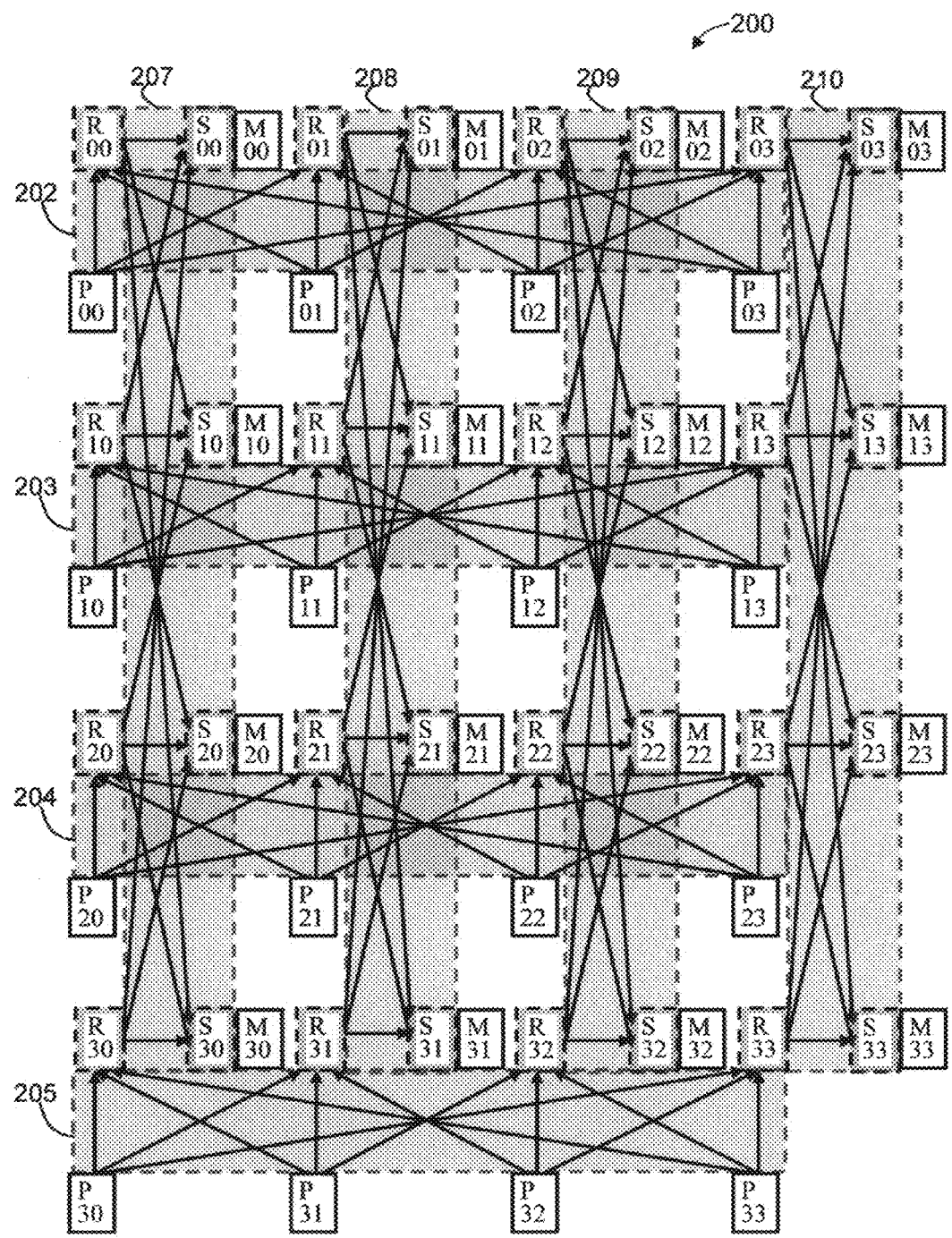
FIG. 2 illustrates an exemplary WAM16S network in a physical layout form of the WAM16S network of FIG. 1 in accordance with an embodiment of the present invention.

FIG. 2 illustrates an exemplary WAM16S network 200 in a physical layout form of the WAM16S network 100 of FIG. 1 in accordance with an embodiment of the present invention. The processors 104, memory blocks 106, and network R nodes in a first stage and S nodes in a second stage of the two stage WAM network 108 are distributed according to a G×H matrix where G=H=4. Each processor $P_{g,h}$, memory block $M_{g,h}$, and internal nodes of the network are labeled in a row g by column h format where g∈{0,1,2,3} and h∈{0,1,2,3}. The processors $P_{g,h}$ 104 and first stage nodes $R_{g,h}$ are separately coupled across each row "g" by horizontal row networks 202-205 highlighted in blue. The first stage nodes $R_{g,h}$ and the second stage nodes $S_{g,h}$ are separately coupled across each column "h" by vertical column networks 207-210 highlighted in green. In an exemplary implementation, the horizontal row networks 202-205 highlighted in blue coupling to the processors $P_{g,h}$ 104 and to the first stage nodes $R_{g,h}$ may be organized on one layer of a multi-layer silicon chip. A different layer of the chip may be utilized for the vertical column networks 207-210 highlighted in green which provide coupling between the first stage nodes $R_{g,h}$ and the second stage nodes $S_{g,h}$. The memory blocks 106 may be configured on the same layer of the multi-layer chip with the processors $P_{g,h}$ 104, or alternatively with the second stage nodes $S_{g,h}$, or on a different layer, such as the top layer of the chip, for example. In such an organization with the memory blocks 106 on the top layer of the chip, the memory blocks 106 may be overlaid upon the processors 104 providing a column access path between each processor $P_{g,h}$ and each corresponding memory block $M_{g,h}$.

A load network having a similar form to the WAM16S network 100 of FIG. 1 may also be organized in a physical layout form as shown in the WAM16S network 200 of FIG. 2. The load network and store network may be combined with separate connections between each of the processors $P_{g,h}$s and each of the memory blocks $M_{g,h}$s.

Figure 3:
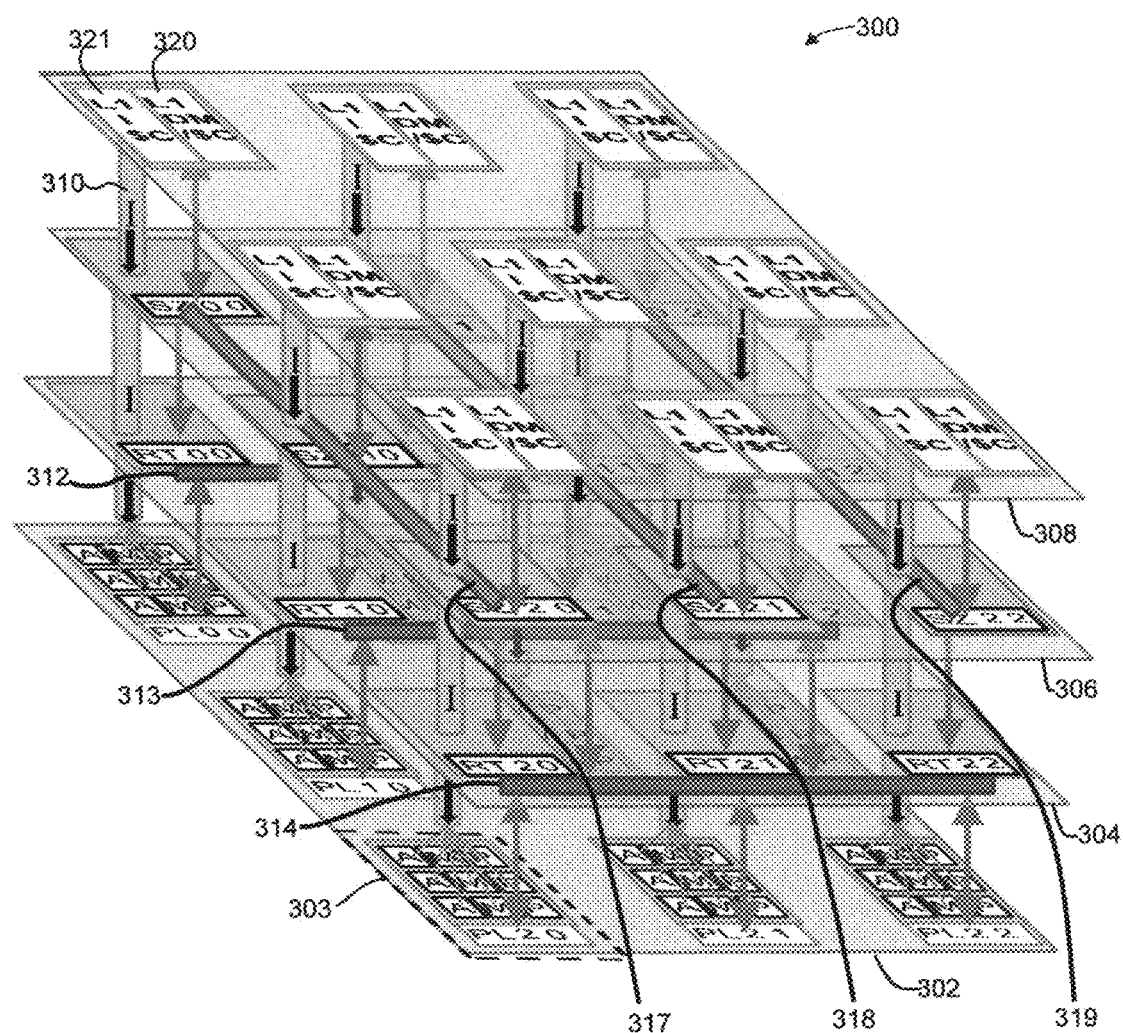
FIG. 3 illustrates a nine node processing system in a 3D physical layout form using WAM array memory for data memory, such as including an array of data caches, and a vertical pipe between instruction memory and processing elements in accordance with an embodiment of the present invention.

FIG. 3 illustrates a nine node processing system 300 in a 3D physical layout form using WAM array memory for data memory, such as including an array of data caches, and a vertical pipe between instruction memory and processing elements in accordance with an embodiment of the present invention. The bottom layer 302 shown in FIG. 3 comprises a 3×3 array of processor nodes configured with three rows, each row having a plurality of arithmetic logic units (ALUs) or simply (As), a plurality of multiply accumulate units (MPAUs) or simply (Ms), and a plurality of permute bit operation units ($P_B$Us) or simply ($P_B$s). Each processor node, such as processor node 303, comprises three rows of AMP execution units, for example. For each processor node on layer 302, an instruction pipe, such as instruction pipe 310, is provided vertically through the silicon layers 304 and 306 to a level 1 instruction cache on layer 308. The intermediate layers 304 and 306 are used to provide the horizontal row networks 312-314, shown in blue, and vertical column networks 317-319, shown in green, respectively. The horizontal and vertical connections of the 3×3 nine node processing system 300 are a subset of the horizontal and vertical connections of the 4×4 arrangement of the WAM16S network 200 shown in FIG. 2. It is noted that there may be additional wiring layers between the bottom layer 302 and the top layer 308. Each processor node has a corresponding level 1 data memory, such as an L1 data cache (L1DM/$C) 320, and a corresponding level 1 instruction memory, such as an L1 instruction cache (L1I$C) 321, in the top layer 308 which allows the corresponding memory nodes to overlay the processor node.

Figure 4:
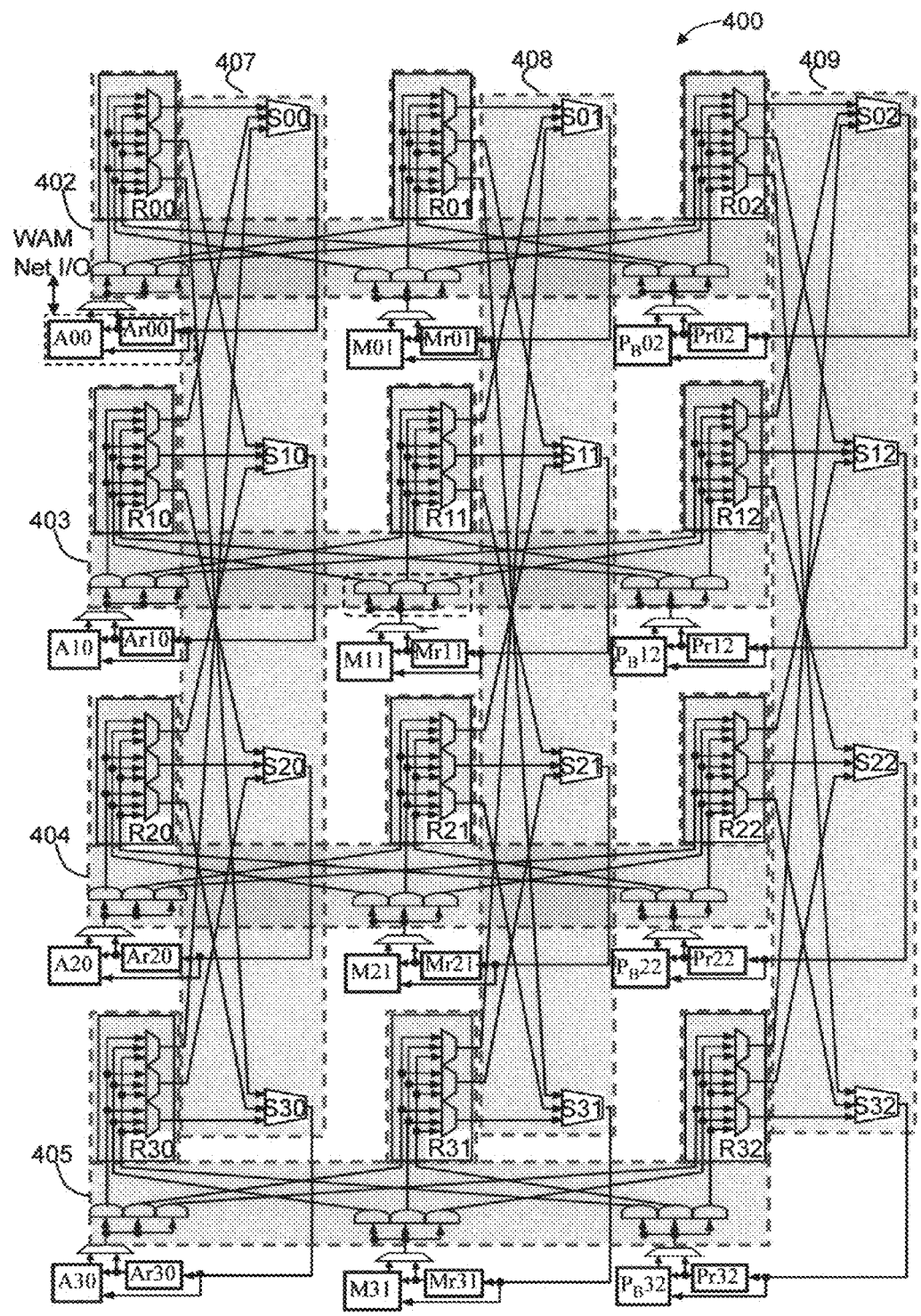
FIG. 4 illustrates a processor node organized in an exemplary 4 row×3 column arrangement of execution units and storage elements in a physical layout form with a one to three level adjacency in accordance with an embodiment of the present invention.

FIG. 4 illustrates a first processor node 400 organized with an exemplary 4 row×3 column arrangement of execution units and storage elements in a physical layout form with a one to three level adjacency in accordance with an embodiment of the present invention. In FIG. 4, there are a plurality of functional units comprising four ALUs, A00, A10, A20, and A30, four MPAUs, M01, M11, M21, and M31, and four PBUs, P02, P12, P22, and P32. Associated with the plurality of functional units are local storage units comprising Ar00-Ar30, Mr01-Mr31, and Pr02-Pr32, that provide a distributed register file for storage of variables required by a program. Each local storage unit is placed local to the functional unit by nature of the timing path to read from and write to the local storage unit as required by a particular implementation. The local storage unit may also be considered a sub-file portion of the distributed register file. The 4×3 interconnection network connecting the functional units and local storage units is the WAM network which is shown having a 1 to 3 level adjacency. The functional units and local storage units are separately coupled across each row by horizontal row networks 402-405, highlighted in blue, to Rxx nodes. The Rxx nodes are separately coupled across each column by vertical column networks 407-409, highlighted in green, to the functional units and local storage units.

Figure 5A:
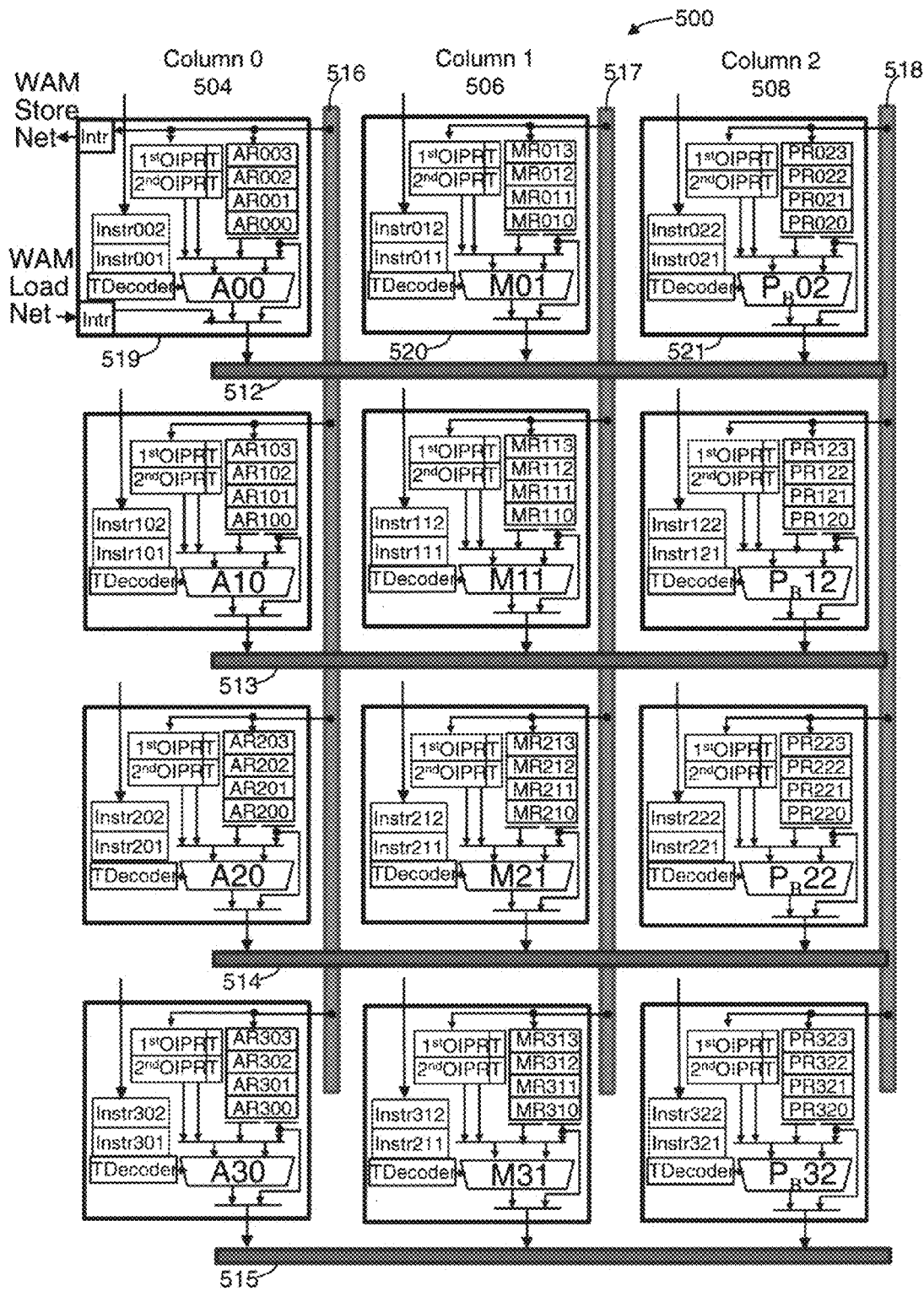
FIG. 5A illustrates a four row by three column arrangement of arithmetic logic units (As) in column 0, multiply accumulate units (Ms) in column 1, and permute bit operation units ($P_BS$) in column 2 in accordance with an embodiment of the present invention.

FIG. 5A illustrates a second processor node 500 organized with a 4 row by three column arrangement of arithmetic logic units (As) in column zero 504, multiply accumulate units (Ms) in column one 506, and permute bit operation units ($P_B$S) in column two 508, in accordance with an embodiment of the present invention. Local storage units, also referred to as local files (LF), are illustrated in each arithmetic node as a group of four registers identified by a 3D numeric reference, such as for node AN00 519 local file four registers AR000, AR001, AR002, and AR003 are accessible by the local ALU A00 and also to other interconnected functional units via the Wings connection network having horizontal connections 512-515, shown in blue, and vertical connections 516-518, shown in green. It is noted that the representation of horizontal connections 512-515 and vertical connections 516-518 is for purposes of clarity of presentation, other bus placements may be utilized in accordance with the present invention. A local instruction memory internal to each node is also shown which may include multiple addressable instructions, such as two instructions, instr001 and instr002, as shown in node AN00 519 though a greater plurality of instructions may be included at each functional element. Further details of the arithmetic nodes is described with reference to FIG. 5B below which illustrates an expanded view of node AN00.

Figure 5B:
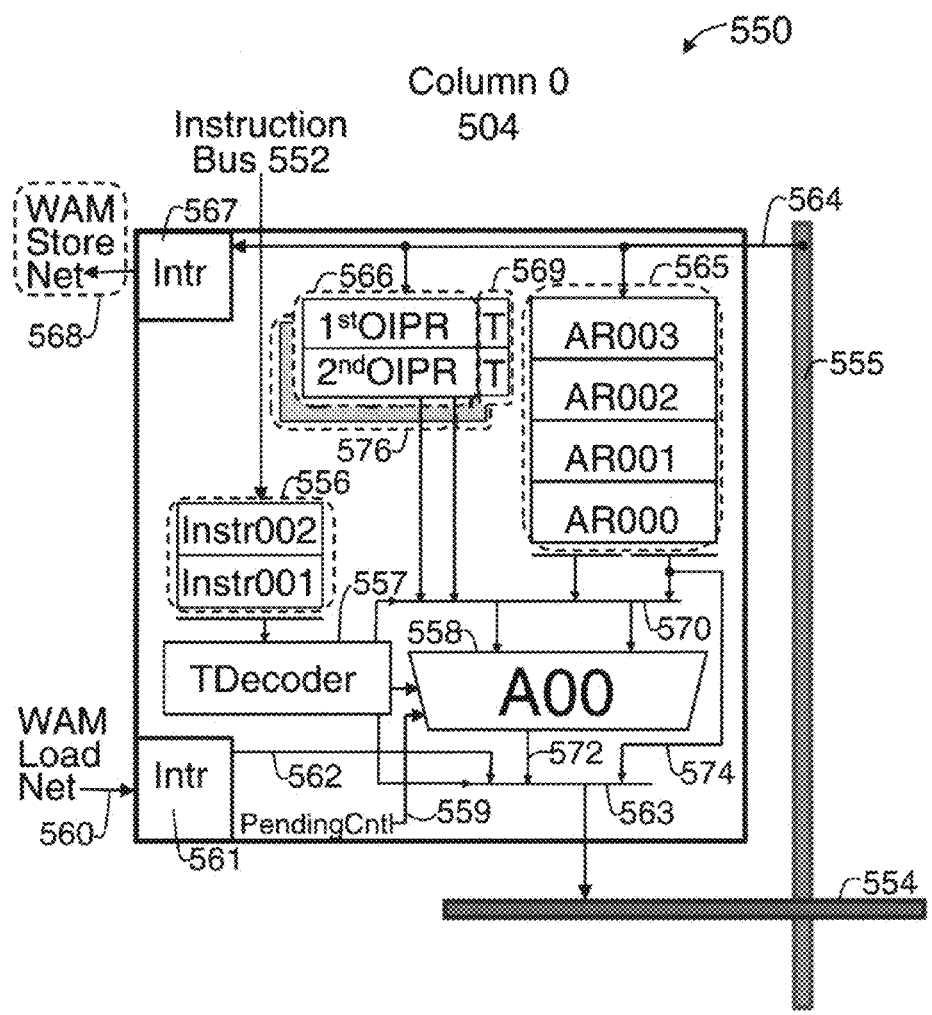
FIG. 5B illustrates a node that is an expanded illustration of node A00 from the processor node of FIG. 5A in accordance with an embodiment of the present invention.

FIG. 5B illustrates a node 550 that is an expanded view of node AN00 519 from the second processor node 500 of FIG. 5A in accordance with an embodiment of the present invention. Each arithmetic node comprises an instruction bus input 552 and connections to the Wings connection network such as horizontal connections 554, shown in blue, and vertical connections 555, shown in green. The instruction bus 552 receives instructions from a chained execution packet (CEP) as described in more detail below. An arithmetic node instruction memory 556 stores instructions as they are dispatched. A tagged instruction decoder (TDecoder) 557, decodes an instruction selected from the arithmetic node instruction memory 556 when all required data operands have been received. An arithmetic unit, such as A00 558, executes the selected instruction. The arithmetic unit may be configured with fixed point or floating point or both types of execution units. The arithmetic unit may also be configured with one or more functional units, such as an arithmetic logic unit (ALU), a multiply functional unit, a multiply accumulate function, and may include an execution unit for group function instructions as described in more detail below. For group function instructions, a pending control information signal path (pendingcntl) 559 is also provided to the arithmetic unit A00 558 to adjust the execution function as described in more detail below with regards to FIGS. 8F-8I. Input data, also referred to as operands, may be loaded to an arithmetic unit over a Wings array memory (WAM) load network at connection point 560 through an input interface 561 which may contain buffer storage according to requirements of a processor. The input data may then transfer over an internal bus 562 to be selected by multiplexer 563 for connection to the 4×3 interconnection network through the blue horizontal connections 554 and the green vertical connections 555 to connect to a selected arithmetic node in the 4×3 array. For example, a data operand may be loaded to node 550 and received over a data bus 564 from the vertical connections 555. The data operand as specified by a CEP instruction may be received in one of the registers AR000, AR001, AR002, or AR003 of the local file (LF) 565 or received in a first operand input pipe register ($1^{st}$ OIPR) or a second operand input pipe register ($2^{nd}$ OIPR) of external input storage 566. The use of the terminology of external input storage refers to the operands received are generally received from another source external to the current node, though receiving a result from the current node at the current node is not precluded. Additional buffers, such as a second external input storage 576 may be included in a particular implementation, such as may be required when a $3^{rd}$ OIPR and a $4^{th}$ OIPR are required, as described below with regard to a quad multiplication operation for a group function set of instructions. Also, a tag storage 569 is included for a tag field that stores a tag associated with a data item to be received or transmitted. Data may also be transferred from data bus 564 to output interface 567 to a WAM store network 568 for storage in one or more memory blocks of the processor memory. When an instruction is selected from the arithmetic node instruction memory 556 it is decoded in the tagged decoder 557 which controls multiplexers 570 and 563 depending on the decoded instruction. For example, operands may be selected from the external input storage 566 or from the LF 565 over an internal LF bus 574 or one operand may be selected from the external input storage 566 and one operand from the LF 565. The arithmetic unit A00 558 operates on the selected operand data and produces a result 572 which is then selected by multiplexer 563 for connection to one or more arithmetic nodes in the 4×3 array. The multiplexer 563 may also select a path for a data value from one of the registers in the LF 565 or the aforementioned path from the WAM load network over bus 562. In another example, when a first instruction is decoded, the decoding identifies an operand input pipeline register (OIP) of a destination instruction and a tag is prepared for the identified OIPR. The decoding of the first instruction may also identify that a result destination is to be stored in a local file, such as LF 565, and a general tagging mechanism may be used for such identification purposes. The destination instruction is an instruction having a data dependency on the value associated with the identified OIPR. In a subsequent decoding of the destination instruction, a destination execution unit in the 4×3 arrangement of execution units is identified that the destination instruction is dispatched to for execution. The tag for the identified OIPR of the destination instruction is updated with this information in order to generate a tag that directs the results of executing the first instruction to the identified OIPR of the destination execution unit. Such updating of the tag may also occur during an operand fetch stage in a pipeline or when the destination instruction is dispatched to an available execution unit that becomes the destination execution unit.

Figure 6:
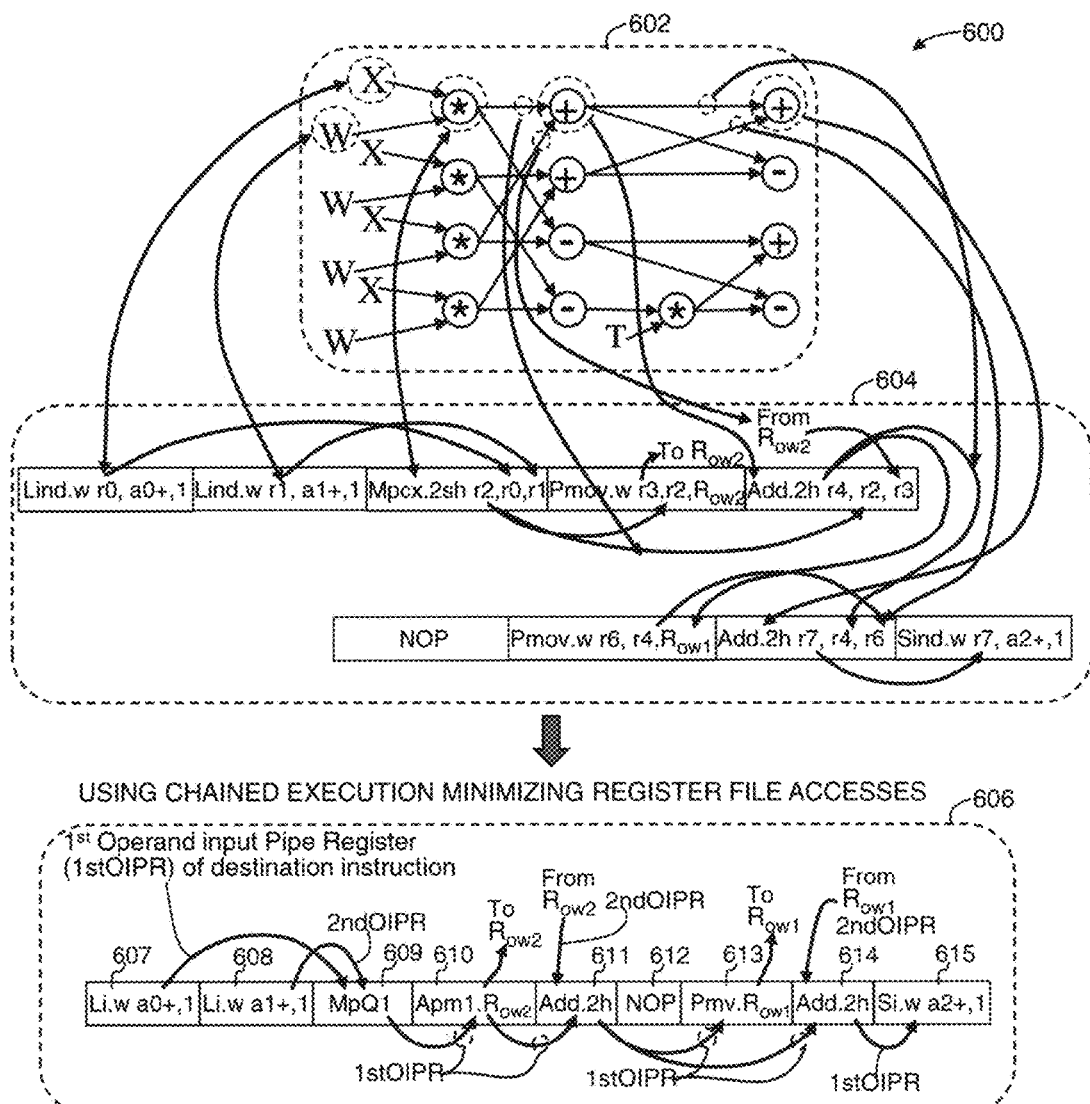
FIG. 6 illustrates a fast Fourier transform (FFT) signal flow graph row 0 mapping to a chained execution packet (CEP) with functions and transfers for row 0 corresponding to Wings instructions in the CEP in accordance with an embodiment of the present invention.

FIG. 6 illustrates a fast Fourier transform (FFT) signal flow graph row 0 mapping 600 to a chained execution packet (CEP) 606 with functions and transfers for row 0 corresponding to Wings instructions in the CEP in accordance with an embodiment of the present invention. The FFT signal flow graph 602 is made up of inputs W, X, multiplication operations, addition and subtraction operations to produce results at the final stage that are stored to memory. A mapping of the inputs W, X, multiplication operations, addition and subtraction operations is shown with curve arrows between the signal flow graph 602 and a list of instructions 604 that store temporary variables in a register file. It is noted that the register values stored in register r0, r1, r2, r3, r4, r6, and r7 are temporary variables and are overwritten each pass through the signal flow graph. Thus, the operations that read and write these temporary registers cause power usage that could be avoided by use of the techniques of the present invention. The list of instructions 604 is processed to remove the register address fields and is replaced with a plurality of Wings instructions shown in row 0 CEP 606 of FIG. 6 and described below with reference to specific instructions illustrated with in FIGS. 7A-7C, 8A-8D, 9A-9E, 16, and 17.

The use of CEPs generally without register file operand specifications and with 16-bit and 26-bit instructions instead of 32-bit instructions compresses instruction storage as well as saves power. For example, nine 32-bit instructions requires 288-bits of storage while the nine Wings instructions in the row 0 CEP 606 requires in one embodiment 3*26-bit load/store instructions plus one 26-bit arithmetic instruction plus 5*16-bit arithmetic instructions which equals 184-bits for a savings of 104-bits. Also, the execution of the row 0 CEP 606 saves seven register file write operations and nine register file read operations per packet execution. Row 1 CEP and row 2 CEP each also save seven register file write operations and nine register file read operations per packet execution. Row 3 CEP saves eight register file write operations and eleven register file read operations per packet execution. One pass through the CEPs 0-3 then saves 29 register file write operations and 38 register file read operations, thus saving 67 register file operations.

The first instruction in the row 0 CEP 606 is a load indirect (Li) instruction 607 that loads a 32-bit complex data value which is comprised of a real 16-bit portion and an imaginary 16-bit portion. The execution of the Li instruction 607 accesses the complex word at a memory address that is based on an address register 0 (a0) which may store a 32-bit address or a 64-bit address and is incremented by one on each execution, having syntax of Li.w a0+,1 (Li.a0). The Li.a0 instruction 607 fetches the complex word which is transferred to a first operand input pipe register ($1^{st}$ OIPR) of a multiply node as one of the complex inputs for a multiply portion of a multiply complex signed 16-bit halfword (2sh) operation. The multiply portion is a quad multiply operation producing four results in the execution of a MpQ1 instruction 609 as described in more detail below. The following addition and permute move (Apm1) instruction 610 generates a complex addition and subtraction, rounding, and move operation producing a result that moves through a local network, such as the 4×3 interconnection network of FIG. 4, to one or more destination instructions' OIPRs.

The Li.a0 instruction 607 is coded by a compiler or programmer to indicate a chained link to a destination instruction based on register linkage between instructions and placement of a linked instruction in a CEP, such as in the row 0 CEP 606. For example, the Li.a0 instruction 607, considered instruction zero, has a register linkage to the MpQ1 instruction 609 which is the second instruction in the row 0 CEP 606 from source instruction zero, the Li.a0 instruction 607. The Li.a0 instruction 607 is encoded with an indication that the fetched data is to be directed to the $1^{st}$ OIPR of the second instruction, the MpQ1 instruction 609. The hardware then directs the fetched data to the $1^{st}$ OIPR of the execution unit the MpQ1 instruction 609 is dispatched to, such as the $1^{st}$ OIPR associated with execution unit M01 in node 520 of FIG. 5A. In a similar manner, the second instruction in the row 0 CEP 606 is another load indirect Li.w a1+, 1 (Li.a1) instruction 608 which operates in a similar manner to the first load indirect instruction, but uses address register 1 (a1). This load indirect Li.a1 instruction 608, instruction zero for source destination determination, is encoded with an indication that the associated fetched data is to be directed to the $2^{nd}$ OIPR of the MpQ1 instruction 609 which is considered a first instruction, in this case, since it is adjacent to the Li.a1 instruction 608. The hardware then directs the data to the $2^{nd}$ OIPR of the execution unit the MpQ1 instruction 609 is dispatched to.

The MpQ1 instruction 609 produces four results which are directed to the $1^{st}$ OIPR and $2^{nd}$ OIPR 566 of FIG. 5B and $3^{rd}$ OIPR and $4^{th}$ OIPR 576 of FIG. 5B of an execution unit an Add permute move word to Row 2 ($R_{ow2}$) (Apm1.$R_{ow2}$) instruction 610 is dispatched to. The MPQ1 instruction 609 input operands are 16-bit halfwords. Each of the four multiplications produces a 32-bit result requiring the local network to deliver 128-bits to the adjacent Apm1.$R_{ow2}$ instruction's 610 destination OIPRs. The Apm1.$R_{ow2}$ instruction 610 produces a rounded($A_{real}*B_{real}-A_{imaginary}*B_{imaginary}$) 16-bit $T_{real}$ result and a rounded ($A_{real}*B_{imaginary}-A_{imaginary}*B_{real}$) 16-bit $T_{imagmary}$ result. The Apm1.$R_{ow2}$ instruction 610 is encoded with an indication that the 32-bit combined $T_{real}\|T_{imaginary}$ result is directed to the $1^{st}$ OIPR in Row 0 and $2^{nd}$ OIPR in Row 2, as described below with regard to FIG. 8I. The hardware then directs the Apm1.$R_{ow2}$ result to the $1^{st}$ OIPR of the Add.2h instruction 611 execution unit in Row 0 and to the $2^{nd}$ OIPR of a Sub.2h execution unit in Row 2. The $2^{nd}$ OIPR of the Add.2h instruction 610 in row 0 comes from execution of an Apm1.$R_{ow0}$ instruction in the Row 2 CEP. The hardware then directs in parallel a result of executing the Add.2h instruction 611 to the $1^{st}$ OIPR of the Pmv. $R_{ow1}$ instruction 613 execution unit and the $1^{st}$ OIPR of an Add.2h instruction 614 execution unit. A NOP instruction 612 causes no operation in row 0 execution for one cycle. The Pmv.$R_{ow1}$ instruction 613 produces one result which is directed to the $2^{nd}$ OIPR of the execution unit the Add.2h instruction of row 1 is dispatched to. The Prmv.w $R_{ow1}$ execution unit, the Prmv.w $R_{ow1}$ instruction 613 is dispatched to, having received the required operand is then executed to move a value between row 0 and row 1 nodes and to provide a result to a $2^{nd}$ OIPR of the Add.2h execution unit that the Add.2h instruction 614 is dispatched to. The Add.2h execution unit, the Add.2h instruction 614 is dispatched to, having received the required operands, executes the specified function and generates a result which is directed to the $1^{st}$ OIPR of a store execution unit the store instruction 615 is dispatched to. The execution of the store instruction 615 stores the result in processor memory at a specified address. It is noted that the chained links between instructions in each CEP may be referenced by use of relative addressing with respect to a current instruction. Also, data operands directed to an instruction requiring multiple data operands in a row CEP may be tagged by the hardware to enable a function unit to compare data operand tags to ensure the required data is received before executing the specified operation. The tagging of data operands may be used to determine when the required multiple data operands have been received for a specific instruction to enable execution. In one embodiment, the operand input pipe register (OIPR) value or OIPRs values are dispatched with their associated instruction to an available execution unit as determined by the hardware.

Figure 7A:
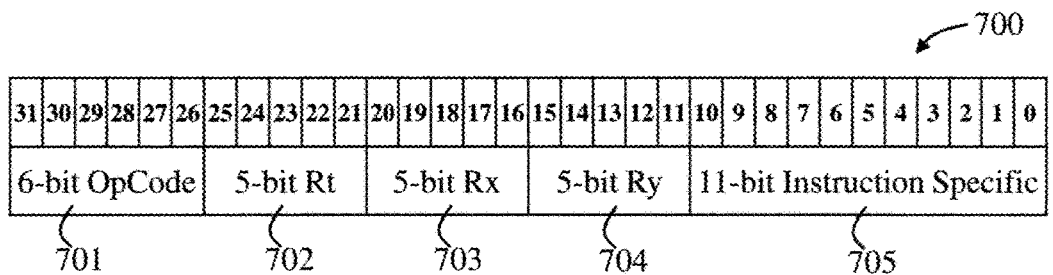
FIG. 7A illustrates a generic type of prior art arithmetic instruction format.

FIG. 7A illustrates a generic type of prior art arithmetic instruction format 700. The arithmetic instruction 700 is made up of a 6-bit opcode 701, a 5-bit Rt register target field 702, a 5-bit Rx register source field 703, a 5-bit Ry register source field 704, and an 11-bit instruction specific field 705. This format is typical for a processor having a central register file from which arithmetic operands are sourced and arithmetic results are targeted. A thirty two entry register file of 32-bits, for example, organized as a 32×32-bit multi-port register file, is a typical processor register file requiring 5-bit addressing for each port for direct access of operands. In a memory to memory processor which accesses operands from a memory, the specification of the source and target addresses in the arithmetic instruction typically accommodates a wider addressing range. The wider addressing range is obtained either directly through wider operand address fields in an instruction or through indirect forms of addressing using external addressing registers set up ahead of time.

In most processors, a fixed instruction format size is used, such as, 8, 16, 24, 32 and 64 bits or a combination of such instruction formats. The space allocated in the 32-bit instruction format 700 for three operand address fields 702, 703, and 704 is necessarily limited, since the other instruction bits, such as opcode 701 and instruction specific field 705, are required to provide information necessary to execute the instruction as specified by the processor's architecture. In order to break this limitation and provide greater flexibility, a new processor architecture, referenced as the Wings architecture having both 16-bit instructions and 26-bit instructions or having only 26-bit instructions is described next using exemplary instructions useful for execution of signal flow graph functions, such as shown in FIG. 6. It is noted that each 16-bit instruction begins with bit 15 and each 26-bit instruction begins with bit 25 that indicates the length of the instruction. For example, with the first bit after a packet tag of fixed length, if set to a "0", hardware can determine that the instruction is 16-bit instruction. If the first bit is set to a "1", hardware can determine that the instruction is a 26-bit instruction. So for example, if the first instruction after a packet tag is a 26-bit instruction, then following the first 26-bit instruction the first bit of the next instruction is examined to determine whether it is a 16-bit instruction or a 26-bit instruction and so on through the packet.

Figure 7B:
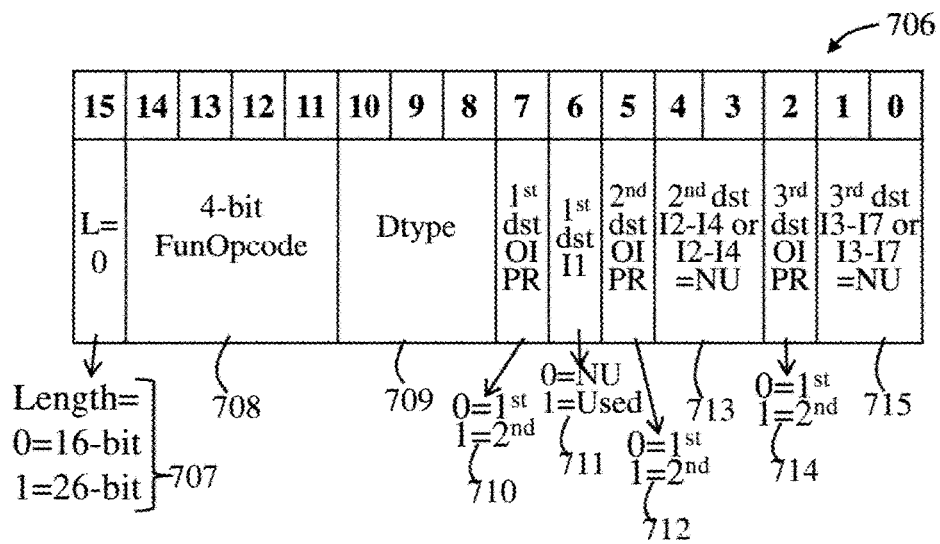
FIG. 7B illustrates a Wings arithmetic/logic 16-bit type 1 instruction in accordance with an embodiment of the present invention.
Figure 7C:
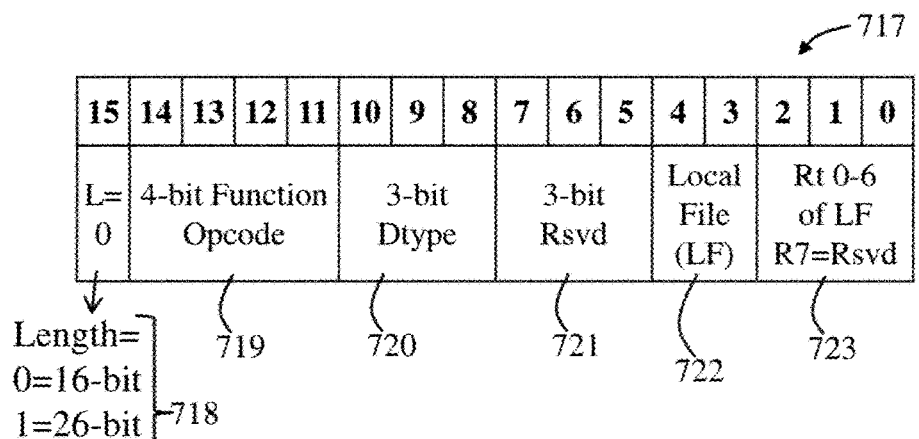
FIG. 7C illustrates a Wings arithmetic/logic 16-bit type 2 instruction in accordance with an embodiment of the present invention.

FIG. 7B illustrates a Wings arithmetic/logic (AL) 16-bit type 1 instruction 706 in accordance with an embodiment of the present invention. A type 1 format or a type 2 format, as utilized in the AL 16-bit type 2 instruction 717 of FIG. 7C, is determined from the 4-bit function opcode encoding 708 for type 1 and 719 for type 2. The distribution of the type 1 encodings and the type 2 encodings generally is not evenly split depending upon an implementation requirements. The AL 16-bit type 1 instruction 706 may be used to specify arithmetic, logical, shift, bit manipulation, and the like operations, for example. The AL type 1 instruction 706 has no operand source or target operand address fields. The AL type 1 instruction 706 has a length bit 707 as the first bit, followed by a 4-bit function opcode field 708, a 3-bit data type (Dtype) field 709 is next which specifies various data type formats, such as packed 8-bit, 16-bit, 32-bit and the like formats and floating point formats, then in bits 0-7 are fields used to determine one or more operand input pipe registers (OIPRs) of selected destination instructions.

For a packet sequence of a function instruction (I0) followed by a sequence of instructions I1, I2, . . . , I7, a destination instruction may be an adjacent instruction I1 or one of the instructions I2-I7 following I1 in sequence. If one of the destination instructions is the current function instruction (I0), the current function instruction opcode may be encoded to indicate that the first destination instruction is I0, the second destination instruction is I1, and in the same manner up to the sixth destination instruction I6. Alternatively, the instructions may be encoded where the function instruction (I0) is followed by a sequence of instructions I0, I1, . . . , I6. In such situations, Table 1 below would be adjusted accordingly. Also, multiple destination instructions are identified according to the fields in bits 0-7, as indicated in Table 1 Selection column below.

TABLE 1

| Selection | Bit 6 | Bits 3-4 | Bits 0-1 |
|---|---|---|---|
| Select one | 1 = I1 | 00 = NU | 00 = NU |
| Select one | 0 = NU | 01 = I2, or 10 = I3, or 11 = I4 | NU |

TABLE 1-continued

| Selection | Bit 6 | Bits 3-4 | Bits 0-1 |
|---|---|---|---|
| Select one | NU | NU | 01 = I5, or 10 = I6, or 11 = I7 |
| Select two | I1 | I2, or I3, or I4 | NU |
| Select two | I1 | NU | I5, or I6, or I7 |
| Select two | NU | I2 | 01 = I3, or 10 = I4, or 11 = I5 |
| Select two | NU | I3 | 01 = I4, or 10 = I5, or 11 = I6 |
| Select two | NU | I4 | I5, or I6, or I7 |
| Select three | I1 | I2 | I3, or I4, or I5 |
| Select three | I1 | I3 | I4, or I5, or I6 |
| Select three | I1 | I4 | I5, or I6, or I7 |

In one embodiment, bit 7 710 indicates the destination OIPR for a first instruction I1, the instruction adjacent to function instruction I0, with bit 7=0 for $1^{st}$ OIP of I1 or with bit 7=1 for $2^{nd}$ OIP of I1. For the case where a destination of both the $1^{st}$ OIPR and $2^{nd}$ OIPR is needed, the result is written to a local file register using an alternative encoding of the instruction, such as shown in FIG. 7C. Bit 6 711 indicates whether I1 is used or not used (NU) with bit 6=0 for NU and bit 6=1 for used. Bit 5 712 indicates the destination OIPR for one of the instructions I2-I4 which are the instructions in sequence following instruction I1. With bit 5=0 for the $1^{st}$ OIPR and bit 5=1 for the $2^{nd}$ OIPR of the particular instruction I2-I4. Bits 3 and 4 713 in combination indicate a particular destination instruction to select; with bits 3-4=00=NU indicating I2-I4 are not used, bits 3-4=01 indicating instruction I2 is selected as a destination instruction, bits 3-4=10 indicating instruction I3 is selected as the destination instruction, and bits 3-4=11 indicating instruction I4 is selected as the destination instruction. Bit 2 714 equal to 0 for $1^{st}$ OIPR and bit 2=1 for $2^{nd}$ OIPR for a particular instruction I3-I7 determined by bits 0-1 715 relative to the selection of instructions I2-I4 by bits 3-4 713. For example for two destinations, if instruction I2 is selected by bits 3-4 as a first destination instruction, then the selection choice associated with bits 0 and 1 in combination with bits 3-4 is one of the instructions I3-I5. If the instruction I3 is selected by bits 3-4 as the first selection, then the selection choice associated with bits 0-1 is one of the instructions I4-I6. If the instruction I4 is selected by bits 3-4 as the first selection, then the selection choice associated with bits 0-1 is one of the instructions I5-I7. For other instruction destination combinations not covered by this particular embodiment, results from an execution unit would be encoded in an alternative instruction format, such as FIG. 7C below, to write the results to a local file.

It is noted that other embodiments using different encodings are feasible and not limited by the present exemplary encoding. By means of simulation or evaluation on an implementation, for example, requirements for encoding options associated with a particular set of programs may be determined. For example, for a specific set of programs, it is feasible that only two result destinations may need to be specified by an instruction and accordingly, a different encoding may be utilized which may be a subset of or cover additional encodings not listed in Table 1. In another embodiment, see FIG. 8E that illustrates a different destination instruction and OIPR selection encoding in bits 0-7, as described in further detail below.

The Wings processor architecture specifies, as defined herein, that whatever data is at the inputs, $1^{st}$ OIPR and $2^{nd}$ OIPR, to an AL unit at the start of an execution cycle that is the data received in the AL unit and operated on by the AL unit. The Wings processor architecture also specifies that the results of execution are available at the output of the AL unit at the end of the execution cycle or cycles. An AL instruction does not specify a target storage address in a central register file or a memory unit where the results may be stored unless a specific instruction encoding is created in the architecture to support such operation. In order to provide operands to an AL unit and store results from an AL unit, an AL instruction is paired with a load and a store instruction or other instruction or instructions that when executed provide source operands and take result operands for further processing or storage. The result of executing the AL 16-bit type 1 instruction 706 may be directed to a $1^{st}$ OIPR or a $2^{nd}$ OIPR of 1 or 2 or 3 instructions in the CEP as specified by the OIPR bits 710, 712, and 714 and the destination instruction I1-I7 specified by bit 6 and bits 3-4 and 0-1, as indicated in Table 1. It is noted that in another embodiment for an implementation having a single destination instruction which is specified to be adjacent to the sourcing instruction, bits 0-6 of the single destination instruction would not be required providing a function instruction encoding of nine bits.

FIG. 7C illustrates a Wings arithmetic/logic 16-bit type 2 instruction 717 in accordance with an embodiment of the present invention. The AL 16-bit type 2 instruction 717 may be used to specify arithmetic, logical, shift, bit manipulation, and the like operations, for example with a result stored in a specified local file (LF). The first bit is a length bit 718 set to 0 for a 16-bit instruction, followed by 4-bit opcode field 719, then a 3-bit data type (Dtype) 720 is next, followed by a 3-bit reserved field (Rsvd) 721, then a specification of a local file (LF) 722 within a row of execution units, for example, and a destination register Rt 723 in the specified LF 722. The Wings processor architecture specifies that whatever data is at the inputs, $1^{st}$ OIPR and $2^{nd}$ OIPR, to an AL unit at the start of an execution cycle that is the data received in the AL unit and operated on by the AL unit. The AL 16-bit type 2 instruction 717 specifies a destination storage address in one of the local files, such as local file (LF) 565 of FIG. 5B, which is part of a distributed register file where the results may be stored. The AL 16-bit type 2 instruction 717 result is directed to Rt0-Rt6 723 with Rt=7 reserved in a local file (LF) 722.

Figure 8A:
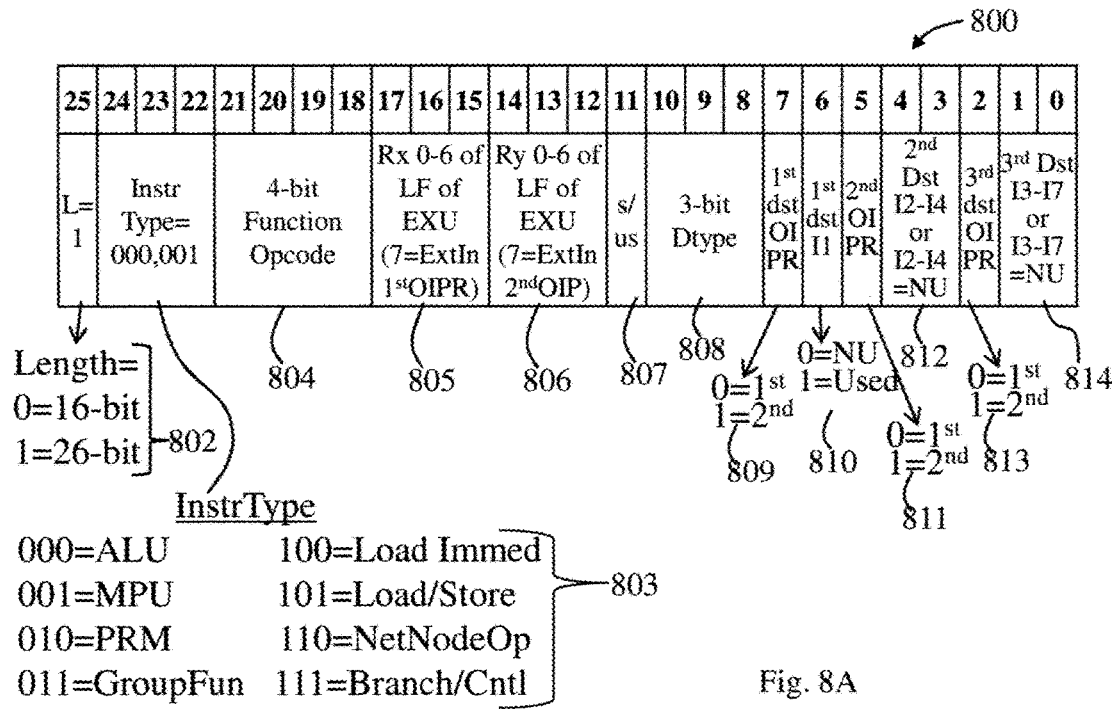
FIG. 8A illustrates a Wings arithmetic/logic 26-bit type 1 instruction in accordance with an embodiment of the present invention.

FIG. 8A illustrates a Wings arithmetic/logic 26-bit type 1 instruction 800 in accordance with an embodiment of the present invention. The AL 26-bit type 1 instruction 800 includes the length bit 802 in bit 25 set to a 1 indicating this instruction is a 26-bit instruction. Bits 22-24 encode an instruction type 803 as 000 to indicate an arithmetic logic unit (ALU) type instruction. Other instruction types include 001 for a multiply unit (MPU) type instruction, 010 for a permute move (PRM) type instruction, 011 for group function (groupfun) instructions as described in more detail with regard to FIGS. 8F-8I, 100 for a load immediate type instruction, 101 for a load or store type instruction, 110 for a network node operation (NetNodeOp) type instruction, and 111 for a branch type or program control type instruction. A 4-bit function opcode 804 in bits 18-21 allows the encoding of sixteen different functions. Bits 15-17 Rx 805 encode a source register address 0-6 selected from a local file (LF) associated with the execution unit for this particular instruction. Bits 15-17 Rx 805 encoded with a binary seven (111) indicate the input source data is to be selected from a $1^{st}$ OIPR. Bits 12-14 Ry 806 encode a source register address 0-6 selected from a local file (LF) associated with the execution unit for this particular instruction. Bits 12-14 Ry 806 encoded with a binary seven (111) indicate the input source data is to be selected from a $2^{nd}$ OIPR. Bit 11 s/us 807 is set to a one to indicate a signed data type and set to a zero to indicate an unsigned data type. Bits 0-10 814-808 are encoded in the same manner as bits 0-10 of the AL 16-bit type 1 instruction 706 of FIG. 7B and follow the instruction selection encoding illustrated in Table 1.

Figure 8B:
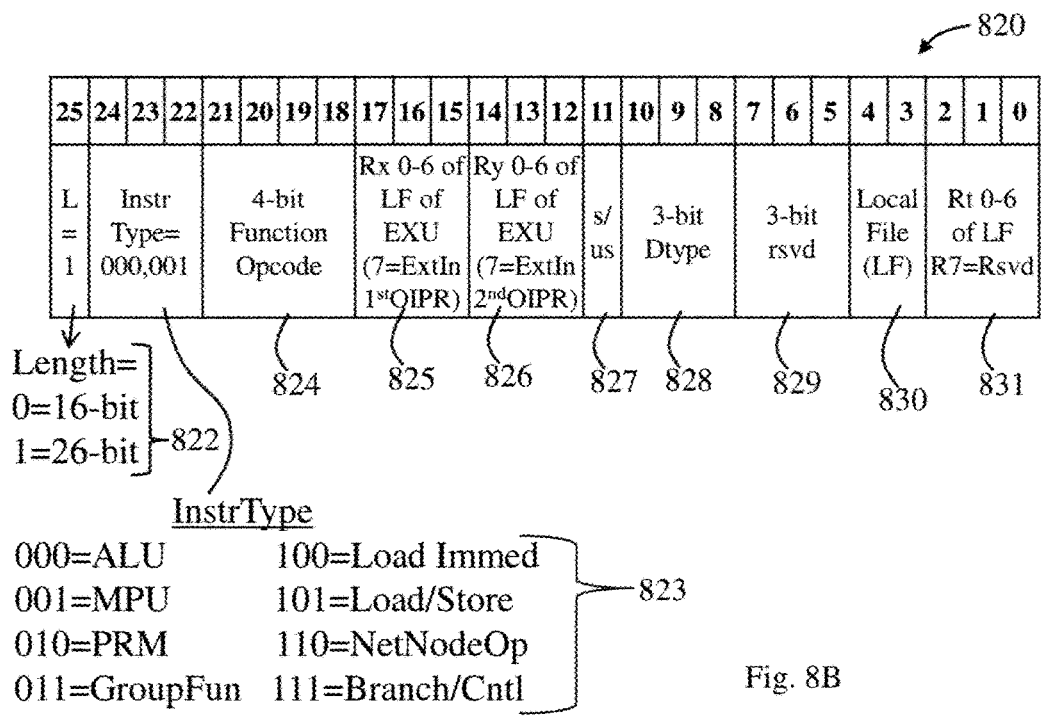
FIG. 8B illustrates a Wings arithmetic/logic 26-bit type 2 instruction in accordance with an embodiment of the present invention.

FIG. 8B illustrates a Wings arithmetic/logic (AL) 26-bit type 2 instruction 820 in accordance with an embodiment of the present invention. The AL 26-bit type 2 instruction 820 encodes bits 11-25 827-822 in the same manner as bits 11-25 807-802 of the AL 26-bit type 1 instruction 800 of FIG. 8A. Bits 0-10 831-828 of instruction 820 are encoded in the same manner as bits 0-10 723-720 of the AL 16-bit type 2 instruction 717 of FIG. 7C. It is noted that three reserved (rsvd) bits 829 are shown which may be used for other uses not described above, such as conditional selection, or to expand various bit fields, such as expanding the local file bits 830 from 2 bits to 4 bits to allow for specification to select any LF of sixteen LFs that may be connected in a local network, such as the twelve LFs shown if FIG. 5A with the third bit used to expand the 4-bit function opcode 824.

Figure 8C:
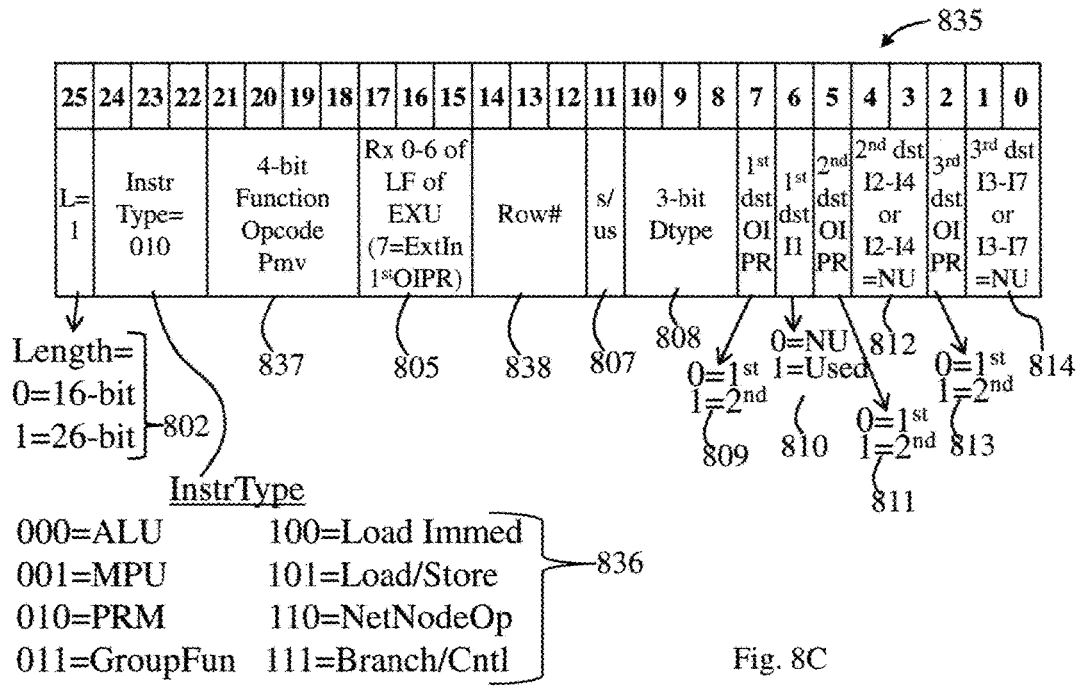
FIG. 8C illustrates a Wings permute 26-bit type 1 instruction in accordance with an embodiment of the present invention.

FIG. 8C illustrates a Wings permute 26-bit type 1 instruction 835 in accordance with an embodiment of the present invention. The permute 26-bit type 1 instruction 835 includes the length bit 802 in bit 25 set to a 1 indicating this instruction is a 26-bit instruction. Bits 22-24 encode an instruction type 836 as 010 to indicate a permute type instruction. A 4-bit function opcode 837 in bits 18-21 allows the encoding of sixteen different permute functions. Bits 15-17 Rx 805 encode a source register address 0-6 selected from a local file (LF) associated with the execution unit for this particular instruction. Bits 15-17 805 encoded with a binary seven (111) indicate the input source data is to be selected from $1^{st}$ OIPR. Bits 12-14 row#838 indicate a destination row # with bits 0-7 indicating a destination instruction for the specified destination row#838, as shown in Table 2 below for a four row system.

Execution of the permute instruction occurs within the network of execution units such as shown in FIG. 5A. FIG. 5A illustrates a second processor node 500 organized with a 4 row by three column arrangement of arithmetic logic units (As) in column zero 504, multiply accumulate units (Ms) in column one 506, and permute bit operation units ($P_BS$) in column two 508, in accordance with an embodiment of the present invention. Bits 0-11 814-807 specify the same functionality as described for the AL 26-bit type 1 instruction 800 of FIG. 8A.

TABLE 2

| Bits 12-14 | Rows Selected (Row #> 3 wraps, e.g. 4 wraps to 0) |
|---|---|
| 000 | Current Row i {0, 1, 2, 3} |
| 001 | Row i + 1 |
| 010 | Row i + 2 |
| 011 | Row i + 3 |
| 100 | Row i and Row i + 1 |
| 101 | Row i and Row i + 2 |
| 110 | Row i and Row i + 3 |
| 111 | Broadcast to Rows 0, 1, 2, 3 |

Figure 8D:
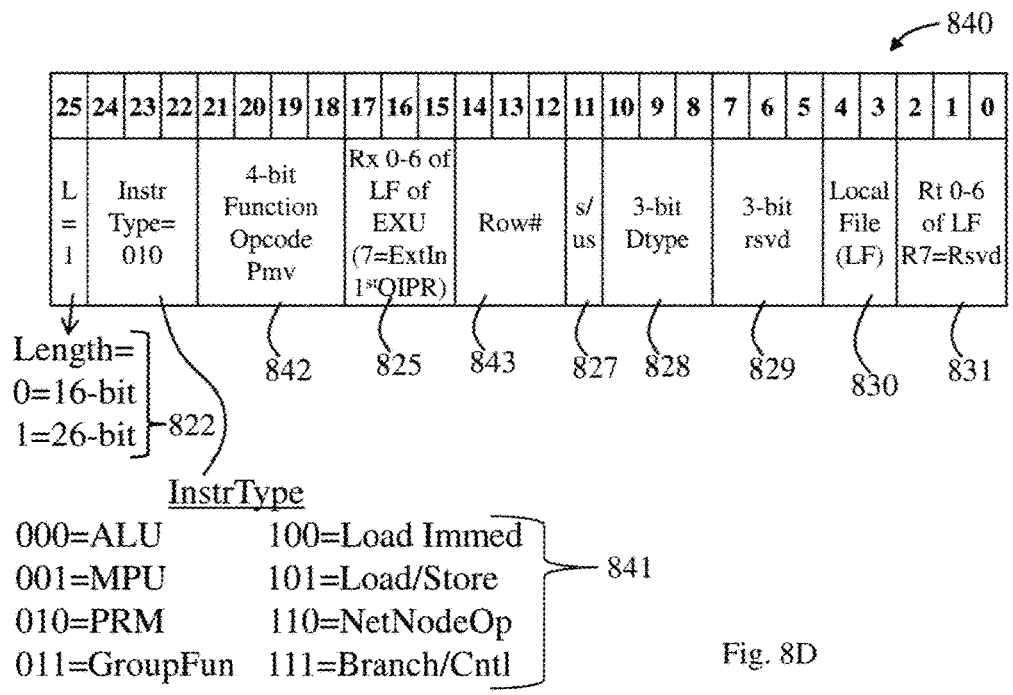
FIG. 8D illustrates a Wings permute 26-bit type 2 instruction in accordance with an embodiment of the present invention.

FIG. 8D illustrates a Wings permute 26-bit type 2 instruction 840 in accordance with an embodiment of the present invention. The permute 26-bit type 2 instruction 840 includes the length bit 822 in bit 25 set to a 1 indicating this instruction is a 26-bit instruction. Bits 22-24 encode an instruction type 841 as 010 to indicate a permute type instruction. A 4-bit function opcode 842 in bits 18-21 encodes sixteen different permute functions. Bits 15-17 Rx 825 encode a source register address 0-6 selected from a local file (LF) associated with the execution unit for this particular instruction. Bits 15-17 825 encoded with a binary seven (111) indicate the input source data is to be selected from $1^{st}$ OIPR. Bits 12-14 row#843 indicate a destination row # with bits 830 and 831 indicating the destination local file (LF), such as LF 565 of FIG. 5B, for the specified destination row. It is noted that three reserved (rsvd) bits 829 are shown which may be used for other uses not described above, such as conditional selection, or to expand various bit fields, such as expanding the local file bits 830 from 2 bits to 4 bits to allow a specification to select any LF of sixteen LFs that may be connected in a local network with the third reserved bit used to expand the 4-bit function opcode 842. Bits 11 827 and 8-10 828 specify the same functionality as described for the AL 26-bit type 2 instruction 820 of FIG. 8B.

Figure 8E:
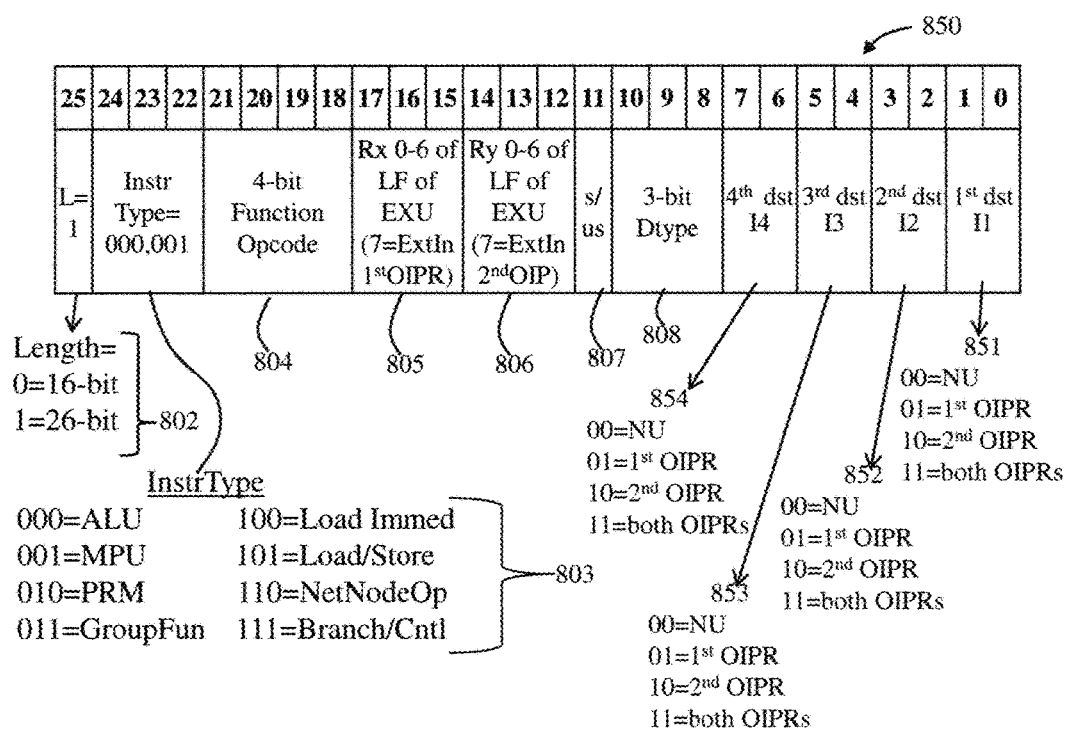
FIG. 8E illustrates a Wings arithmetic/logic 26-bit type 1 instruction with variation on instruction adjacency and oper- and input pipe register (OIPR) selection in accordance with an embodiment of the present invention.

FIG. 8E illustrates a Wings arithmetic/logic 26-bit type 1 instruction 850 with variation on instruction adjacency and operand input pipe register (OIPR) selection in accordance with an embodiment of the present invention. Bit 25 802 through bit 11 807 have the same specification as described above with regard to FIG. 8A. A 3-bit data type (Dtype) 808 specifies various data type formats, such as packed 8-bit, 16-bit, 32-bit and the like formats and floating point formats. The AL instruction result may be directed to a $1^{st}$ OIPR or a $2^{nd}$ OIPR of 1 or 2 or 3 or 4 instructions in a CEP as specified by bits 0-7 851-854, as indicated in Table 3.

TABLE 3

| Selection | Bits 0, 1 | Bits 2, 3 | Bits 4, 5 | Bits 6, 7 |
|---|---|---|---|---|
| Select one | I1 | I2 = 00 | I3 = 00 | I4 = 00 |
| Select one | I1 = 00 | I2 | I3 = 00 | I4 = 00 |
| Select one | I1 = 00 | I2 = 00 | I3 | I4 = 00 |
| Select one | I1 = 00 | I2 = 00 | I3 = 00 | I4 |
| Select two | I1 | I2 | I3 = 00 | I4 = 00 |
| Select two | I1 | I2 = 00 | I3 | I4 = 00 |
| Select two | I1 | I2 = 00 | I3 = 00 | I4 |
| Select two | I1 = 00 | I2 | I3 | I4 = 00 |
| Select two | I1 = 00 | I2 | I3 = 00 | I4 |
| Select two | I1 = 00 | I2 = 00 | I3 | I4 |
| Select three | I1 | I2 | I3 | I4 = 00 |
| Select three | I1 | I2 | I3 = 00 | I4 |
| Select three | I1 | I2 = 00 | I3 | I4 |
| Select three | I1 = 00 | I2 | I3 | I4 |
| Select four | I1 | I2 | I3 | I4 |

Each destination instruction is independently encoded allowing the combinations of destinations instructions shown in Table 3. Each destination instruction 851-854 may be encoded to not used (NU=00), use a $1^{st}$ OIPR=01, use a $2^{nd}$ OIPR=10, or use both OIPRs=11. For other combinations, such as requiring a destination instruction greater than I4, such as I5, I6, and the like, an alternative instruction that directs results to be written to a local file register may be used.

In another embodiment of the invention, two or more group function instructions are implemented in a small chain of instructions placed in pre-specified locations, such as adjacent to each other in a program instruction sequence. As each instruction in the group is executed, except for the last instruction in the group, control information and results are passed from one instruction to the next instruction in the group. With a group of two instructions, after the first instruction in the group executes, control information from the first instruction and a result of executing the first instruction are made available at the output of that particular execution unit at the end of the execution cycle. Also, multiple results may be generated by the execution of the first instruction and, in this case, the multiple results are made available at the output of that particular execution unit at the end of the execution cycle, as described in more detail below. Data that is at the inputs, such as a $1^{st}$ OIPR and a $2^{nd}$ OIPR for the next instruction specified execution unit, at the start of the second instruction's execution cycle is the data received in that particular execution unit and operated on by that execution unit. The first instruction in the chain of instructions does not specify a target storage address in a central register file or a memory unit where the result/s may be stored unless a specific instruction encoding is created in the architecture to support such operation. In order to provide operands to an execution unit and store results from an execution unit, a group function instruction may be paired with a load as a first instruction, the function instruction as a second instruction, and with a store instruction as the third instruction or other such instruction or instructions to provide source operands and to take result operands for further processing or storage, for example. The final instruction result may be directed to a $1^{st}$ OIPR or a $2^{nd}$ OIPR of 1 or 2 or 3 instructions, for example, in the CEP as specified by the OIPR bits 710, 712, and 714 and the destination instruction I1-I7 specified by bit 6, bits 3-4, and bits 0-1, as indicated in Table 1. It is noted that in another embodiment for an implementation having a single destination instruction which is specified to be adjacent to the sourcing instruction, bits 0-6 of the single destination instruction would not be required providing a function instruction encoding of nine bits which would allow various other bit fields to be expanded in a 16-bit instruction format. Also, the bits 0-6 of the single destination instruction may be used for other purposes as described in further detail below.

Figure 8F:
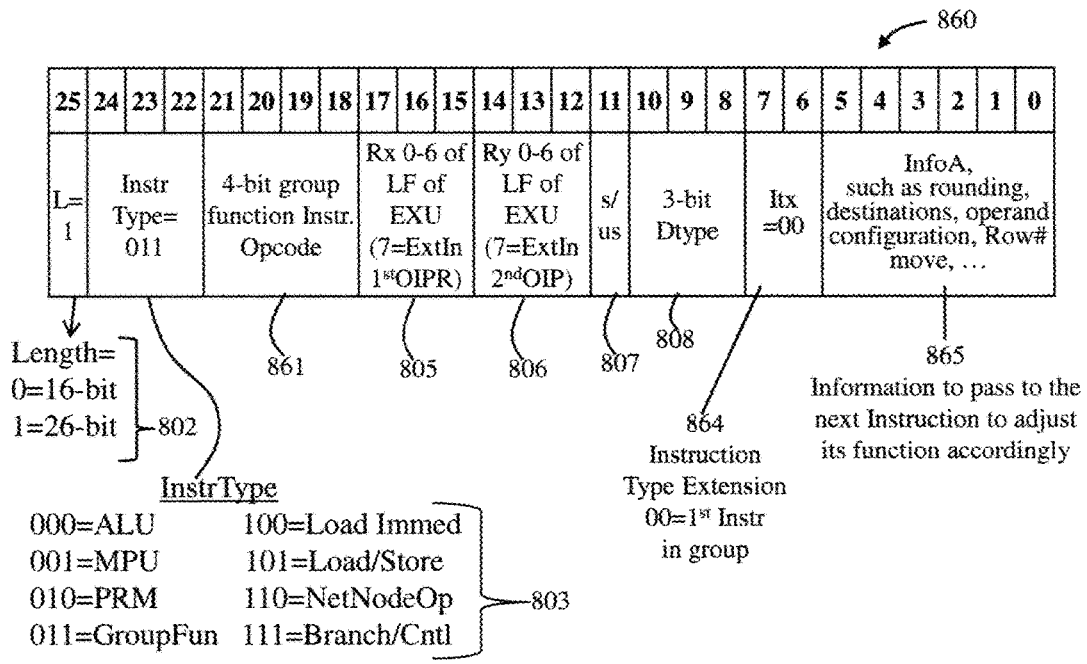
FIG. 8F illustrates a first group function instruction for a first instruction in a group of instructions in accordance with the present invention.

FIG. 8F illustrates a first group function instruction 860 for the first instruction in a group of instructions in accordance with the present invention. The first group function (groupfun) instruction 860 is shown with bits 8-17 and bit 25 the same as bits 8-17 and bit 25 of the Wings arithmetic/logic 26-bit type 1 instruction 800 of FIG. 8A. In FIG. 8F, the instruction type field 803 is set to 011 to indicate a group function (groupfun) instruction. The four bit group function instruction opcode 861 may include the same opcodes as covered in other arithmetic instructions, or a sub set of opcodes of the other arithmetic instructions and new opcodes specifically for the groupfun instruction 860, or all new opcodes specifically for the groupfun instructions. For example, a multiplication instruction may be encoded in bits 8-21 and bit 25 of both the instruction 800 of FIG. 8A and the instruction of FIG. 8F.

The bits 0-7 in the groupfun instruction 860 are defined differently than the Wings arithmetic/logic 26-bit type 1 instruction 800 of FIG. 8A. The groupfun instruction 860 uses an instruction type extension (Itx) field 864, shown as bits 6 and 7, though not limited to two bits. For an instruction set architecture where the groupfun instructions only include two instructions in sequence, a single bit may be used for the Itx field, for example. The groupfun instruction 860 also uses an information A (InfoA) field 865, shown as bits 0-5, though not limited to these particular 6 bits. The InfoA field 865 is used to pass information included in bits 0-5 of the groupfun instruction 860 to a pre-specified destination instruction or pre-specified destination instructions, such as the next adjacent instruction, an instruction following the next adjacent instruction, or two or more pre-specified destination instructions. For example, the pre-specified destination instruction is placed in a sequence of instructions at a pre-specified location relative to the groupfun instruction 860, such as adjacent to the groupfun instruction 860. The InfoA field 865 may also define the pre-specified destination instructions to be the recipients of results transferred to operand input pipeline registers of the pre-specified destination instruction or pre-specified destination instructions. Pre-specified means by definition as defined for an instruction in an instruction set architecture. Also, two bits in an instruction, such as bits 4 and 5 of InfoA field 865 may be defined to have a first state, such as "01" to indicate a first pre-specified destination instruction, such as a first instruction adjacent to the first groupfun instruction 860, and a "10" indicate a second pre-specified destination instruction, such as a second instruction adjacent to the first instruction, and "11" indicate two pre-specified destination instructions to include both the first instruction and the second instruction.

When the first groupfun instruction 860 is received and decoded, a hardware circuit recognizes the Itx field 864 is set to "00" indicating that this instruction is the first instruction in a groupfun and the information field 865 contains information that is to be passed to the pre-specified destination instruction. The execution of the first groupfun instruction 860, causes an indicator to be set, for example, to trigger the pre-specified destination instruction after the groupfun instruction 860 to receive the information passed from bits 0-5 865 of the groupfun instruction 860. The information from bits 0-5 865 is stored in a pending register which, for example, may be tagged. The stored information in the pending register is accessed by the second groupfun instruction when it is decoded or when operands are fetched for the second groupfun instruction. The stored information in the pending register can also be accessed at the beginning of execution for the second groupfun instruction if the information stored is generally used during the execution stage, such as is the case for rounding of results generated by the execution of the second groupfun instruction. The information passed may be additional function specifications, such as a selected rounding mode, information on how many input operands are being received, order of multiple input operands if order is important for an execution operation, such as subtraction, additional information to configure the execution unit for the type of addition, subtraction, division by two, additional data type information, or the like. The information that is passed is used to adjust the execution of the pre-specified destination instruction accordingly.

Figure 8G:
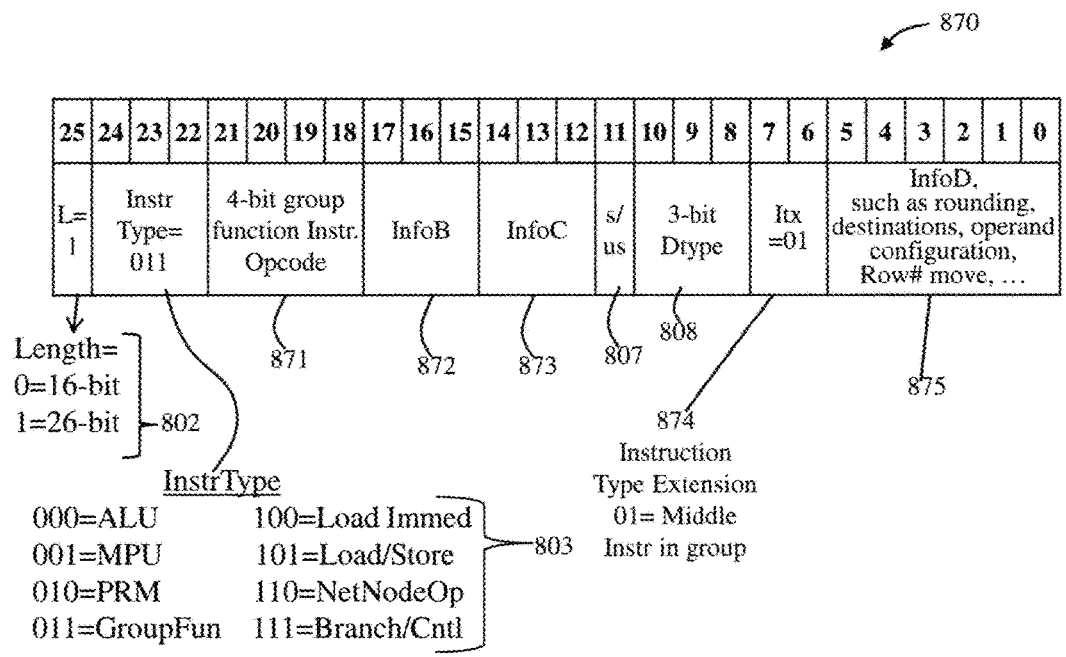
FIG. 8G illustrates a second group function instruction for a middle instruction within a group of instructions in accordance with the present invention.

FIG. 8G illustrates a second group function instruction 870 for a middle instruction within a group of instructions in accordance with the present invention. The second groupfun instruction 870 is shown with bits 8-11 and bit 25 the same as bits 8-11 and bit 25 of the Wings arithmetic/logic 26-bit type 1 instruction 800 of FIG. 8A. In FIG. 8G, the instruction type field 803 is set to 011 to indicate a group function (groupfun) instruction. The four bit group function instruction opcode 871 may include the same opcodes as covered in other arithmetic instructions, or a sub set of opcodes of the other arithmetic instructions and new opcodes specifically for the groupfun instruction, or all new opcodes specifically for the groupfun instructions. For example, an addition instruction may be encoded in both the instruction 800 of FIG. 8A and the instruction 870 of FIG. 8G.

The bits 0-7 and the bits 12-17 in the second groupfun instruction 870 are defined differently than the Wings arithmetic/logic 26-bit type 1 instruction 800 of FIG. 8A. The groupfun instruction 870 uses an instruction type extension (Itx) field 874, shown as bit 6 and bit 7, though not limited to two bits. The instruction 870 also uses an information field 875, shown as bits 0-5, though not limited to these particular 6 bits.

When the second groupfun instruction 870 is received and decoded, the hardware circuit recognizes the Itx field 874 is set to "01" indicating that this instruction is a middle instruction in group of three instructions or is one of the middle instructions in a group having more than three instructions. The second groupfun instruction 870 includes additional bit fields for information B (InfoB) 872, information C (InfoC) 873, and information D (InfoD) 875.

The execution of the second groupfun instruction 870, causes an indicator to be set, for example, to trigger the next instruction after the groupfun instruction 870 to receive the information passed from the InfoB 872, InfoC 873, and InfoD 875 of the groupfun instruction 870. The information passed by the second groupfun instruction 870 may include additional function specifications beyond that passed by the InfoA field 865 of the first groupfun instruction 860. For example, InfoB 872 may be combined with InfoD 875 to include a signed 9-bit immediate constant, specify a local file (LF) and a LF register specification of an additional operand, or the like. InfoC 873 may include a row#, such as the row#838 of FIG. 8C or additional information pertinent to the execution of the groupfun instruction. The information that is passed is used to adjust the execution of the pre-specified destination instruction accordingly.

Figure 8H:
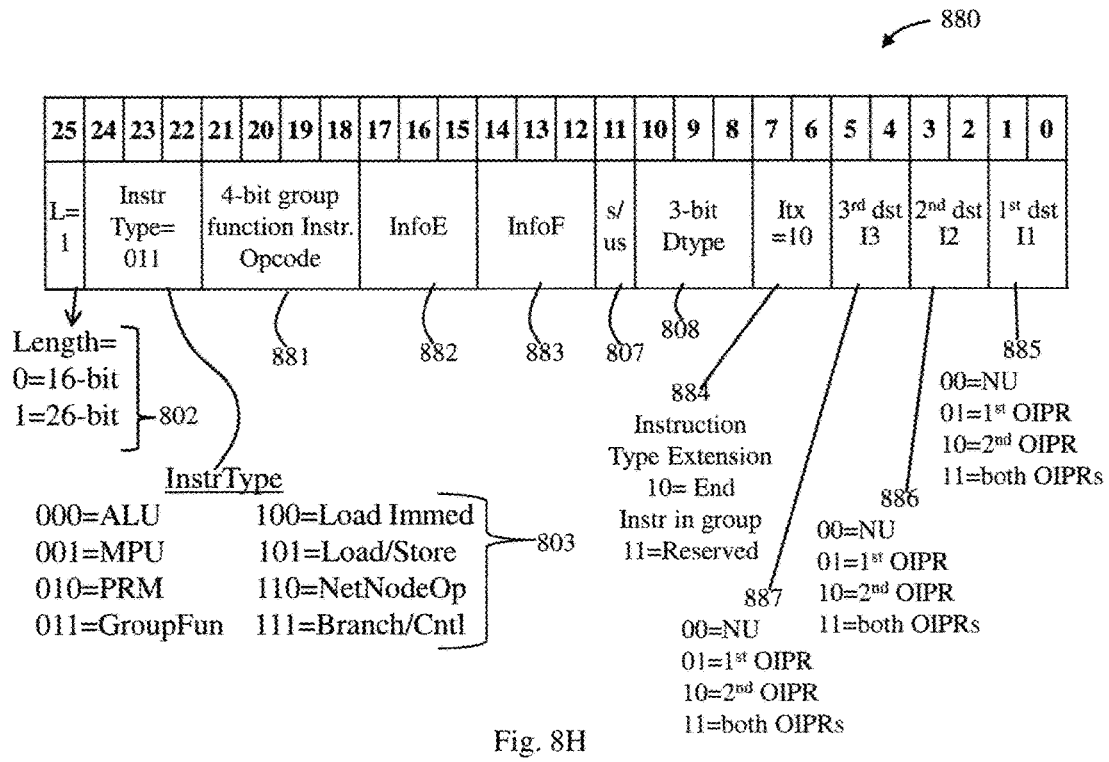
FIG. 8H illustrates a third group function instruction for an end instruction of a group of instructions in accordance with the present invention.

FIG. 8H illustrates a third groupfun instruction 880 for an end instruction of a group of instructions in accordance with the present invention. The third groupfun instruction 880 is shown with bits 8-11 and bit 25 the same as bits 8-11 and bit 25 of the Wings arithmetic/logic 26-bit type 1 instruction 800 of FIG. 8A. In FIG. 8H, the instruction type field 803 is set to 011 to indicate a group function (groupfun) instruction. The four bit group function instruction opcode 881 may include the same opcodes as covered in other arithmetic instructions, or a sub set of opcodes of the other arithmetic instructions and new opcodes specifically for the groupfun instruction, or all new opcodes specifically for the groupfun instructions. For example, an addition instruction may be encoded in both the instruction 800 of FIG. 8A and the instruction 880 of FIG. 8H.

The bits 0-7 and the bits 12-17 in the third groupfun instruction 880 are defined differently than the Wings arithmetic/logic 26-bit type 1 instruction 800 of FIG. 8A. The groupfun instruction 880 uses an instruction type extension (Itx) field 884, shown as two bits 6 and 7, though not limited to two bits. The Itx field 884 is set to "10", for example, indicating it is the ending instruction in the group. For an instruction set architecture where the groupfun instructions only include two instructions, a single bit may be used for the Itx field, for example. The instruction 880 also uses bits 0-5 in a same manner as bits 0-5 of instruction 850 of FIG. 8E, though not limited to these particular 6 bits.

When the third groupfun instruction 880 is received and decoded, the hardware circuit recognizes the Itx field 884 is set to "10" indicating that this instruction is the last instruction in group of two or more instructions. The third groupfun instruction 880 includes additional information E (InfoE) 882 and information F (InfoF) 883 for use in execution of the third groupfun instruction 880.

The execution of the third groupfun instruction 880 receives the information passed from the InfoB 872, InfoC 873, and InfoD 875 of the second groupfun instruction 870, for example in a group comprising three or more group instructions. In a group comprising two groupfun instructions, the execution of the third groupfun instruction 880 receives the information passed from the InfoA field 865 of the first groupfun instruction 860, for example. The information passed by the first groupfun instruction 860 or the second groupfun instruction 870 may include additional function specifications. For example, InfoB 872 may be combined with InfoD 875 to include a signed 9-bit immediate constant, specify a local file (LF) and a LF register specification of an additional operand, or the like. InfoC 873 may include a row#, such as the row#838 of FIG. 8C or additional information pertinent to the execution of the groupfun instruction. The information that is passed is used to adjust the execution of the next instruction accordingly.

Figure 8I:
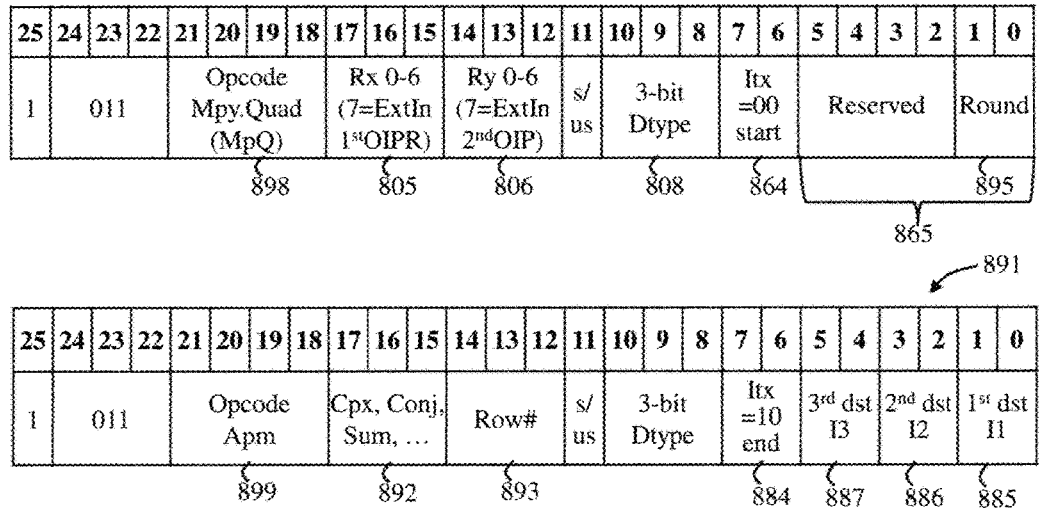
FIG. 8I illustrates an exemplary multiply complex function that is implemented in a group of two group function instructions using a first group function instruction and a second group function instruction having the formats as show in FIGS. 8F and 8H, respectively, in accordance with the present invention.

FIG. 8I illustrates an exemplary multiply complex function that is implemented in a group of two group function instructions using a first group function instruction 890 and a second group function instruction 891 having the formats as show in FIGS. 8F and 8H, respectively, in accordance with the present invention. The first group function instruction 890 is defined with a single pre-specified destination instruction being the next adjacent instruction. Other bits in the InfoA field 865 may be used to identify additional pre-specified destination instructions. The first group function instruction 890 specifies four multiplications of four operands. For complex data, a first complex operand to be received includes a first real value and a first imaginary value, and a second complex operand to be received includes a second real value, and a second imaginary value. The first complex operand may be received by a multiplication unit from a $1^{st}$ operand input pipe register (OIPR), if bits 15-17 805 of the first group function instruction are set to all 1's, a decimal 7 value, or from a register, R0-R6 identified in bits 15-17 805, in a local file associated with the execution unit for this instruction. The second complex operand may be received from a $2^{nd}$ OIPR, if bits 12-14 806 are set to all 1's, a decimal 7 value, or from a register, R0-R6 identified in bits 12-14 806, in the local file associated with the execution unit for this instruction.

The first group function instruction 890 specifies four multiplications including the first real value times the second real value, the first real value times the second imaginary value, the first imaginary value times the second real value, and the first imaginary value times the second imaginary value. For example, with each operand input data value, encoded in the 3-bit Dtype field 808 as a 16-bit value, each of the multiplications will produce a 32-bit result. By definition of the first group function instruction 890, the four 32-bit results are transferred across a local network, such as the exemplary 4×3 interconnection network having a 1 to 3 level adjacency as shown in FIG. 4, and stored in operand input pipe registers associated with the destination instruction which is the second groupfun instruction 891. The first real value times the second real value result is stored in a $1^{st}$ OIPR, the first real value times the second imaginary value result is stored in a $2^{nd}$ OIPR, the first imaginary value times the second real value result is stored in a $3^{rd}$ OIPR, and the first imaginary value times the second imaginary value result is stored in a $4^{th}$ OIPR of the execution unit associated with the second group function instruction 891. The $1^{st}$ OIPR and $2^{nd}$ OIPR values may be stored in external input storage 566 of FIG. 5B. The $3^{rd}$ OIPR and $4^{th}$ OIPR values may be stored in the second external input storage 576. An information A field 865 specifies a rounding mode 895 encoded in, for example, bits 0-1 of the information field 865. The information from bits 0-5 865 is stored in a pending register which, for example, may be tagged. The stored information in the pending register is accessed by the second groupfun instruction 891 when it is decoded or when operands are fetched for the second groupfun instruction 891. The infoA field 865 may be transferred across the local network between execution units by extending the width of the local network to accommodate the additional infoA field 865, for example.

The second group function (groupfun) instruction 891 specifies two ALU operations on the four input operands. The opcode 899 specifies the number of incoming operands. An opcode extension field 892 is provided in bits 17-15. The opcode extension field 892 may encode a complex (cpx) operation, a conjugate (conj) operation, a summation (sum) operation, and the like. Also, a row field 893 is provided in bits 14-12 which is used to specify a distribution of results to one or more different rows in the 4×3 interconnection network. In a first ALU operation, the $4^{th}$ OIPR value is subtracted from the $1^{st}$ OIPR value with the result rounded according to the rounding mode 895 from the first groupfun instruction 890 to generate a final real result. In a second ALU operation, the $2^{nd}$ OIPR value is added to the $3^{rd}$ OIPR value with the result rounded according to the rounding mode 895 specified in the first groupfun instruction 890 to generate a final imaginary result. The final real result and the final imaginary result are then treated as a single complex result which may be directed to a $1^{st}$ OIPR or a $2^{nd}$ OIPR of 1 or 2 or 3 instructions in the CEP as specified by bits 0-5 885-887, as indicated in Table 3 for bits 0-5. Each destination instruction is independently encoded in bits 0-5 885-887 allowing the combinations of destinations instructions shown in Table 3 for bits 0-5. Each destination instruction 885-887 may be encoded to not used (NU=00), $1^{st}$ OIPR=01, $2^{nd}$ OIPR=10, and both OIPRs=11. For other combinations, such as requiring a destination instruction greater than I3, such as I5, I6, and the like, an alternative instruction that directs results to be written to a local file register should be used.

Figure 9A:
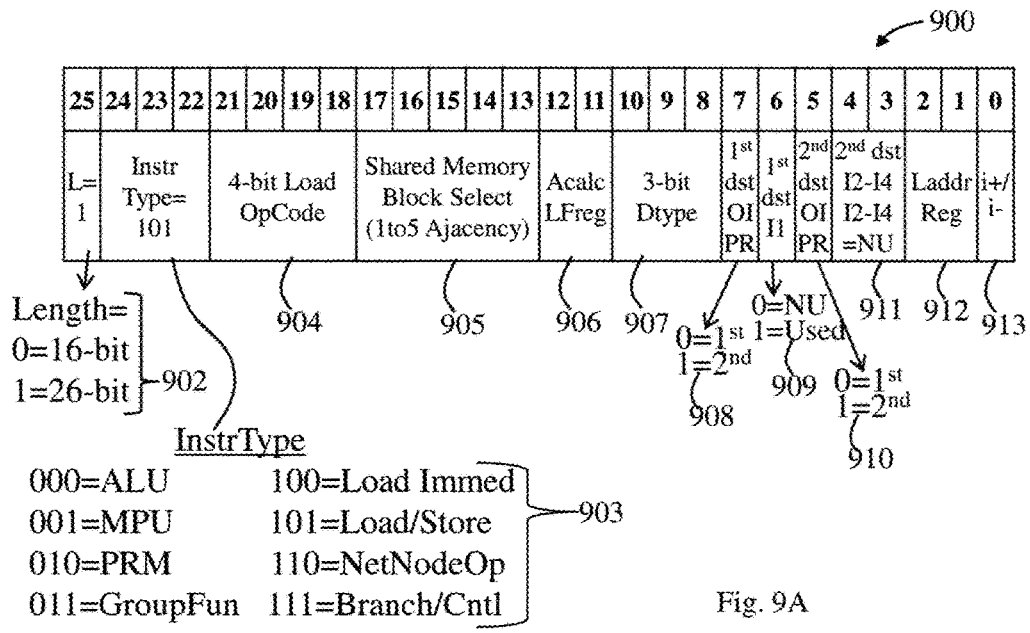
FIG. 9A illustrates a Wings load to instruction input port (LIP) 26-bit instruction in accordance with an embodiment of the present invention.

FIG. 9A illustrates a Wings load to instruction input port (LIP) 26-bit instruction 900 in accordance with an embodiment of the present invention. The LIP 26-bit instruction 900 includes the length bit 902 in bit 25 set to a 1 indicating this instruction is a 26-bit instruction. Bits 22-24 encode an instruction type 903 as 101 to indicate a load or store type instruction. A 4-bit load opcode 904 is encoded in bits 18-21 to indicate the type of load operation to be executed, such as a load PCrelative, load indirect, load indirect with increment, and the like.

A system memory may be partitioned among the memory blocks $M_{g,h}$ according to a G×H matrix where G=H=3 for the nine node processing system 300 shown in a 3D physical layout form in FIG. 3. Each processor $P_{g,h}$ and memory block $M_{g,h}$ are labeled in a row g by column h format where g∈{0,1,2} and h∈{0,1,2}. For example, in one embodiment, with each memory block, such as a static ram memory or a level 1 data cache (L1D$C), having a capacity of 1024 entries by 256 bits per cache line (1K×32 bytes), an address may be formatted based on a $M_{g,h}$ number, a calculated address, a row number, and word (w), halfword (h), or byte (b) specified in the least significant three bits, as shown in table 4.

In Table 4, the $M_{g,h}$ is determined by the number of nodes, such as for "g=3" rows and "h=3" columns with nine memory nodes, which would require a 4-bit field that would also

TABLE 4

| $M_{g,h}$ | Calculated address based on node capacity Row # | w, h, b (3 lsb) |
|---|---|---| support a "g=4" by "h=4" array of sixteen memory blocks. For larger arrays, a 6-bit $M_{g,h}$ field may be chosen supporting up to a "g=8" by "h=8" array of sixty four memory blocks and so forth. The row number field may also be adjusted for a particular implementation, such as for the nine node processing system 300 having a 3×3 node execution unit array or for the 4 row by 3 column execution array of FIG. 4, for which a 2-bit row # would suffice. Each 32-byte cache line could be organized by each row partitioned into four double words (8 bytes) for each row (row 0-row 3), for example. Alternative embodiments of memory addressing may also be used depending upon the application and implementation of the memory nodes.

The LIP 26-bit instruction 900 may be encoded to load from shared memories using the shared memory block select field 905. For a 1to3 adjacency connectivity network, each processor node may connect by means of the Wings network to nine memory blocks. By using a 1to5 adjacency connectivity network, each processor node may connect by means of the Wings network to twenty five memory block nodes. The shared memory block select field 905, also referred to as select field 905, is used to select a memory block that is to be the source of the data that is fetched by a load instruction.

Figure 9B:
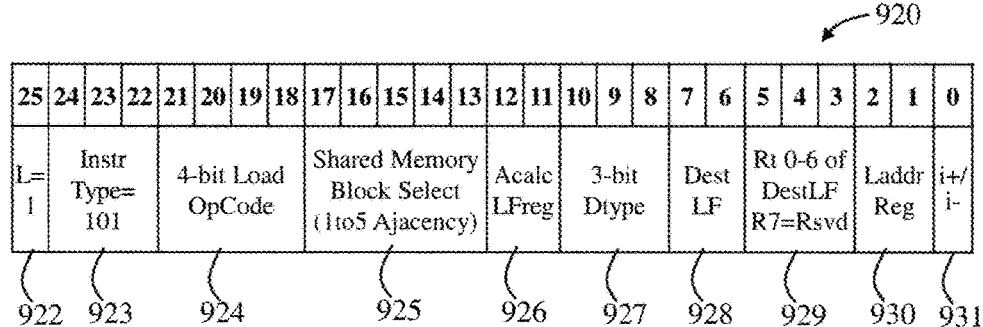
FIG. 9B illustrates a Wings load to a destination local register file (LLF) 26-bit instruction in accordance with an embodiment of the present invention.
Figure 9C:
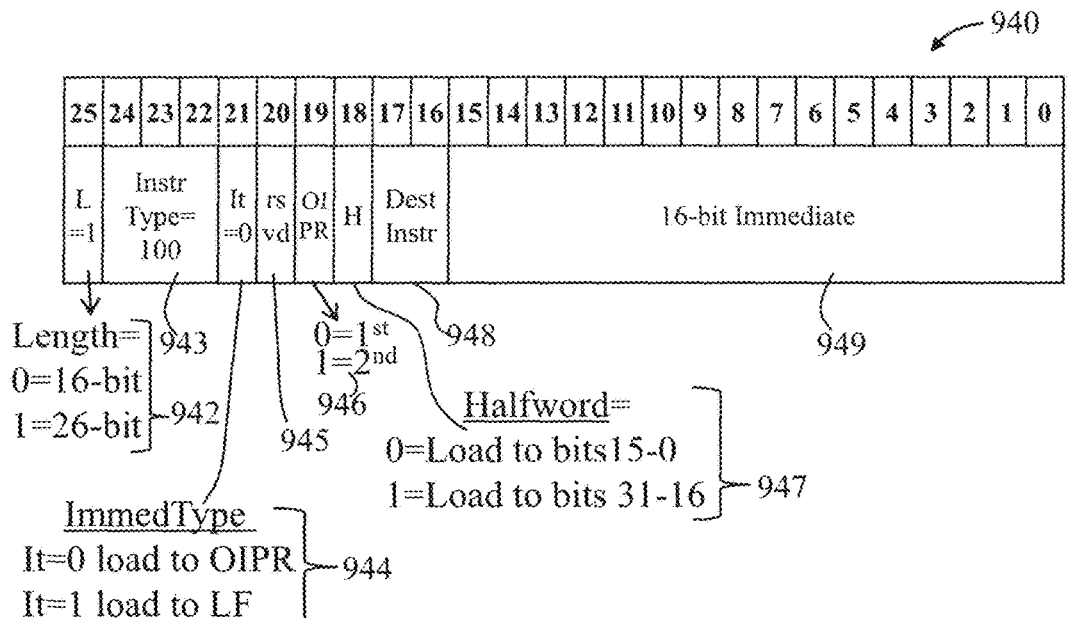
FIG. 9C illustrates a Wings load immediate to instruction input port (LIIP) 26-bit instruction in accordance with an embodiment of the present invention.
Figure 9D:
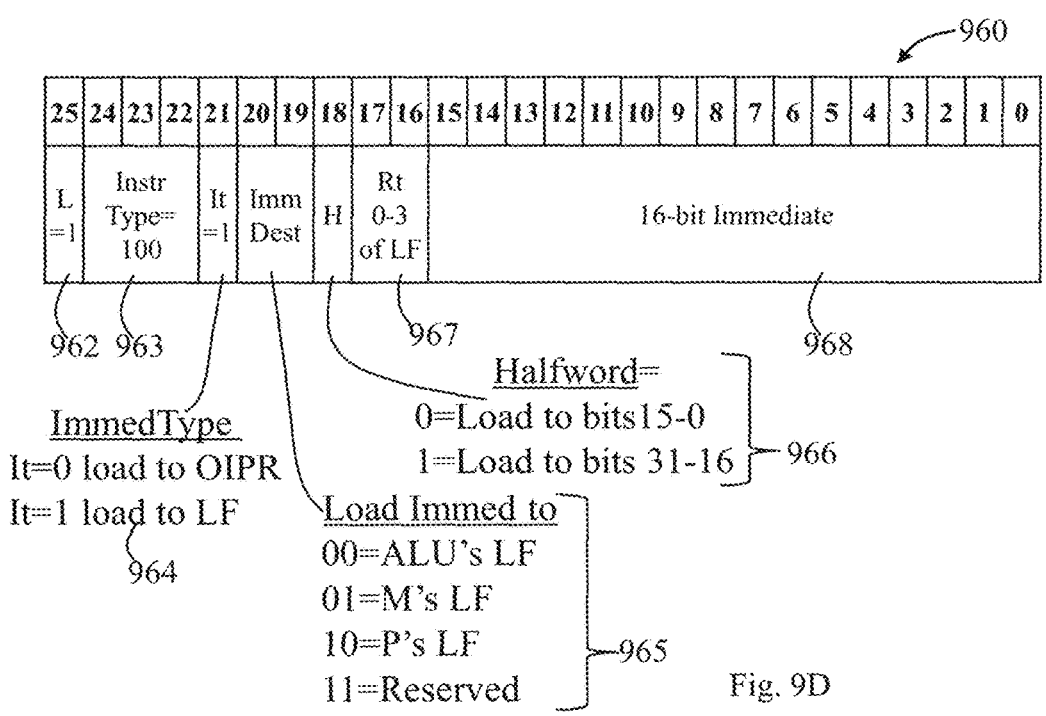
FIG. 9D illustrates a Wings load immediate to a destination local register file (LILF) 26-bit instruction in accordance with an embodiment of the present invention.
Figure 9E:
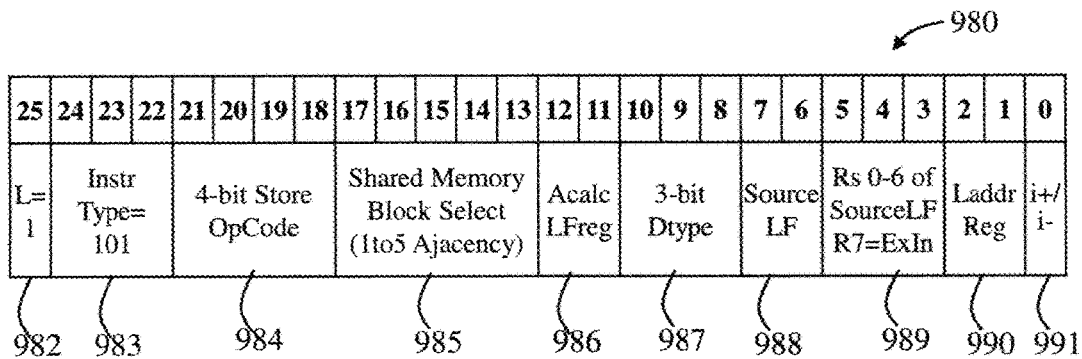
FIG. 9E illustrates a Wings store 26-bit instruction in accordance with an embodiment of the present invention.
Figure 9F:
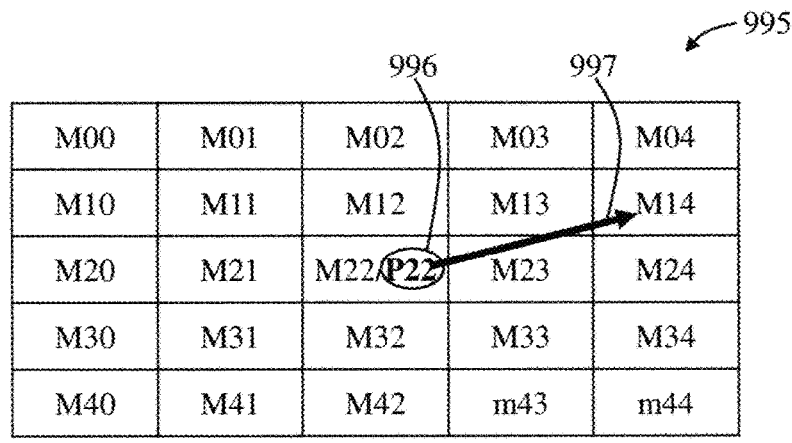
FIG. 9F illustrates a 5×5 array of memory blocks with a highlighted processor node P22 that selects a specified memory block as specified by a shared memory block select field in accordance with an embodiment of the present invention.

FIG. 9F illustrates a 5×5 array of memory blocks 995 with a highlighted processor node P22 996 that selects a specified memory block as specified by a shared memory block select field 905 in accordance with an embodiment of the present invention. An arrow 997 illustrates a selection by P22 of M14. An exemplary encoding of the shared memory block select field 905, also referred to as select field 905, for a 1to5 adjacency connectivity is shown in Table 5 below for a 5×5 or larger array of memory blocks. In Table 5, the Mg,h relative to M2,2 column indicates a horizontal movement of one or two steps followed by a vertical movement of one or two steps to reach the specified destination memory block to be selected. The network with 1to5 adjacency connectivity provides data paths to accomplish such horizontal and vertical movements.

The load operation fetches a data element at an address according to an increment amount, stride, hold information, and the like which may be encoded in various opcode dependent fields 906, 912, and 913 and interpreted according to a data type stored in Dtype 907.

TABLE 5

| Mem Select 905 | Select Mg, h | Mg, h relative to M2, 2 |
|---|---|---|
| 00000 | M2, 2 | zero |
| 00001 | M1, 2 | 1stepN |
| 00010 | M1, 3 | 1stepE, 1stepN |
| 00011 | M2, 3 | 1stepE |
| 00100 | M3, 3 | 1stepE, 1stepS |
| 00101 | M3, 2 | 1stepS |
| 00110 | M3, 1 | 1stepW, 1stepS |
| 00111 | M2, 1 | 1stepW |
| 01000 | M1, 1 | 1stepW, 1stepN |
| 01001 | M0, 2 | 2stepsN |
| 01010 | M0, 3 | 1stepE, 2stepsN |
| 01011 | M0, 4 | 2stepsE, 2stepsN |
| 01100 | M1, 4 | 2stepsE, 1stepN |
| 01101 | M2, 4 | 2stepsE |
| 01110 | M3, 4 | 2stepsE, 1stepS |
| 01111 | M4, 4 | 2stepsE, 2stepsS |
| 10000 | M4, 3 | 1stepE, 2stepsS |
| 10001 | M4, 2 | 2stepsS |
| 10010 | M4, 1 | 1stepW, 2stepsS |
| 10011 | M4, 0 | 2stepsW, 2stepsS |
| 10100 | M3, 0 | 2stepsW, 1stepS |
| 10101 | M2, 0 | 2stepsW |
| 10110 | M1, 0 | 2stepsW, 1stepN |
| 10111 | M0, 0 | 2stepsW, 2stepsN |
| 11000 | M0, 1 | 1stepW, 2stepsN |
| Other Encodings Reserved | | |

A data element fetched from the selected memory is loaded to an instruction input port OIPR for a particular destination instruction or instructions as specified by bits 3-7 908-911.

FIG. 9B illustrates a Wings load to a destination local register file (LLF) 26-bit instruction 920 in accordance with an embodiment of the present invention. The LLF 26-bit instruction 920 includes the length bit 922 in bit 25 set to a 1 indicating this instruction is a 26-bit instruction. Bits 22-24 encode an instruction type 923 as 101 to indicate a load or store type instruction. A 4-bit load opcode 924 is encoded in bits 18-21 to indicate the type of load operation to be executed, such as a load PCrelative, load indirect, load indirect with increment, and the like. The load operation fetches a data element according to information in various bit fields 925, 926, 930, and 931. For example, an address increment amount, stride, hold information, and the like may be encoded. The select field 925 is used to select a memory block that is to be the source of the data that is fetched by a load instruction. An exemplary encoding of the select field 925 for a 1to5 adjacency connectivity is shown in Table 5 for a 5×5 or larger array of memory blocks. The fetched data element is loaded to a selected destination LF 928 at a selected register address Rt 0-6 929, with R7 reserved.

FIG. 9C illustrates a Wings load immediate to instruction input port (LIIP) 26-bit instruction 940 in accordance with an embodiment of the present invention. The LIIP 26-bit instruction 940 includes the length bit 942 in bit 25 set to a 1 indicating this instruction is a 26-bit instruction. Bits 22-24 encode an instruction type 943 as 100 to indicate a load immediate instruction. An immediate type field 944 in bit 21 is set to 0 to indicate a load to an instruction input port (OIPR) of a destination instruction (Dest Instr) 948 and OIPR 946 set to a 0 for a $1^{st}$ OIPR and to a 1 for a $2^{nd}$ OIPR. Bit 20 945 is reserved. A 16-bit immediate data value 949 is encoded in bits 0-15 which is loaded to a low halfword (bits 15-0) or to a high halfword (bits 31-16) as specified by bit 18 H 947.

FIG. 9D illustrates a Wings load immediate to a destination local register file (LILF) 26-bit instruction 960 in accordance with an embodiment of the present invention. The LILF 26-bit instruction 960 includes the length bit 962 in bit 25 set to a 1 indicating this instruction is a 26-bit instruction. Bits 22-24 encode an instruction type 963 as 100 to indicate a load immediate instruction. An immediate type field 964 is set to a 1 to specify a load to a LF associated with a specified execution unit local file as specified by destination execution unit 965, bits 19 and 20. For example, a load immediate to "00" an ALU execution unit LF, to "01" a multiply execution unit (MPU) LF, to "10" to specify a load to a LF associated with a permute move unit ($P_B$), or to "11"

a reserved execution unit reference. A 16-bit immediate data value 968 is encoded in bits 0-15. The immediate data value 968 is loaded to the selected destination LF according to immediate type field 964 set to a "1" and to a low halfword (bits 15-0) or to a high halfword (bits 31-16) as specified by bit 18 'H' 966 at a selected register address Rt 0-3 967.

FIG. 9E illustrates a Wings store 26-bit instruction 980 in accordance with an embodiment of the present invention. The store instruction 980 includes the length bit 982 in bit 25 set to a 1 indicating this instruction is a 26-bit instruction. Bits 22-24 encode an instruction type 983 as 101 to indicate a load or store type instruction. A 4-bit store opcode 984 is encoded in bits 18-21 to indicate the type of store operation to be executed, such as a store PCrelative, store indirect, store indirect with increment, and the like. A data element is selected from a local file (LF) 988 at a selected source register address Rs 0-6 989, with R7 reserved to specify an external input data source. The store operation stores the data element at an address according to an address calculation based on LF register 986, local address register 990, and increment i+ or decrement i– 991. For example, an increment amount, stride, hold information, and the like may be encoded in the store instruction 980. A select field 985 is used to select a memory block as the destination of the data to be stored by a store instruction. An exemplary encoding for a 1to5 adjacency connectivity is shown in Table 5 for a 5×5 or larger array of memory blocks per P node. The data element is fetched from a selected source LF 988 at a selected register address Rs 0-6 989, with R7 reserved for specifying a data element received from an external input and stored at the selected memory block.

It is noted that rather than having both 16-bit instructions and 26-bit instructions mixed in a particular program, an embodiment of the architecture may be specified to support only 26-bit instructions. For such a 26-bit instruction set, bit 25 may be used for another purpose. In another embodiment, an architecture may be specified to support only 16-bit instructions and bit 15 used for another purpose. It is further noted that in another embodiment two bits are added for conditional execution, the 26-bit instructions in FIGS. 8A-8D, 9A-9E, 16, and 17 are formatted into 28-bit instructions. A two bit conditional execution field is defined as "00" execute unconditionally, "01, 10, and 11" indicate the instruction is to be conditionally executed based on a selected one of three special purpose conditional execution control registers. Alternatively, in another embodiment, bit 25 may be used as a single conditional execution bit field with a '0' indicating execute unconditionally and a '1' indicating execute conditionally based on a single special purpose conditional execution control register. Depending on requirements, other fields in one or more instruction type may be expanded or new fields added to expand the instruction format to larger formats, such as 30-bits or 32-bits.

Figure 10:
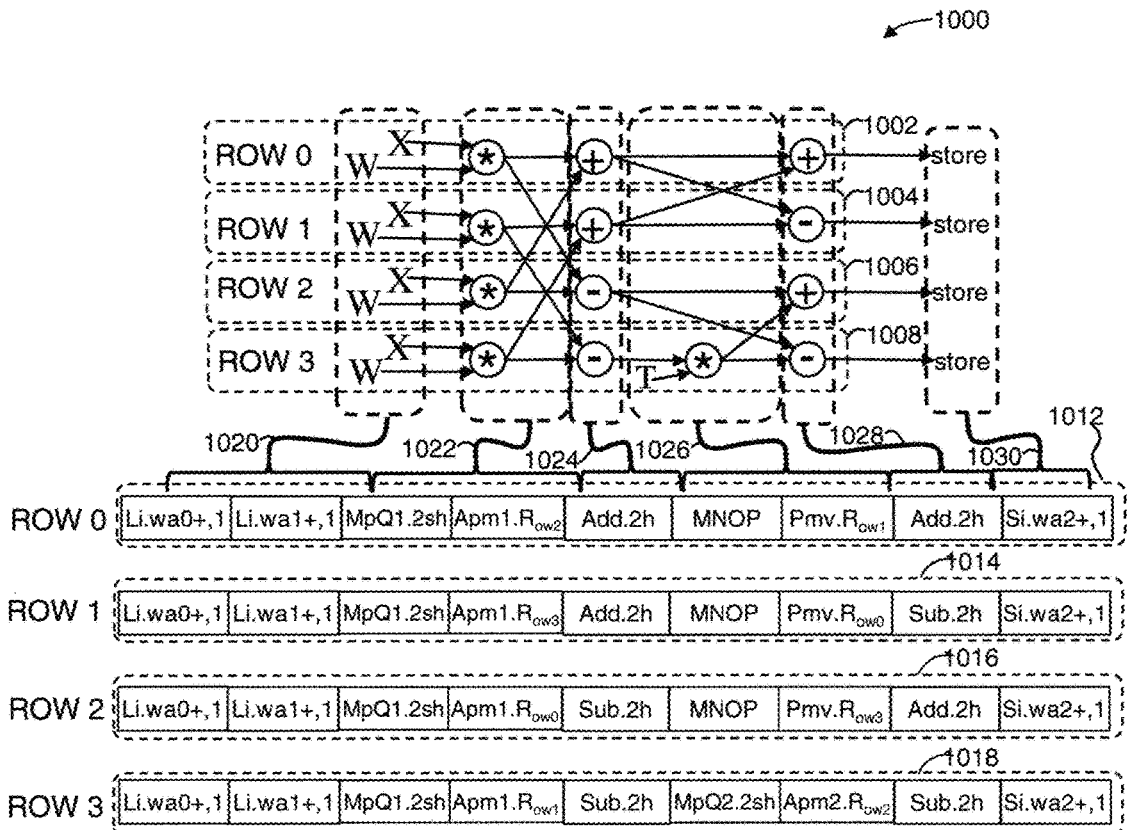
FIG. 10 illustrates the signal flow graph mapping of FIG. 6 expanded to include rows 0-3 and four CEPs in accordance with an embodiment of the present invention.

FIG. 10 illustrates a signal flow graph mapping 1000 of FIG. 6 expanded to include rows 0-3 and four CEPs in accordance with an embodiment of the present invention. In FIG. 10, row 0 1002 of the signal flow graph maps to row 0 CEP 1012, row 1 1004 maps to row 1 CEP 1014, row 2 1006 maps to row 2 CEP 1016, and row 3 1008 maps to row 3 CEP 1018. A column select 1020 identifies load instructions associated with each row to load the X and W values to the appropriate execution unit in each row. A column select 1022 identifies a first and a second groupfun instructions associated with each row to provide a complex multiplication and a move result function in each row. A column select 1024 identifies add or subtract instructions according to the row. For example, add operations are specified for row 0 and row 1 and subtract operations are specified for row 2 and row 3. A column select 1026 identifies a first and second groupfun instructions associated with row 3 and a multiplication no operation (MNOP) associated with rows 0-2. A column select 1028 identifies add or subtract instructions according to the row. For example add operations are specified for row 0 and row 2 and subtract operations are specified for row 1 and row 3. A column select 1030 identifies store instructions associated with each row.

The use of the CEPs without register file operand specifications and with reduced format instructions compresses instruction storage as well as save power. For example, 4*9 32-bit instructions requires 4*288-bits=1,152-bits of storage while 4*9 Wings instructions requires 4*(3*26-bit) load/store instructions plus 4*(1*26-bit) arithmetic instructions plus 4*(5*16-bit) arithmetic instructions which equals 736 bits for a savings of 416-bits in instruction memory. In an alternative embodiment, with all 26-bit instructions in a CEP, there is still a savings 54-bits per CEP and a savings of 216-bits for the four CEPs. Also, advantageously, the execution of the rows 0-3 CEPs 1012-1018 saves 28 register file write operations and 36 register file read operations for the execution of the four CEPs. In an alternative embodiment, 32-bit instructions may be used while still retaining the savings of power due to reduced register file accesses. In a fixed width architecture using for example 32-bit instructions only or 26-bit instructions only, the length bit in bit 25 of the 26-bit instructions shown in FIGS. 8A-8I and 9A-9E may be removed and the bit 25 used for other purposes.

FIG. 11 illustrates an assembler notation listing 1100 of instructions in row 3 CEP 1018 of FIG. 10 in accordance with an embodiment of the present invention. The Li.w a0+,1, Mg,h=0, 1OI2 instruction 1103 is a load indexed address instruction which causes a fetch of a word data value from memory Mg,h=0 at a memory address that is determined from address register "a0" that is incremented by "1" post operation. The mem select field 905 of FIG. 9A would be encoded with a zero to represent the memory block that is overlaid on the corresponding processor node. Table 5 also indicates other encodings for different memory block selections. The Li.w a0+,1 instruction 1103, being a source value generating instruction, is considered instruction zero as a reference point for determining destination instructions. The word data value fetched is directed to a $1^{st}$ OIPR of instruction 2 (1OI2). The Li.w a1+,1, Mg,h=0, 2OI1 instruction 1104 is another load indexed address instruction which causes a fetch of a word data value from memory Mg,h=0 at a memory address that is determined from address register "a1" that is incremented by "1" post operation. The word data value fetched is directed to a $2^{nd}$ OIPR of instruction 1, which indicates the destination instruction is adjacent to the Li.w a1+,1 instruction 1104. The MpQ1.2sh 1OI1,Rnd instruction 1105 is a first groupfun instruction, such as the first groupfun instruction 860 of FIG. 8F, which causes four results to be directed to the $1^{st}$, $2^{nd}$, $3^{rd}$, and $4^{th}$ OIPR of I1 of the second groupfun instruction 1106 that is adjacent to the first groupfun instruction. The MpQ1.2sh 1OI1,Rnd instruction 1105 also is encoded with infoA field 865 bits 0-5 containing rounding (Rnd) information to be used by the second groupfun instruction 1106. The Rnd information is stored in a pending storage, such as a pending register 1112, and delivered to the execution unit of the second groupfun instruction 1106 according to pipeline implementation requirements. The second groupfun instruction 1106 is an Apm1.R$_{ow1}$, 2OI1 instruction 1106 which provides a complex addition operation and causes a result to be directed to the $2^{nd}$ OIPR of I1 in row 1. The Sub.2h, 1OI1 instruction 1107 is a subtract instruction which subtracts the 2 results received and sends the subtraction result to the $1^{st}$ OIPR of instruction I1 (adjacent instruction). The MpQ2.2sh, 1O*MLFR0, 1OI1,Rnd instruction 1108 is another first groupfun instruction that causes a multiplication of the subtraction result, from executing instruction 1107, with the $1^{st}$ OIPR times a value T accessed from a multiplication unit local file register, such as register R0. The register R0 would contain the value T that was previously loaded. The multiplication results of executing instruction 1108 are sent to the $1^{st}$, $2^{nd}$, $3^{rd}$, and $4^{th}$ OIPR of I1 of the second groupfun instruction 1109. The MpQ2.2sh 1O*MLFR0, 1OI1,Rnd instruction 1108 also is encoded with infoA field 865 bits 0-5 containing rounding (Rnd) information to be used by the second groupfun instruction 1109. The Rnd information is stored in a pending storage, such as a pending register 1114, and delivered to the execution unit of the second groupfun instruction 1109 according to pipeline implementation requirements. The Apm2.$R_{ow2}$, 2OI1 instruction 1109, which is the second groupfun instruction, provides a complex addition operation and causes a result to be directed to the $2^{nd}$ OIPR of I1 in row 2. The Sub.2h, 1OI1 instruction 1110 is a subtract instruction which subtracts the two results received and sends the subtraction result to the $1^{st}$ OIPR of instruction I1 (adjacent store instruction). The Si.w a2+,1, Mg,h=0 instruction stores the received external input word to Mg,h=0.

FIG. 12A illustrates a pipeline diagram for Row 3 of the FFT signal flow graph of FIG. 10 in accordance with an embodiment of the present invention. In FIG. 12A, two load instructions 1202 correspond to the two load instructions in row 3 column select 1020 of FIG. 10. The groupfun instructions MpQ1||Apm1 1204 of FIG. 12A correspond to the groupfun instructions in row 3 column select 1022 of FIG. 10. The subtract (Sub1) instruction 1206 of FIG. 12A corresponds to the subtraction instruction in row 3 column select 1024 of FIG. 10. The groupfun instructions MpQ2||Apm2 1208 of FIG. 12A correspond to the groupfun instructions in row 3 column select 1026 of FIG. 10. The subtract (Sub2) instruction 1210 of FIG. 12A corresponds to the subtraction instruction in row 3 column select 1028 of FIG. 10. The store (Si.a2) instruction 1212 of FIG. 12A corresponds to the store instruction in row 3 column select 1030 of FIG. 10. The instruction sequence 1202-1212 is repeated to build a signal flow graph pipeline having a prolog stage 1220, body 1222 which repeats a set of instructions in parallel as illustrated in FIG. 12A, and an epilog stage 1224 which closes down the signal flow graph pipeline, not shown in order to more clearly focus on the prolog stage 1220 and body 1222.

FIG. 12B illustrates a pipeline diagram 1230 with instruction executions per cycle for the FFT signal flow graph of FIG. 10 in accordance with an embodiment of the present invention. The instruction execution cycles EX1-EX10 1241-1250, respectively, are listed across the first top row of the diagram 1230 with each labeled column representing an execution cycle. Each row of the signal flow graph of FIG. 10 is associated with its own pipeline. Row 0 pipeline 1232 is associated with row 0 1002 and row 0 CEP 1012 of FIG. 10. Row 1 pipeline 1234 is associated with row 1 1004 and row 1 CEP 1014. Row 2 pipeline 1236 is associated with row 2 1006 and row 2 CEP 1016. Row 3 pipeline 1238 is associated with row 3 1008 and row 3 CEP 1018.

The execution cycles for each row pipeline follow the same sequence, but each row in each cycle has either the same instruction type operating on different data or one or more different instruction types operating on different data.

The pipeline instruction execution sequence for row 0 CEP 1012 begins in cycle EX1 1241 with the execution of a LIP 26-bit instruction 900 (Li.w a0+,1) based on an address register "a0" with an increment of one to the address for the next execution. In cycle EX2 1242, a different LIP 26-bit instruction 900 (Li.w a1+,1) is executed based on an address register "a1" with an increment of one to the address for the next execution. In cycle EX3 1243, a first groupfun instruction (MpQ1.2sh) is executed in parallel with execution of another Li.w a0+,1 instruction which is part of the row 0 CEP 1012 execution. In cycle EX4 1244, an add permute move row 2 (Apm. $R_{ow2}$) instruction is executed in parallel with execution of the Li.w a1+,1 instruction. In cycle EX5 1245, an add.2h instruction is executed in parallel with execution of another MpQ1.2sh instruction and further in parallel with another Li.w a0+,1 which is part of the row 0 CEP 1012 execution. In cycle EX6 1246, a multiply no operation (MNOP) instruction is executed in parallel with execution of another Apm. $R_{ow2}$ instruction and in parallel with another Li.w a1+,1 instruction. In cycle EX7 1247, a permute (Pmv. $R_{ow1}$) instruction is executed in parallel with execution of another add.2h instruction in parallel with execution of another MpQ1.2sh instruction and further in parallel with another Li.w a0+,1 instruction which is part of the row 0 CEP 1012 execution. In cycle EX8 1248, an add.2h instruction is executed in parallel with another MNOP instruction, in parallel with another Apm. $R_{ow2}$ instruction, and further in parallel with another Li.w a1+,1 instruction. In cycle EX9 1249, a store indirect with increment instruction (Si.w a2+,1) is executed in parallel with another Pmv. $R_{ow1}$ instruction, in parallel with another add.2h instruction, in parallel with another MpQ1.2sh instruction, and further in parallel with another Li.w a0+,1 instruction which is part of the row 0 CEP 1012 fourth execution.

It is noted that in cycle EX8 1248 and in cycle EX9 1249 the list of instructions that execute in parallel begins to repeat starting with cycle EX10 repeating the instructions of cycle EX8 1248 and though not shown, cycle EX11 would repeat the instructions of cycle EX9 1249. The repetition of the two lists of instructions continues as a signal flow graph pipeline loop with the cycles EX1 1241 to cycle EX7 1247 representing a prolog of the signal flow graph pipeline loop. The sequence of instructions in the other row pipelines, row 1 pipeline 1234, row 2 pipeline 1236, and row 3 pipeline 1238 follows the same process as described for the row 0 pipeline with the exception that for the row 3 pipeline 1238. In the row 3 pipeline 1238, the multiply no operation (MNOP) instructions in the other pipelines is replaced by a second groupfun instruction (MpQ2.2sh) instruction. The constant T in row 3 1008 of the signal flow graph would be loaded as part of a set up series of instructions. In another embodiment, the constant T is forwarded to be associated with the MpQ2.2sh instruction and the constant T is then dispatched with the MpQ2.2sh instruction to an available execution unit as determined dynamically within the execution unit hardware. The MpQ2.2sh instruction and following Apm.$R_{ow1}$ instruction are described in more detail regarding the instruction 890 and the instruction 891 of FIG. 8I.

Figure 13A:
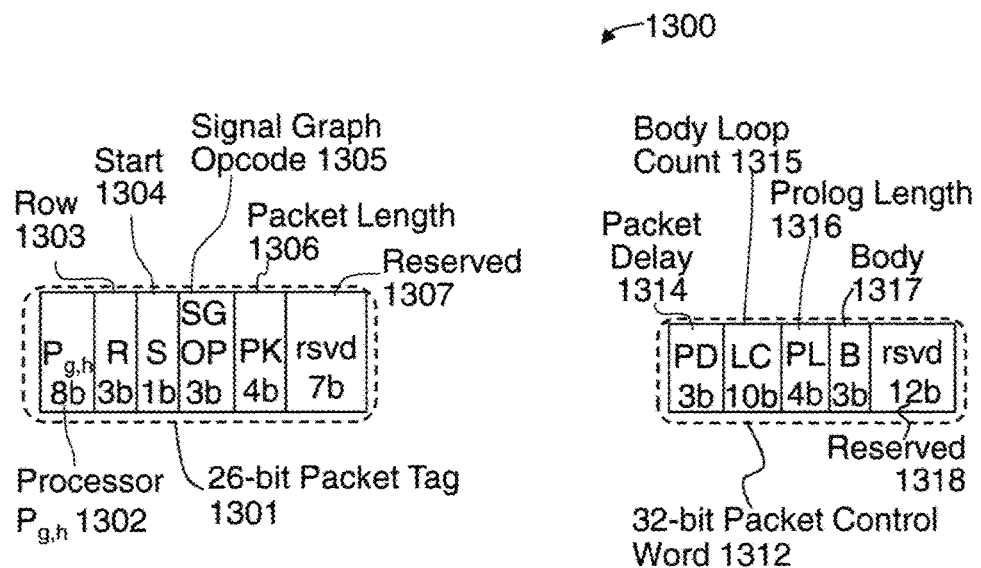
FIG. 13A illustrates control information split into an exemplary 26-bit packet tag that accompanies each CEP and an exemplary 32-bit packet control word in accordance with an embodiment of the present invention.

FIG. 13A illustrates control information 1300 split into an exemplary 26-bit packet tag 1301 that accompanies each CEP and an exemplary 32-bit packet control word 1312 in accordance with an embodiment of the present invention. The 26-bit packet tag 1301 is comprised of an identification of a processor ($P_{g,h}$) 1302 having 8-bits, a row number (R) 1303 having 3-bits, a single start bit (S) 1304, a signal graph opcode (SGOP) 1305 having 3-bits, a packet length (PK)

1306 having 4-bits, and a reserved field 1307 having 7-bits. The 32-bit packet control word 1312 is comprised of a packet delay (PD) 1314 having 3-bits, a body loop count (LC) 1315 having 10-bits, a prolog length (PL) 1316 having 4-bits, a body length (B) 1317 having 3-bits, and a reserved field 1318 having 12-bits. The 32-bit packet control word 1312 is loaded into a control register of a control unit to provide programmable control information to control pipelining as described herein.

Figure 13B:
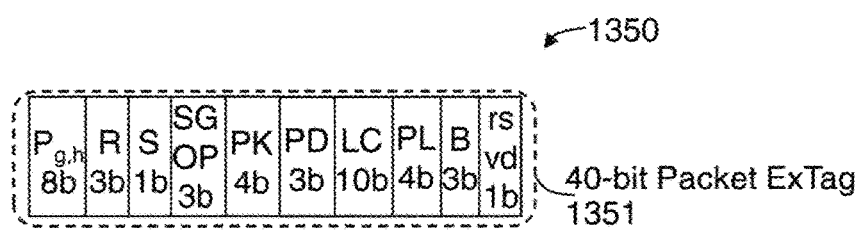
FIG. 13B illustrates control information packed into an exemplary 40-bit packet extended tag (ExTag) that accompanies each CEP in accordance with an embodiment of the present invention.

FIG. 13B illustrates control information 1350 packed into an exemplary 40-bit packet extended tag (ExTag) 1351 that accompanies each CEP in accordance with an embodiment of the present invention. In contrast to the control information 1300 of FIG. 13A which is split into a 26-bit packet tag 1301 and a 32-bit packet control word 1312, the control information 1350 is packaged fully into a 40-bit packet extended tag (ExTag) 1351 and accompanies each CEP.

A conditional execution field may be included in a tag to specify conditional execution of a signal graph, with the conditional field directed to a conditional execution control word for further information specifying the conditional execution options, such as condition type, true or false condition execution, and the like.

Figure 14:
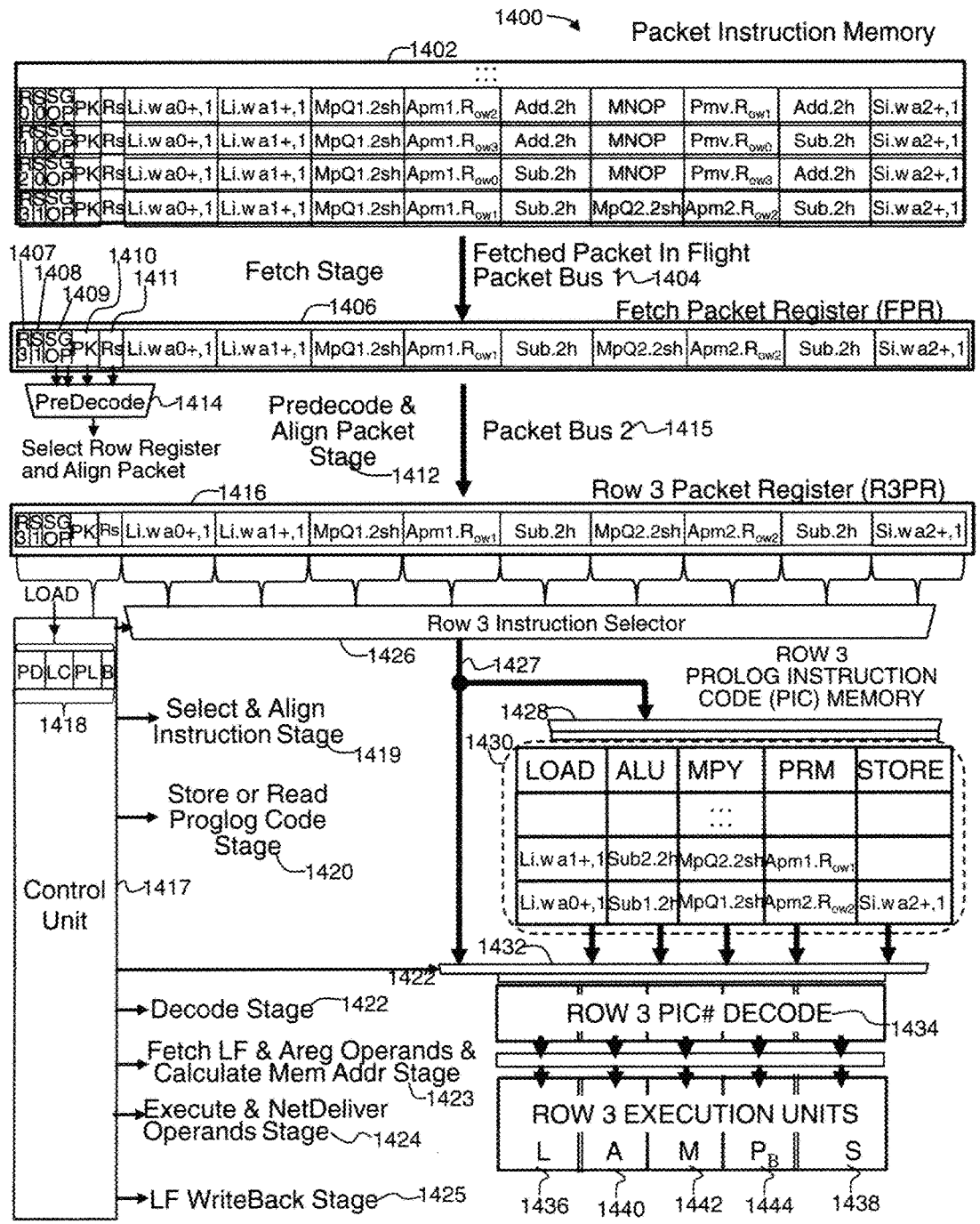
FIG. 14 illustrates an exemplary CEP pipeline that enables pipelining for each row of the FFT signal flow graph using stored pipelining variables in accordance with an embodiment of the present invention.
Figure 16:
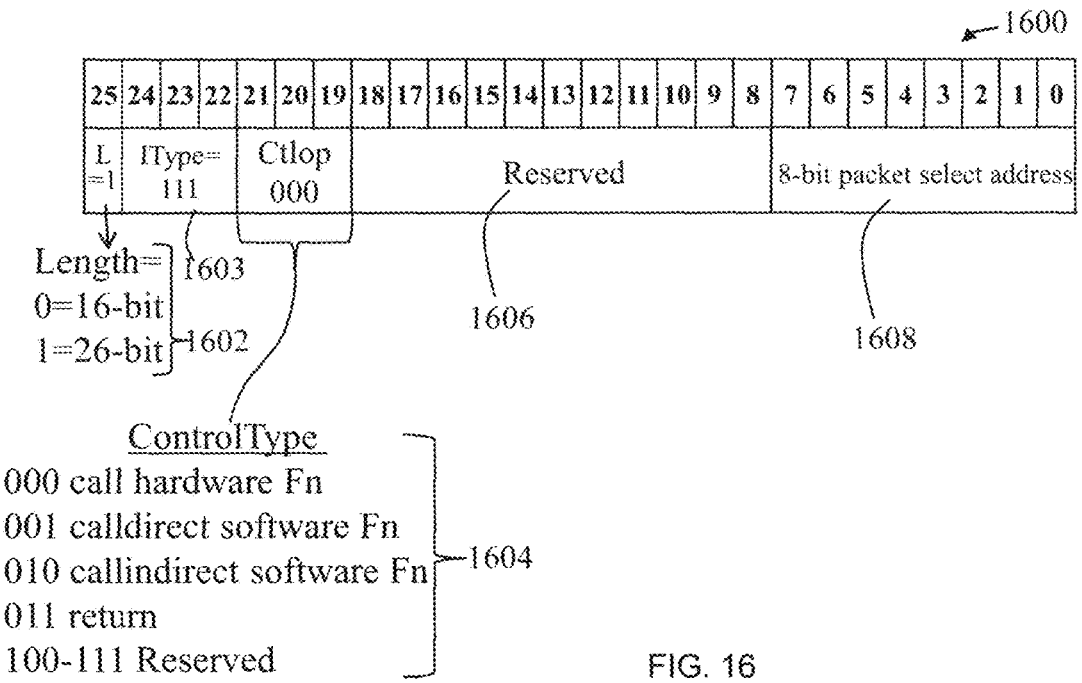
FIG. 16 illustrates a call hardware X (CHX) instruction that may be included in a memory instruction stream in accordance with an embodiment of the present invention.

FIG. 14 illustrates an exemplary CEP pipeline 1400 that enables pipelining for each row of the FFT signal flow graph in accordance with an embodiment of the present invention. The CEP pipeline 1400 includes a packet instruction memory 1402 which for the present example includes at least the four CEPs 1012, 1014, 1016, and 1018 of FIG. 10 with each CEP also including a packet tag according to the 26-bit packet tag 1301 of FIG. 13A. As shown in the packet instruction memory 1402, the row 0 CEP would be at an address X, the row 1 CEP at address X+1, the row 2 CEP at address X+2, and the row 3 CEP at address X+3, with the row identifier indicated in the row number 1303 of FIG. 13A. The processor ($P_{g,h}$) 1302 is not shown in the packet tags for clarity of presentation. The start bit 1304 is set to a "0" for rows 0, 1, and 2 and set to a "1" for row 3. When the row 3 CEP is fetched as the last CEP of the four CEPs, the start bit set to a "1" initiates the pipeline operation. Alternative means for initiating the pipeline operations may include issuing a separate start instruction, such as a CHX 26-bit instruction 1600 as shown in FIG. 16 and described in more detail below. The signal graph opcode 1305 would be set to the same value in each of the four row CEPs indicating the signal flow graph 602 of FIG. 6. A packet length 1306 would be set to "9" for the nine instructions utilized for this signal flow graph. The reserved field 1307 is utilized as needed or kept in a reserve setting.

For an example scenario, the fourth row CEP of rows R0 to R3, is fetched from the packet instruction memory 1402. The row 3 CEP is fetched over packet bus 1 1404 and loaded into a destination fetch packet register (FPR) 1406. The packet instruction memory 1402 utilized in this example may be on layer 308 of FIG. 3 and the destination FPR 1406 on the bottom layer 302 of FIG. 3 with the packet bus 1 1404 representing one or more of the vertical buses associated with each particular row CEP transfer as shown with an internal label "I" for instruction buses in FIG. 3, such as instruction pipe 310.

In an alternative embodiment, the packet instruction memory 1402 may be implemented in a separate CEP memory or memories, such as a read only memory (ROM) or a random access memory (RAM), that is loaded during an initialization operation with the chained execution packets (CEPs), for example, and may be located on the bottom layer 302 of FIG. 3. This separate CEP memory would be split according to the CEPs for each row of arithmetic functions.

FIG. 16 illustrates a call hardware X (CHX) 26-bit instruction 1600 that would be included in a memory instruction stream in accordance with an embodiment of the present invention. The memory instructions would be fetched from an instruction memory that stores a plurality of individually accessible instructions, such as the call hardware X (CHX) instruction 1600. The CHX instruction 1600 includes a length bit 1602, an instruction type 1603 set to 111 for branch/control instructions, and a control type opcode 1604 to specify a particular type of hardware call function. In the CHX instruction 1600, the number X is a packet select address 1608 of a CEP for a particular row in the array. Also, the CHX 26-bit instruction 1600 would call all row CEPs, four CEPs in this example, to be fetched and begin operations in parallel. Such information regarding the number of CEPs to call may be included in a 11-bit reserved bit field 1606 which may also contain other CHX specific information. The main program instruction stream would then include a first set of instructions, a CHX 26-bit instruction 1600, and a second set of instructions, where the first set of instructions and the second set of instructions include single operation type instructions including branches. In this manner, a plurality of callable hardware functions, such as identified by an eight bit packet select address 1608, for example, can be implemented according to the capacity of the CEP memory. Upon completing a called hardware function, a hardware return operation is executed. When the CHX 26-bit instruction 1600 is issued by an instruction thread, that thread may pause waiting for a return from the hardware call or may branch to code that has no dependency on the results of the called hardware function. In the case of a paused thread, other threads maybe enabled to improve the processor utilization. Upon receiving the hardware return, the paused thread is restarted in its turn from the sequence of threads that are in operation.

In the next pipeline stage, a predecode and align packet stage 1412, the packet tag for row 3 CEP is decoded, which at this stage in the pipeline is considered a first decode operation or also referenced as a predecode operation. The predecode operation uses predecoder 1414 which decodes the row number 1407, start bit 1408, signal graph opcode (SGOP) 1409, and packet length 1410. The reserved field 1411 not used in the present implementation may either be removed or kept as reserved for later definition. The row number 1407 set to row 3 indicates this CEP is to be directed to a row 3 circuit, with each row in this embodiment having its own associated row circuit. The start bit being set to a "1" indicates the signal flow graph pipelining is to begin with receipt of this packet. The SGOP 1409 is used to select a control register, such as control register 1418 in control unit 1417. The control register 1418 may be one of a plurality of control registers, each associated with a specific signal graph. The control register comprises a packet delay (PD), a body repeat rate (R), a prolog length (PL), and body length (B) as described in more detail below. Also, since packets may be formed of varying numbers of 26-bit instructions and 16-bit instructions and since the packet tag is a fixed length, the predecode operation decodes the first bit after the packet tag to determine if the first instruction after the packet tag is a 16-bit instruction or a 26-bit instruction. If the first instruction after the packet tag is a 16-bit instruction then the first bit after the 16-bit instruction is checked to determine if this next instruction is a 16-bit instruction or a 26-bit instruction. If the next instruction is a 26-bit instruction, then after the 26-bits the first bit of the next instruction is checked and this continues for the packet length. After all instructions are determined to be a combination of 16-bit or 26-bit instructions or all instructions are determined to be 26-bit instructions, for example, the align packet stage aligns the packet instructions as required for a particular implementation. The row 3 CEP is fetched from the FPR 1406 and delivered over a packet bus 2 1415 to a row 3 packet register (R3PR) 1416. The tag information is read by the control unit 1417. For example, the SGOP 1409 would be used to select the control register 1418 from a plurality of SDOP control registers.

The control unit 1417 holds the control register 1418 having the packet delay (PD) 1314, the body loop count (LC) 1315, the prolog length (PL) 1316, and body length (B) 1317. The control unit 1417 may contain a programmable finite state machine to control operation of the CEP pipeline 1400 by use of information contained in the control register 1418 and other state variables indicative of current status of the CEP pipeline 1400. A single programmable finite state machine may be used to control all four rows of execution, such as required for executing the signal flow graph mapping 1000 of FIG. 10 expanded to include the rows 0-3 CEPs, or four programmable finite state machines may be used for such control. The PD 1314 information indicates a number of cycles of delay waited before starting the row CEP pipeline. For example, in FIG. 12B the PD is two cycles, such as cycle EX1 1241 and cycle EX2 1242. The body loop count LC 1315 indicates how many times the main body of the program is repeated. The prolog length (PL) 1316 indicates the number of cycles prior to reaching the main body of the program. For example, in FIG. 12B, the PL 1316 is 7 cycles EX1 1241 to EX7 1247. The main body of the program begins on cycle EX8 1248.

In the next pipeline stage, a select & align instruction stage 1419, the instructions are aligned if the packet contains a mix of 16-bit and 26-bit instructions and are aligned to the appropriate execution unit. The first instruction of the packet is selected through row 3 instruction selector 1426 and distributed by bus 1427 to multiplexor and stage register 1428 and multiplexor and stage register 1432. The rest of the CEP instructions are then selected in sequence each cycle.

In the next pipeline stage, a store or read prolog code stage 1420, the selected instruction is loaded into the row 3 prolog instruction code (PIC) memory 1430 at the appropriate position based on the instruction type field of the instruction. In a decode stage 1422, the selected instruction is decoded by row 3 PIC# decoder 1434.

In a fetch local file (LF) and address register (Areg) operands and calculate memory address stage (fetch operand stage) 1423, operands from a specified LF (if required) and Areg values are fetched and the memory address is calculated for any load or store instruction. In an execute and netdeliver operands stage (execute stage) 1424, the selected instruction is then executed by the appropriate execution unit; load (L) unit 1436, ALU (A) 1440, MPU (M) 1442, PRM ($P_B$) 1444, and store (S) unit 1438. It is noted, that the load unit 1436 and the store unit 1438 may be located on the top layer of an implementation, such as the top layer 308 of FIG. 3, to be more closely associated with the array memory. Side effect flags of execution are also generated by the end of execution that are used to support conditional execution, initiate interrupts as specified by a system architecture, and for debug purposes. In one embodiment, the execute and netdeliver operands stage 1424 includes time after execution to deliver one or more operands over the local network between execution units to their operand input pipe registers (OIPR), such as the $1^{st}$ OIPR and the $2^{nd}$ OIPR in the external storage 566 individually or both $1^{st}$ and $2^{nd}$ OIPRs in external storage 566 and $3^{rd}$ OIPR and the $4^{th}$ OIPR individually or both in the second external storage 576 of FIG. 5B, as specified.

A local file (LF) write back stage 1425 is used to write results designated to be stored in a local file, such as the local file (LF) 565 of FIG. 5B, which is part of the net connected distributed register file. The side effects are also loaded to flag registers.

FIG. 15 illustrates a cycle by cycle sequence chart 1500 of entries of Wings instructions in a prolog instruction code (PIC) memory in accordance with an embodiment of the present invention. In row 3 prolog instruction code memory (PICM) in cycle 1 1501, the first instruction (Li.w a0+, 1) 1511 selected from the packet row 3 register (R3PR) 1416 is loaded to the load unit (L) 1436 position at prolog instruction code (PIC) address K 1521. For this cycle by cycle sequence chart 1500, cycles are referenced from a fetch of instructions from the R3PR 1416. As part of the prolog, the first instruction (Li.w a0+, 1) 1511 selected from R3PR 1416 is decoded in cycle 2 in the decode stage 1422. In cycle 3, the address register "a0" is fetched in the fetch LF and Areg operands and calculate memory address stage (fetch operand stage) 1423 of FIG. 14. In cycle 4, the decoded first instruction (Li.w a0+, 1) 1511 is then executed in the execute and netdeliver operands stage (execute stage) 1424 of FIG. 14. At the end of the execute stage 1424, the execution results are delivered over the network to the $1^{st}$ operand input pipe register ($1^{st}$ OIPR) of the multiplier node (M01 node) 520 of FIG. 5A. In a local file writeback stage in cycle 5, the execution results may be written to a local register file if specified in the executed instruction. Also, any flags generated by the execution are written to flag registers.

In row 3 PICM in cycle 2 1502, the second instruction (Li.w a1+,1) 1512 selected from the R3PR 1416 is loaded to the L unit 1436 position at PIC(K+1) 1522. As part of the prolog, the second instruction (Li.w a1+, 1) 1512 selected from R3PR 1416 is decoded in cycle 3 in the decode stage 1422. In cycle 4, the address register "a1" is fetched in the fetch operand stage 1423 of FIG. 14. In cycle 5, the decoded second instruction (Li.w a1+, 1) 1512 is then executed in the execute stage 1424 of FIG. 14. At the end of the execute stage 1424 for the second instruction, the execution results are delivered over the network to the $2^{nd}$ OIPR of the M01 node 520 of FIG. 5A. Both operands are now available in the M01 node 520 in preparation to execute a multiply node instruction. In a local file writeback stage in cycle 6, the execution results may be written to a local register file if specified in the executed instruction. Also, any flags generated by the execution are written to flag registers.

In row 3 PICM in cycle 3 1503, the third instruction, a first groupfun instruction (MpQ1.2sh) 1513, selected from the R3PR 1416 is loaded to multiply unit (M) 1442 position at PIC(K) 1521. As part of the prolog, the first instruction (Li.w a0+, 1) 1511 and the MpQ1.2sh instruction 1513 are selected from the R3PR 1416 and are both decoded in cycle 4 in the decode stage 1422. The information from an infoA field of the MpQ1.2sh instruction 1513, such as infoA field 865 bits 0-5 of FIG. 8F, is stored in a pending register which, for example, may be tagged. For example, the infoA information stored in the pending register may be tagged with an indication that the second groupfun instruction is accessed from address PIC(K+1) of the PIC 1430 and from the slot associated with the PRM ($P_B$) execution unit 1444. The stored information in the pending register is accessed by the second groupfun instruction when it is in the decode stage 1422 or in the fetch operand stage 1423 for the second groupfun instruction, for example. In cycle 5, any local file (LF) operands are fetched if required for one or both instructions in the fetch operand stage 1423 of FIG. 14. In cycle 6, the decoded first instruction (Li.w a0+, 1) 1511 and the decoded third instruction (MpQ1.2sh) 1513 are then executed in the execute stage 1424 of FIG. 14. At the end of the execute stage 1424 for the first instruction, the fetched operand for the decoded first instruction is delivered over the network to the $1^{st}$ OIPR register in the M01 node 520 of FIG. 5A. Also, at the end of the execute stage 1424 for the third instruction, the result of the multiplication is delivered and control information, if specified in the third instruction, is stored in the pending register and is delivered in cycle 7 to the add permute move node P02 521 of FIG. 5A.

The following descriptions are shortened in order to focus on the loading of the PICM. In row 3 PICM in cycle 4 1504, the fourth instruction (Apm.$R_{ow1}$) 1514 selected from the R3PR 1416 is loaded to permute move execution unit ($P_B$) 1444 position at PIC(K+1) 1522.

In row 3 PICM in cycle 5 1505, the fifth instruction (Sub.2h) 1515 selected from the R3PR 1416 is loaded to arithmetic unit (A) 1440 position at PIC(K) 1521.

In row 3 PICM in cycle 6 1506, the sixth instruction, a second groupfun instruction, (MpQ2.2sh) 1516 selected from the R3PR 1416 is loaded to multiply unit (M) 1442 position at PIC(K+1) 1522.

In row 3 PICM in cycle 7 1507, the seventh instruction (Apm.$R_{ow2}$) 1517 selected from the R3PR 1416 is loaded to permute move unit ($P_B$) 1444 position at PIC(K) 1521.

In row 3 PICM in cycle 8 1508, the eighth instruction (Sub.2h) 1518 selected from the R3PR 1416 is loaded to the arithmetic unit (A) 1440 at PIC(K+1) 1522.

In row 3 PICM in cycle 9 1509, the ninth instruction (Si.w a2+,1) 1519 selected from the R3PR 1416 is loaded to store unit (S) 1438 at PIC(K) 1521.

At this point all instructions in the row 3 PICM 1430 are loaded, the prolog has executed, and the body of the code is then executed alternating between PIC(K) 1521 and PIC(K+1) 1522. After the body loop count has been completed, the epilog is started which repeats the prolog in reverse order at which point the process task has completed. It is noted that in an alternative embodiment, the external input storage 566 and may also include the second external input storage 576 to emulate the function of the row 3 PICM 1430. In such a case, it may be advantageous to not include a prolog instruction code memory in said alternative embodiment.

Figure 17:
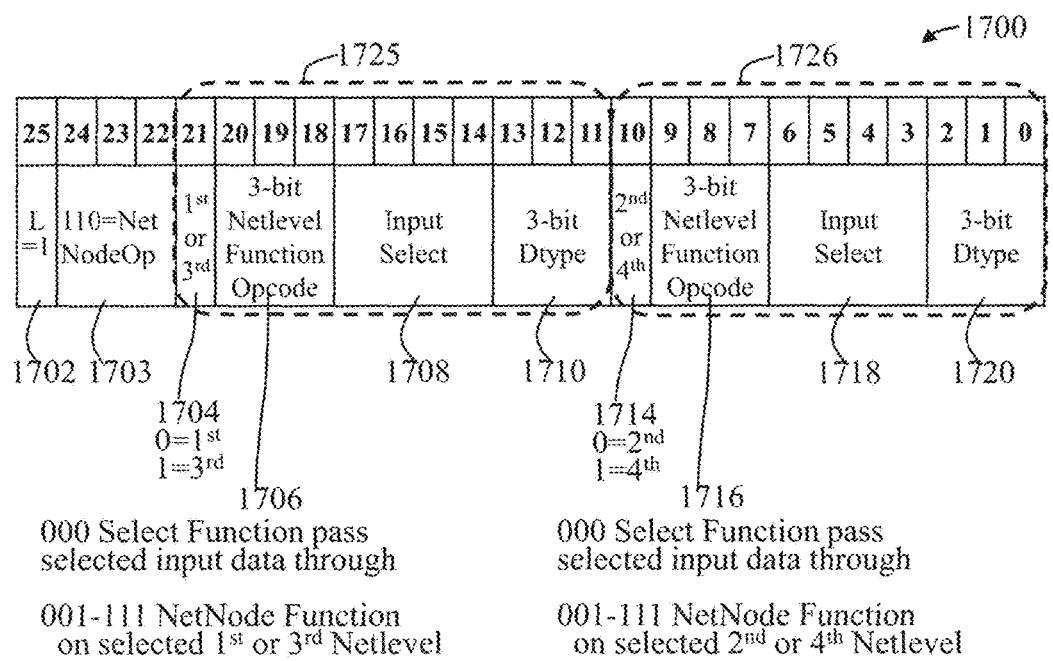
FIG. 17 illustrates an exemplary Wings net node function (NNF) 26-bit instruction configured with two adjacent 11-bit Netlevel function instructions in accordance with an embodiment of the present invention.

FIG. 17 illustrates an exemplary Wings net node function (NNF) 26-bit instruction 1700 configured with two adjacent 11-bit Netlevel function instructions 1725 and 1726 in accordance with an embodiment of the present invention. The NNF 26-bit instruction 1700 is executed in nodes of multi-level network. The NNF 26-bit instruction 1700 includes a length bit 1702 in bit 25 set to a 1 indicating this instruction is a 26-bit instruction. Bits 22-24 encode an instruction type 1703 as 110 to indicate a network node operation (NetNodeOp) type instruction. The 11-bit Netlevel function (NLF) instruction 1725 includes a net level select bit 1704 in bit 21 that is set to a "0" to indicate that this NLF instruction 1725 is to be applied to $1^{st}$ level nodes of the network or to a "1" to indicate that this NLF instruction 1725 is to be applied to $3^{rd}$ level nodes in the network. The 11-bit NLF instruction 1725 includes a 3-bit netlevel function (NLF) opcode 1706 in bits 18-20 to specify the operation at the selected nodes. For example, the NLF opcode 1706 may be set to "000" to indicate the selected nodes are to operate as multiplexers and use the input select field 1708 to specify which input path to pass through to the next level of the network. The NLF opcode 1706 may also be set to one of seven other specific encodings "001-111" to specify a Net-Node function to operate on inputs received at node on the selected 1st or $3^{rd}$ NetLevel. A specific combination of input paths is selected by the 4-bit input select 1708. For 1 to 3 adjacency connections, there are three inputs per node from which one input may be selected for the NLF opcode 1706 set to "000". Also, one input path, or two input path combinations of the three input paths, or all three input paths may be selected for the NLF opcode 1706 set to one of the "001-111" encodings to select a desired function specification. It is noted that for 1 to 5 adjacency connections there are five inputs per node from which one may be selected for the NLF opcode 1706 set to "000". Also, one input path, or two input path combinations of five input paths, or three input path combinations of five input paths or four input path combinations of five input paths, or all five input paths may be selected for the LF opcode 1706 set to one of the "001-111" encodings to select a desired function specification. With 1 to N adjacency connections, the number of combinations of inputs for a particular function increase even further for N equal to 7, 9, . . . N. A 3-bit data type (Dtype) 1710 specifies up to eight data types that may be selected for a particular function.

The 11-bit NLF instruction 1726 includes net level select bit 1714 in bit 10 that is set to a "0" to indicate that this NLF instruction 1726 is to be applied to $2^{nd}$ level nodes of the network or to a "1" to indicate that this NLF instruction 1726 is to be applied to $4^{th}$ level nodes of the network. The 11-bit NLF instruction 1726 comprises similar bit fields to the 11-bit NLF instruction 1725, but applies the specified operation to nodes on a selected $2^{nd}$ Netlevel or selected $4^{th}$ Netlevel.

The LIP 26-bit instruction 900 may be encoded to load from shared memories using the shared memory block select field 905 and not require use of the 11-bit NLF instruction 1725 or use of the 11-bit NLF instruction 1726 to select a memory or pass through mechanism. The LIP 26-bit instruction 900 and shared memory block select field 905 provided memory selection and multiplexor selection at the network nodes. The use of the NLF instructions multiplexor selection allows a mix of function execution at one or more network nodes and multiplexor pass through at other network nodes. Further, the 11-bit NLF instruction 1725 may be expanded for the first level nodes to include a shared memory block select field 905 of FIG. 9A to specify from which memory the input data is to be supplied. In various embodiments, the shared memory block select field 905 or the like may be used in place of the input select field 1708 for first level nodes or may be combined with specific input patterns required of the functions programmed for a particular implementation.

Figure 18:
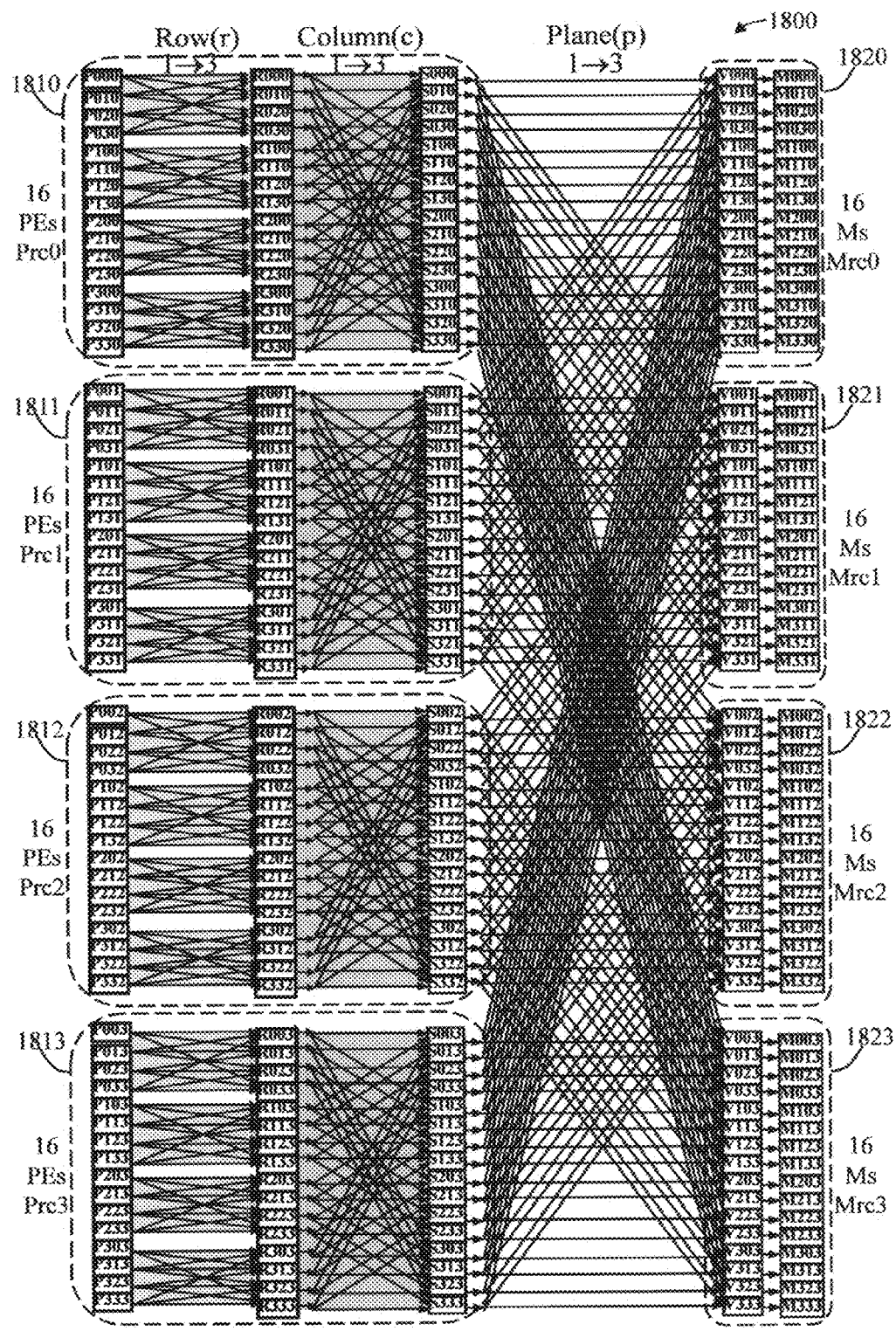
FIG. 18 illustrates a Wings Array Memory (WAM) 4×4×4 network for store operations with a three level network having a 1 to 3 adjacency construction in each level in accordance with an embodiment of the present invention.

FIG. 18 illustrates a Wings Array Memory (WAM) 4×4×4 network 1800 for store operations with a three level network having a 1 to 3 adjacency construction in each level in accordance with an embodiment of the present invention. The nodes in the WAM 4×4×4 network 1800 are identified by a row (r), column (c), plane (p) subscripts and grouped by planes of 16 P nodes, 16 corresponding R nodes, and 16 corresponding S nodes (PRS planes) 1810-1813. PRS plane (0) 1810 includes Pxx0, Rxx0, and Sxx0 nodes. PRS plane (1) 1811 includes Pxx1, Rxx1, Sxx1 nodes. PRS plane(2) 1812 includes Pxx2, Rxx2, and Sxx2 nodes. PRS plane(3) 1813 includes Pxx3, Rxx3, and Sxx3 nodes. The PRS plane(0) 1810 Sxx0 nodes are coupled to VM plane(0) 1820 Vxx0 and Mxx0 nodes. The PRS plane(1) 1811 Sxx1 nodes are coupled to VM plane(1) 1821 Vxx1 and Mxx1 nodes. The PRS plane(2) 1812 Sxx2 nodes are coupled to VM plane(2) 1822 Vxx2 and Mxx2 nodes. The PRS plane(3) 1813 Sxx3 nodes are coupled to VM plane(3) 1823 Vxx3 and Mxx3 nodes.

The levels of the 4×4×4 network 1800 are referenced to the data source, in this case the Pxxx nodes. The first level of the 4×4×4 network 1800 is represented by the 1→3 buses shown in blue between the Pxxx nodes and the Rxxx nodes. The second level of the 4×4×4 network 1800 is represented by the 13 buses shown in green between the Rxxx nodes and the Sxxx nodes. The third level of the 4×4×4 network 1800 is shown by black buses on a white background between the Sxxx nodes and the Vxxx nodes. A fourth level of the 4×4×4 network 1800 is shown by the one to one connections between the Vxxx nodes and the Mxxx nodes. Since the connections between the Vxxx nodes and the Mxxx nodes are one to one, each Vxxx nodes and Mxxx nodes may be considered a combined VMxxx node. Netlevel function (NLF) instructions, such as the 11-bit NLF instructions 1725 and 1726 are distributed according to the NLF opcode and a net level select bit, such as the net level select bit 1704 in bit 21 that is set to a "0" to indicate that this NLF instruction 1725 is to be applied to $1^{st}$ level source nodes of the network, the Pxxx nodes and the blue 1→3 buses to the Rxxx nodes of FIG. 1800 or set to a "1" to indicate that this NLF instruction 1725 is to be applied to $3^{rd}$ level source nodes in the network, the Sxxx nodes and the black/white 1→3 buses to the Vxxx nodes of FIG. 1800. The NLF instruction 1726 uses the net level select bit 1714 in bit 10 that is set to a "0" to indicate that this NLF instruction 1726 is to be applied to $2^{nd}$ level source nodes of the network, the Rxxx nodes and the green 1→3 buses to the Sxxx nodes of FIG. 1800 or set to a "1" to indicate that this NLF instruction 1726 is to be applied to $4^{th}$ level source nodes in the network, the Vxxx nodes for the network between the Vxxx nodes and the Mxxx nodes in FIG. 1800. The M nodes are grouped by planes of 16 V nodes and 16 corresponding M nodes (VM planes) 1820-1823.

Figure 19:
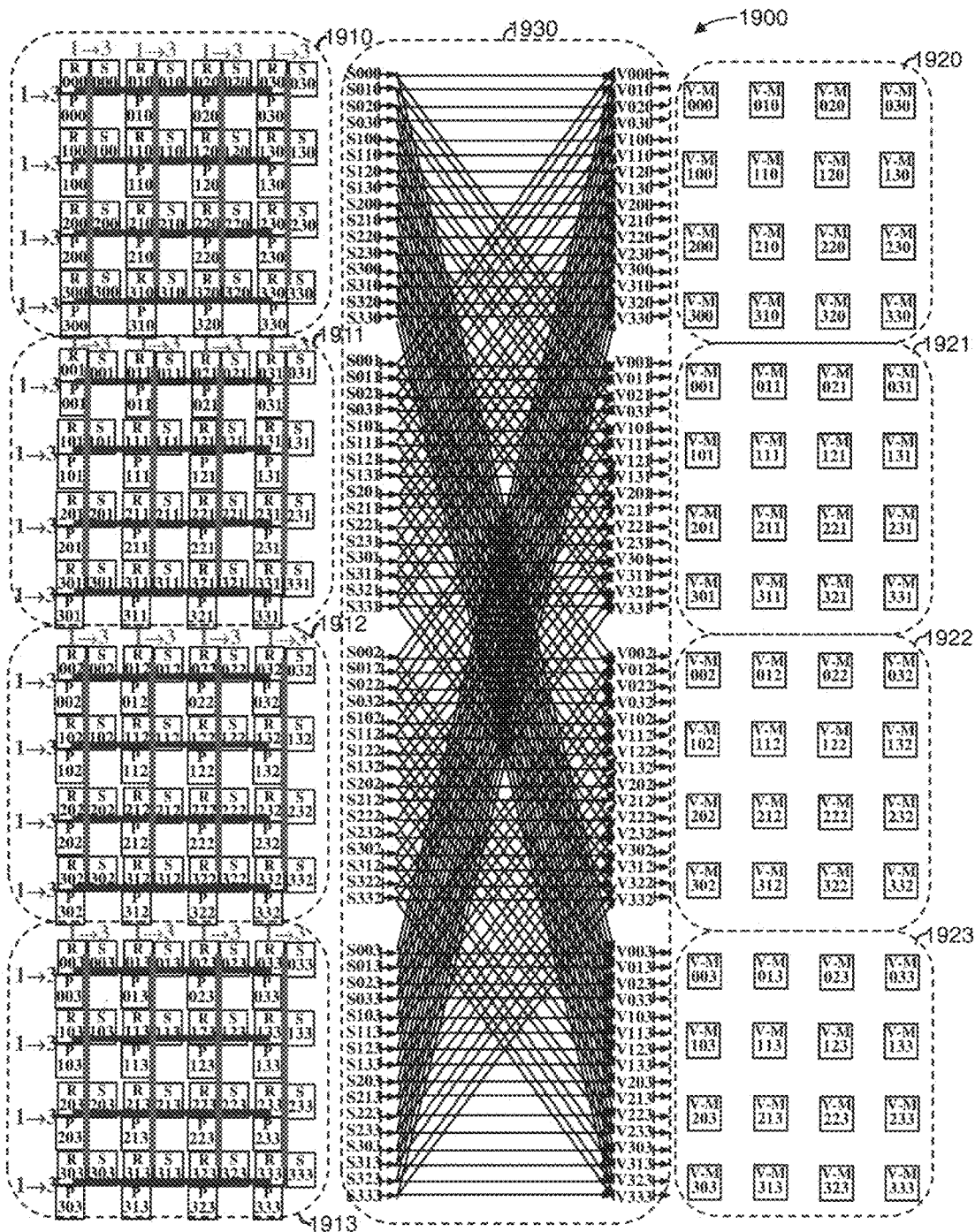
FIG. 19 illustrates a WAM 4×4×4 network for store operations that is a reorganized WAM 4×4×4 network with 4×4 PRS planes and 4×4 VM planes each arranged in a 2 dimensional (2D) organization interconnected by a 1 to 3 level adjacency networks in the rows and in the columns in accordance with an embodiment of the present invention.

FIG. 19 illustrates a WAM 4×4×4 network 1900 for store operations that is a reorganized WAM 4×4×4 network 1800 with 4×4 PRS planes and 4×4 VM planes each arranged in a 2 dimensional (2D) organization interconnected by 1 to 3 level adjacency networks in the rows and in the columns in accordance with an embodiment of the present invention. PRS plane(0) 1810 of FIG. 18 is reorganized to a 4×4 PRS plane(0) 1910. PRS plane(1) 1811 of FIG. 18 is reorganized to a 4×4 PRS plane(1) 1911. PRS plane(2) 1812 of FIG. 18 is reorganized to a 4×4 PRS plane(2) 1912. PRS plane(3) 1813 of FIG. 18 is reorganized to a 4×4 PRS plane(3) 1913. The Pr,c,p, Rr,c,p, and Sr,c,p nodes are interconnected with horizontal 1→3 buses shown in blue between the Pxxx nodes and the Rxxx nodes and vertical 1→3 buses shown in green between the Rxxx nodes and the Sxxx nodes. The VM plane(0) 1820 is reorganized to the 4×4 VM plane(0) 1920 having V-Mxx0 nodes. The VM plane(1) 1821 is reorganized to the 4×4 VM plane(1) 1921 having V-Mxx1 nodes. The VM plane(2) 1822 is reorganized to the 4×4 VM plane(2) 1922 having V-Mxx2 nodes. The VM plane(3) 1823 is reorganized to the 4×4 VM plane(3) 1923 having V-Mxx3 nodes. The interconnection between the planes 1930 is shown with duplicate Sxxx nodes and duplicate Vxxx nodes in the plane connections 1930. The duplicate Sxxx nodes and duplicate Vxxx nodes are for illustration only.

In general, regarding the WAM 4×4×4 network 1900 of FIG. 19 with R=4, C=4, and P=4, the R×C PRS plane(0) 1910, the 4×4 PRS plane(1) 1911, the 4×4 PRS plane(2) 1912, and the 4×4 PRS plane(3) 1913 comprise arrays of Pr,c,p, Rr,c,p, and Sr,c,p nodes that are interconnected, in general, with horizontal 1→N buses shown in blue between the Pxxx nodes and the Rxxx nodes and vertical 1→M buses shown in green between the Rxxx nodes and the Sxxx nodes. The 1→N buses are shown as 1→3 buses in FIG. 18 and the 1→M buses are shown as 1→3 buses also in FIG. 18. In general, the adjacency connections may be different, N≠M, between the horizontal busses and the vertical busses. The RxC VM plane(0) 1920 having V-Mxx0 nodes, the RxC VM plane(1) 1921 having V-Mxx1 nodes, the RxC VM plane(2) 1922 having V-Mxx2 nodes, and the RxC VM plane(3) 1923 having V-Mxx3 nodes are interconnected to the Sr,c,p nodes as shown in plane connections 1930. The interconnection between the planes is shown with duplicate Sxxx nodes and duplicate Vxxx nodes in plane connections 1930. The duplicate Sxxx nodes and duplicate Vxxx nodes are for illustration only.

In general, the PRS planes 1910-1913 comprise R×C arrays of $A_{r,c,p}$ nodes, the $1P_{r,c,p}$ nodes in FIGS. 18 and 19, R×C arrays of $R_{r,c,p}$ nodes, and R×C arrays of $S_{r,c,p}$ nodes. Each of the PRS planes 1910-1913 have a different p that is the same for an R×C array of $A_{r,c,p}$ nodes, a corresponding R×C array of $R_{r,c,p}$ nodes, and a corresponding R×C arrays of $S_{r,c,p}$ nodes that make up each of the p planes, p∈{0, 1, . . . , P−1}. Each R×C array of $A_{r,c,p}$ nodes, each corresponding R×C array of $R_{r,c,p}$ nodes, and each corresponding R×C arrays of $S_{r,c,p}$ nodes have a different r that is the same for each row r, r∈{0, 1, . . . , R−1}, and for each row r, c varies as the column number c∈{0, 1, . . . , C−1}. Each $A_{r,c,p}$ node in each plane p is operable to output a data value. Each R×C array of $R_{r,c,p}$ nodes is directly coupled to a corresponding R×C array of $A_{r,c,p}$ nodes according to a 1 to N adjacency of nodes in a first dimension, N a positive odd integer, and R≥N and C≥N. In operation, each $R_{r,c,p}$ node is operable to select a data value solely from directly coupled nodes $A_{r,c-\lfloor N/2 \rfloor,p}$, . . . , $A_{r,c-2,p}$, $A_{r,c-1,p}$, $A_{r,c,p}$, $A_{r,c+1,p}$, $A_{r,c+2,p}$, . . . , $A_{r,c+\lfloor N/2 \rfloor,p}$ and to output the $R_{r,c,p}$ node selected data value, wherein for a selected value of N, the $A_{r,c-\lfloor N/2 \rfloor,p}$, . . . , $A_{r,c-2,p}$, $A_{r,c-1,p}$ sequence of nodes has $\lfloor N/2 \rfloor$ nodes and for N>1 the last node is $A_{r,c-\lfloor N/2 \rfloor,p}$ and the $A_{r,c+1,p}$, $A_{r,c+2,p}$, . . . , $A_{r,c+\lfloor N/2 \rfloor,p}$ sequence of nodes has $\lfloor N/2 \rfloor$ nodes and for N>1 the last node is $A_{r,c+\lfloor N/2 \rfloor,p}$ wherein $\lfloor N/2 \rfloor$ is the floor of N/2 which is the largest integer less than N/2.

Also, each R×C array of $S_{r,c,p}$ nodes in each plane p is directly coupled to a corresponding R×C array of $R_{r,c,p}$ nodes according to a 1 to M adjacency of nodes in a second dimension, M a positive odd integer, and R≥M and C≥M. In operation, each $S_{r,c,p}$ node is operable to select a data value solely from directly coupled nodes $R_{r-\lfloor M/2 \rfloor,c,p}$, . . . , $R_{r-2,c,p}$, $R_{r-1,c,p}$, $R_{r,c,p}$, $R_{r+1,c,p}$, $R_{r+2,c,p}$, . . . , $R_{r+\lfloor M/2 \rfloor,c,p}$ and to output the $S_{r,c,p}$ node selected data value, wherein for a selected value of M, the $R_{r-\lfloor M/2 \rfloor,c,p}$, . . . , $R_{r-2,c,p}$, $R_{r-1,c,p}$ sequence of nodes has $\lfloor M/2 \rfloor$ nodes and for M>1 the last node is $R_{r-\lfloor M/2 \rfloor,c,p}$, the $R_{r+1,c,p}$, $R_{r+2,c,p}$, . . . , $R_{r+\lfloor M/2 \rfloor,c,p}$ sequence of nodes has $\lfloor M/2 \rfloor$ nodes and for M>1 the last node is $R_{r+\lfloor M/2 \rfloor,c,p}$, wherein $\lfloor M/2 \rfloor$ is the floor of M/2 which is the largest integer less than M/2.

Each of the p planes of R×C arrays of $V_{r,c,p}$ nodes 1920-1923 have a different p that is the same for an R×C array of $S_{r,c,p}$ nodes and a corresponding R×C array of $V_{r,c,p}$ nodes, p∈{0, 1, . . . , P−1}. Each R×C array of $V_{r,c,p}$ nodes having a different r that is the same for each row r, r∈{0, 1, . . . , R−1}, and for each row r, c varies as the column number c∈{0, 1, . . . , C−1}. Each $V_{r,c,p}$ node is directly coupled to P $S_{r,c,p}$ nodes having the same r and c as the $V_{r,c,p}$ node, p∈{0, 1, . . . , P−1}. In operation, each $V_{r,c,p}$ node is operable to select a data value from directly coupled P $S_{r,c,p}$ nodes and to output the $V_{r,c,p}$ node selected data value.

FIG. 20A illustrates an exemplary quad core node 2000 selected from a 16 quad core node network obtained by folding the WAM 4×4×4 network 1900 of FIG. 19 to overlap the 2D 4×4 PRS planes and 4×4 VM planes in accordance with an embodiment of the present invention. The nodes in the quad core node 2000 selected from the WAM 4×4×4 network 1900 are identified by a row (r), column (c), plane (p) subscripts. The quad core node 2000 comprises nodes in four groups. A first group from plane(0) comprises a P000 node 2002, an R000 node 2003, an S000 node 2004, and nodes V000 and M000 (VM000) nodes 2005. A second group from plane(1) comprises nodes P001, R001, S001, and VM001 nodes 2006. A third group from plane(2) comprises nodes P002, R002, S002, and VM002 nodes 2007. A fourth group from plane(3) comprises nodes P003, R003, S003, and VM003 nodes 2008. The green 1→3 buses running in a vertical direction represent the green 1→3 buses in FIG. 18 and in FIG. 19. The blue 1→3 buses running in a horizontal direction represent the blue 1→3 buses in FIG. 18 and in FIG. 19. The black buses on a white background between the Sxxx nodes and the Vxxx nodes in FIGS. 18 and 19, are separately colored bus subsets of the plane connections 1930 of FIG. 19 that correspond to the S00x, and VM00x nodes of FIG. 19 and shown in a quad core node 2000. For example, the bus between the S000 node 2004 and the VM000 nodes 2005 is colored red, the bus between the S001 node and the VM001 nodes is colored purple, the bus between the S002 node and the VM002 nodes 2007 is colored yellow, and the bus between the 5003 node and the VM003 nodes 2008 is colored black. By convention herein, buses from the S000 node are red, buses from the S001 node are purple, buses from the S002 node are S001 node are purple, buses from the S002 node are yellow, and buses from the 5003 node are black.

FIG. 20B illustrates an exemplary S000 node 2030, such as S000 node 2004 of the quad core node 2000 of FIG. 20A in accordance with an embodiment of the present invention. The S000 node 2030 is constructed using three sub-node units 2034-2036 and each sub-node unit comprising input and output interfaces and node function units (NodeFuns) 2038-2040, respectively. Since there are three NodeFuns 2038-2040 in the S000 node 2030, a decoder 2042 is configured to receive a NodeOp code 2043 or a Netlevel function instruction, such as the 11-bit NLF instruction 1725 with the net level select bit 1704 in bit 21 set to a "1" to indicate the third level of the network, for example. The NLF instruction 1725 is decoded to generate three sets of control signals 2044 to appropriately control the three NodeFuns 2038-2040. External inputs 2048-2050 are coupled from a previous node in the network, the Rxxx nodes, for example as illustrated. In one embodiment, input 2048 from an R000 node, such as R000 node 2003 of FIG. 20A may be selected by NodeFunA 2038, input 2049 from an R100 node may be selected by NodeFunB 2039, and input 2050 from an R300 node may be selected by NodeFunC 2040. In other embodiments, the inputs 2048-2050 may be selected by the NodeFuns 2038-2040 in a different order or in different combinations, such as the three inputs 2048-2050 selected in each of the NodeFuns 2038-2040 and with the same operations or different operations configured in each of the NodeFun units. Each of the three NodeFuns 2038-2040 may be appropriately configured with a function as required or as selected for a particular implementation. Each output 2052-2054 is separately sourced by its associated NodeFuns 2038-2040 and the outputs 2052-2054 are coupled to the VM000 nodes 2005, the VM001 nodes 2006, and to the VM003 nodes 2008, respectively.

FIG. 20C illustrates an exemplary quad core node symbol 2060 for the quad core node 2000 of FIG. 20A in accordance with an embodiment of the present invention. The PRSVM000 symbol 2065 represents the P000 node 2002, the R000 node 2003, the S000 node 2004, and the VM000 nodes 2005 of FIG. 20A. In a similar manner, the PRSVM001 symbol 2066 represents the P001, R001, S001, and the VM001 nodes 2006 of FIG. 20A. Also, the PRSVM002 symbol 2067 represents the P002, R002, S002, and the VM002 nodes 2007 of FIG. 20A. Further, the PRSVM003 symbol 2068 represents the P003, R003, S003, and the VM003 nodes 2008 of FIG. 20A. The buses of FIG. 20A between S000 node 2004 and VM000 nodes 2005, VM001 nodes 2006, and VM003 nodes 2008 are represented by the red bus between the PRSVM000 symbol 2065 and the PRSVM001 symbol 2066 and the red bus between the PRSVM000 symbol 2065 and the PRSVM003 symbol 2068. The connection in FIG. 20A between the S000 node 2004 and the VM000 nodes 2005 is contained within the PRSVM000 symbol 2065 and thus, not shown in FIG. 20C. In a similar manner, the purple buses, the yellow buses, and the black buses are shown in the same color in the quad core node symbol 2060 as used in the quad core node 2000 of FIG. 20A.

Figure 20D:
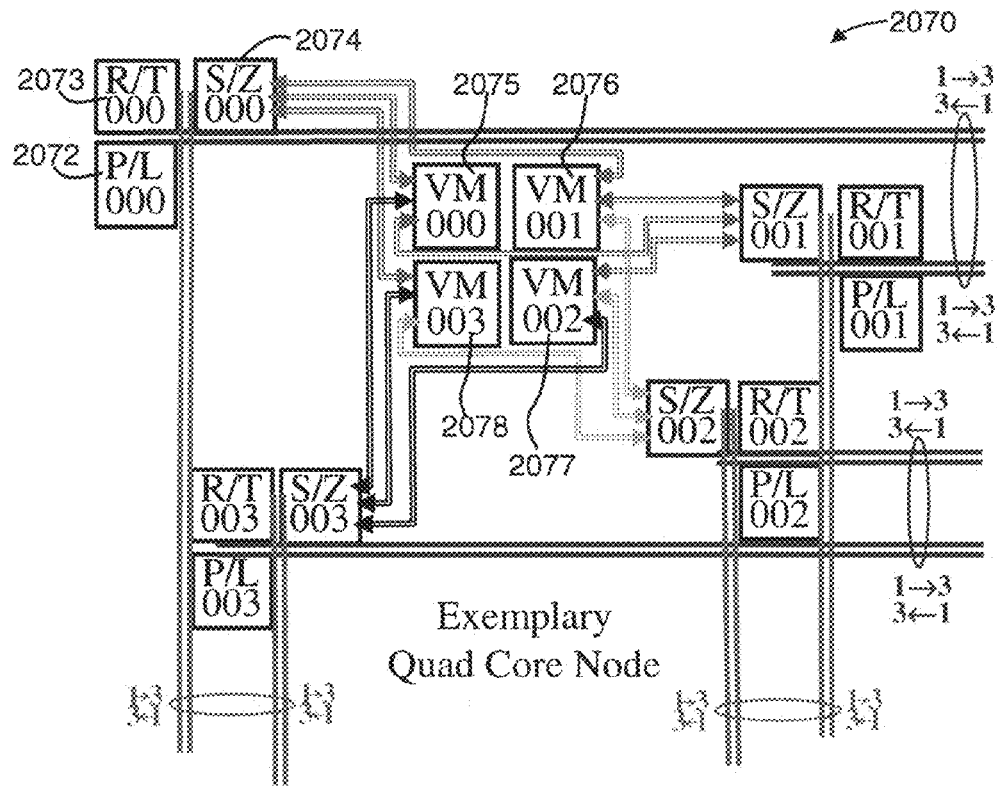
FIG. 20D illustrates an exemplary quad core node that supports store and load operations in parallel in accordance with an embodiment of the present invention.

FIG. 20D illustrates an exemplary quad core node 2070 that supports store and load operations in parallel in accordance with an embodiment of the present invention. A load network having 1→3 adjacent connections between nodes P, L, T, Z, and M operates with data fetched from a memory node Mxxx that is coupled to a Zxxx node which is coupled to a Txxx node which is coupled to a Lxxx node and which is coupled to a Pxxx node. Each Zxxx node receives input from three memory nodes, each Txxx node receives input from three Zxxx nodes, each Lxxx node receives input from three Txxx nodes, and each Pxxx node receives input from three Lxxx nodes for a 1→3 adjacency network. Further, details for a load network may be found in U.S. application Ser. No. 13/792,039 filed on Mar. 9, 2013 at FIGS. 7, 15-18, and 21A and corresponding descriptions. Each P, L, T, and Z node operates in a similar manner to the S000 node 2030 of FIG. 20B except in the reverse direction where inputs to the node are from previous nodes in the load network and connect to a subsequent nodes in the load network. Thus, the buses of FIG. 20A are duplicated with one bus represented by a store 1→3 bus and a second bus represented by a load 13 bus. For example, there are four green store 13 buses running in a vertical direction and four green load 1→3 buses running in a vertical direction shown in FIG. 20D. Each pair of green buses comprises one store bus and one load bus. Similarly, there a four blue store 1→3 buses running in a horizontal direction and four blue load 1→3 buses running in a horizontal direction shown in FIG. 20D. Each pair of blue buses comprises one store bus and one load bus. Further, a store S000 node combined with a load Z000 node (S/Z000) nodes 2074 has a first store red bus connecting from the S000 node to a V000 node of the VM000 nodes 2075, a second store red bus connecting from the S000 node to V001 node of the VM001 nodes 2076, a third red store bus connecting from the S000 node to V003 node of the VM003 nodes 2078. Also the memory node M000 of the VM000 nodes 2075 has a first red load bus connecting from the M000 node to the Z000 node of the S/Z000 nodes 2074, a second red load bus connecting from the M001 node of the VM001 nodes 2076 to the Z000 node of the S/Z000 nodes 2074, and a third red load bus connecting from the M003 node of the VM003 nodes 2078 to the Z000 node of the S/Z nodes 2074. In a similar manner, purple store buses connecting between S001 node and V000, V001, and V002 nodes and purple load buses connecting between M000, M001, and M002 nodes and a Z001 node are shown in FIG. 20D. Also, in a similar manner, yellow store buses connecting between S002 node and V001, V002, and V003 nodes and yellow load buses connecting between M001, M002, and M003 nodes and a Z002 node are shown in FIG. 20D. Further, in a similar manner, black store buses connecting between S003 node and V000, V002, and V003 nodes and black load buses connecting between M000, M002, and M003 nodes and a Z003 node are shown in FIG. 20D.

Figure 20E:
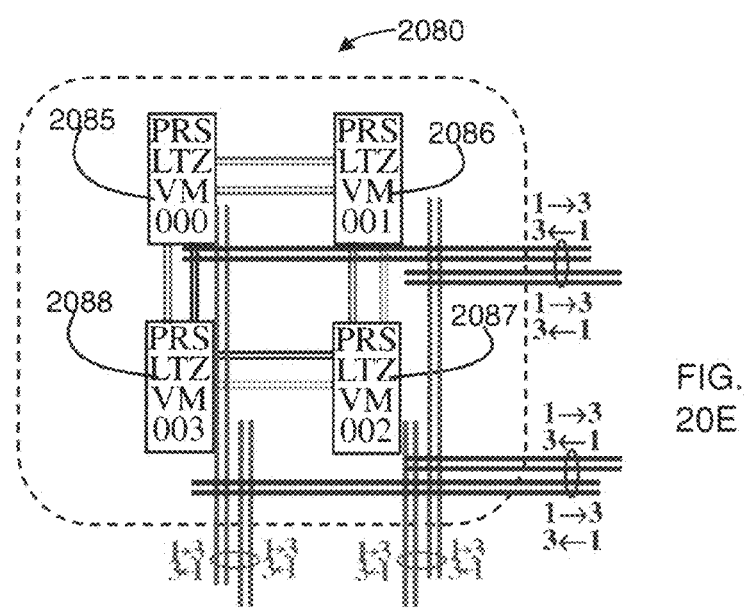
FIG. 20E illustrates an exemplary quad core node symbol for the quad core node of FIG. 20D in accordance with an embodiment of the present invention.

FIG. 20E illustrates an exemplary quad core node symbol 2080 for the quad core node 2070 of FIG. 20D in accordance with an embodiment of the present invention. The PRSLTZVM000 symbol 2085 represents aspects of a store path that includes the P000 node of the P/L000 nodes 2072, the R000 node of the R/T000 nodes 2073, the S000 node of the S/Z000 nodes 2074, and the VM000 nodes 2075 of FIG. 20D. The PRSLTZVM000 symbol 2085 also represents aspects of a load path that includes the M000 node of the VM000 nodes 2075, the Z000 node of the S/Z000 nodes 2074, the T000 node of the R/T000 nodes 2073, and the L000 node and P000 node of the P/L000 nodes 2072 of FIG. 20D. In a similar manner, the PRSLTZVM001 symbol 2086 represents a store path that includes nodes P001, R001, S001, and the VM001 nodes 2076 and a load path that includes nodes M001, Z001, T001, and L001 and P001 of the P/L001 nodes of FIG. 20D. Also, the PRSLTZVM002 symbol 2087 represents aspects of a store path and a load path for the P/L002 nodes and the VM002 nodes 2077 of FIG. 20D. Further, the PRSLTZVM003 symbol 2088 represents aspects of a store path and a load path for the P/L003 nodes and the VM003 nodes 2078 of FIG. 20D. The red buses, the purple buses, the yellow buses, and the black buses represent the bus connection paths in the same color that is used in the quad core node 2070.

Figure 21:
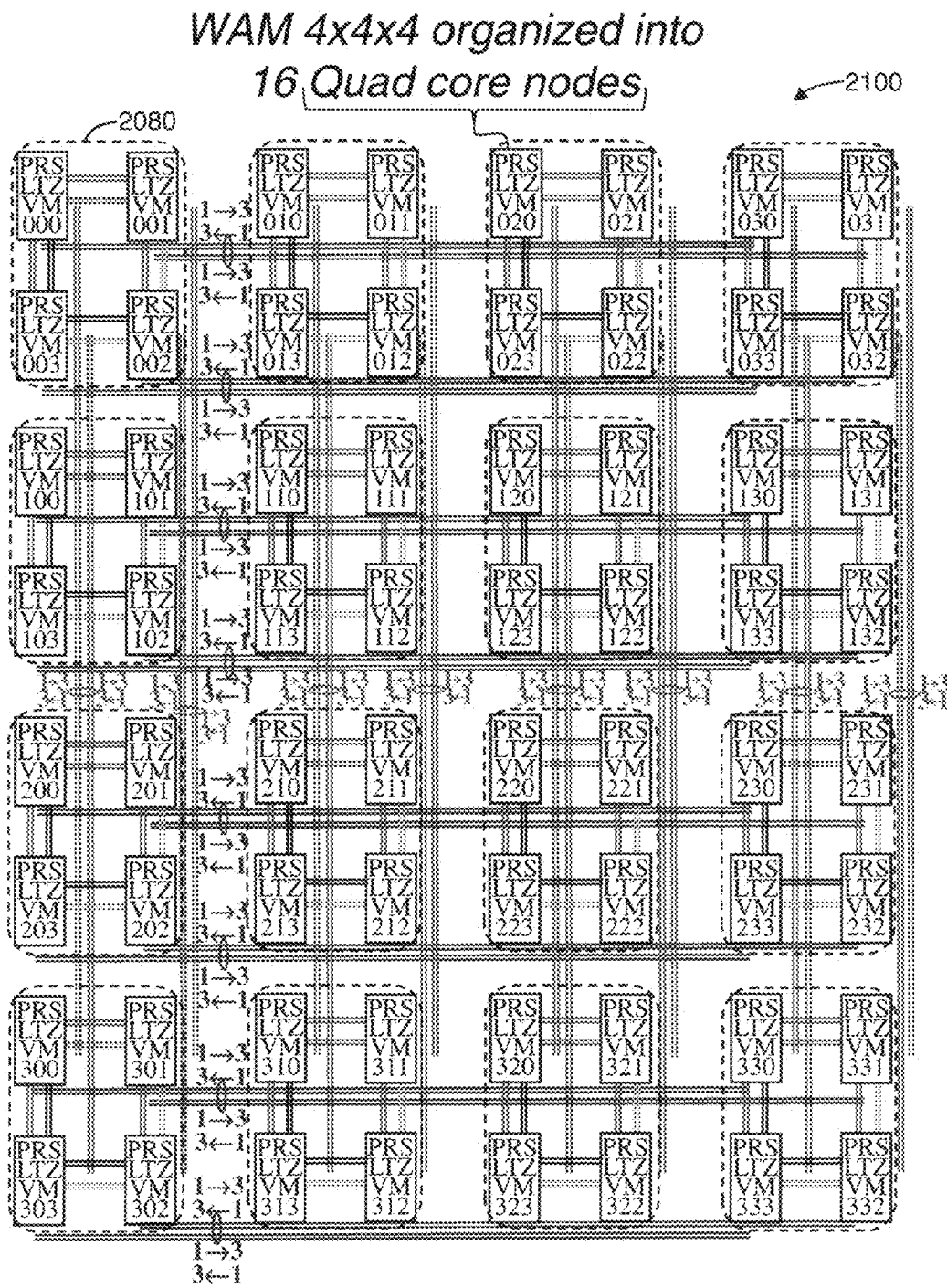
FIG. 21 illustrates an exemplary WAM 16 quad core network using the exemplary quad core node symbol of FIG. 20E in accordance with an embodiment of the present invention.

FIG. 21 illustrates a WAM 16 quad core network 2100 using the exemplary quad core node symbol 2080 of FIG. 20E in accordance with an embodiment of the present invention. The WAM 4×4×4 network 1900 is folded according to the plane connections. In a first fold, the 4×4 PRS plane(0) 1910 is overlaid with the 4×4 VM plane(0) 1920, the 4×4 PRS plane(1) 1911 is overlaid with the 4×4 VM plane(1) 1921, the 4×4 PRS plane(2) 1912 is overlaid with the 4×4 VM plane(2) 1922, and the 4×4 PRS plane(3) 1913 is overlaid with the VM plane(3) 1923. In a second fold, the organization of nodes is arranged by plane in a three dimension (3D) 4×4×4 topology with the nodes combined as discussed in FIGS. 20A-20E to produce the WAM 4×4 Quad Core array 2100 as shown in FIG. 21. Sixteen quad core nodes each structured similar to the exemplary quad core node symbol 2080 of FIG. 20E are arranged in a four quad core nodes by four quad core nodes (4×4) arrangement of quad core nodes. The 3D physical layout form shown in FIG. 3 using WAM array memory for data memory, such as a data cache, and a vertical pipe between instruction memory and processing elements is extended in the implementation of the WAM 16 quad core network 2100. The memory nodes M000-M333, alternatively the VM000-VM333 nodes, located on the top layer 308 may each have a further interface to a DMA bus of a plurality of DMA buses to support data movement into and out of each memory node. Also, the memory nodes M000-M333 on the top layer 308 may be Level 2 caches with Level 1 caches located close to the P nodes on the bottom layer 302. The memory nodes M000-M333 may alternatively be non-cached memory depending upon an implementation's requirements. Also, the load and store networks may be extended to support larger arrays based on using the folding techniques described herein. Also, higher levels of adjacency may be used, such as using 1→5 level adjacency buses between the PRS nodes and between the LTZ nodes and then using 1→3 level adjacency buses between the S and V nodes and the M and Z nodes to create an arrangement of quad core nodes, such as the quad core node symbol 2080 shown in FIG. 20E. For example, using the folding techniques described herein, an 8×8×8 array or a 9×9×9 array using 1→5 level adjacency buses between the PRS nodes and between the LTZ nodes and then using 1→3 level adjacency buses between the S and V nodes and the M and Z nodes creates an 8×8 quad core array or a 9×9 quad core array, respectively. Also, by using 1→5 level adjacency buses between the S and V nodes and the M and Z nodes in place of the 1→3 level adjacency buses described above would provide for up to an 8×8 eight-core array or for up to a 9×9 nine-core array.

Figures 22A, 22B:
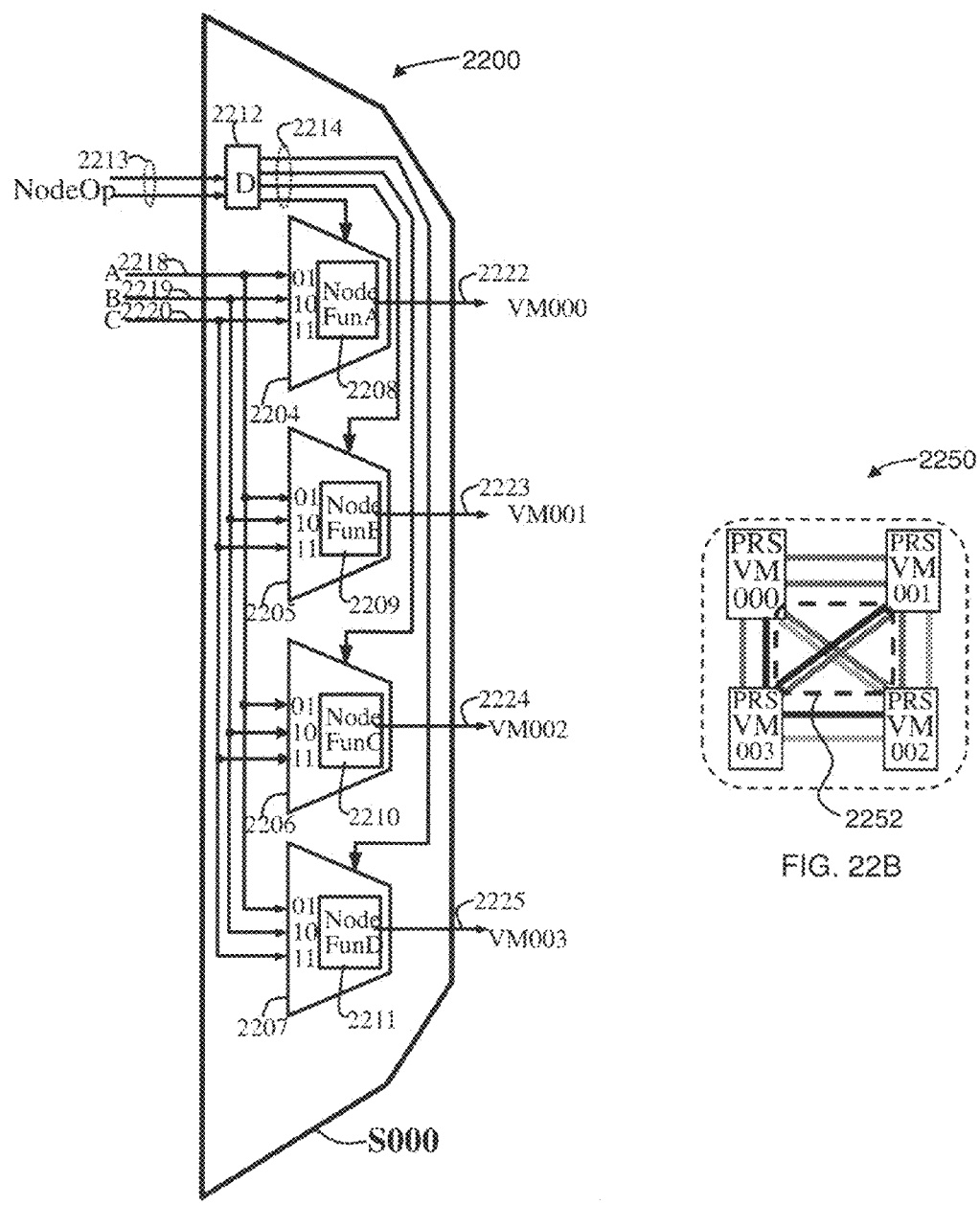
FIG. 22A illustrates an S000 node for use in a quad core node for a WAM store network with quad memory node connections in accordance with an embodiment of the present invention.
FIG. 22B illustrates an exemplary quad core node symbol using internal S nodes such as the S000 node of FIG. 22A in accordance with an embodiment of the present invention.

FIG. 22A illustrates an S000 node 2200 for use in a quad core node for a WAM store network with quad memory node connections in accordance with an embodiment of the present invention. The S000 node 2200 is constructed using four sub-node units 2204-2207 and each sub-node unit comprising input and output interfaces and node function units (NodeFuns) 2208-2211, respectively. Since there are four NodeFuns 2208-2211 in the S000 node 2200, a decoder 2212 is configured to receive a NodeOp code 2213 or a Netlevel function instruction, such as the 11-bit NLF instruction 1725 of FIG. 17 with the net level select bit 1704 in bit 21 set to a "1" to indicate the third level of the network, for example. The NLF instruction 1725 is decoded to generate four sets of control signals 2214 to appropriately control the four NodeFuns 2208-2211. External inputs A, B, and C 2218-2220 are coupled from a previous node in the network, the Rxxx nodes, for example. In one embodiment, input A 2218 from an R000 node, such as R000 node 2003 of FIG. 20A may be selected by NodeFunA 2208, input B 2219 from an R100 node may be selected by NodeFunB 2209, input C 2220 from an R300 node may be selected by NodeFunC 2210, and one of the three external inputs A, B, and C 2218-2220 may be selected by NodeFunD 2211. In other embodiments, the inputs A, B, and C 2218-2220 may be selected by the NodeFuns 2208-2211 in a different order or in different combinations, such as the three inputs 2218-2220 selected in each of the NodeFuns 2208-2211 and with the same operations or different operations configured in each of the NodeFun units. Each of the four NodeFuns 2208-2211 may be appropriately configured with a function as required or as selected for a particular implementation. Each output 2222-2225 is separately sourced by its associated NodeFuns 2208-2211 and, for example, coupled to the VM000 nodes 2005, the VM001 nodes 2006, the VM002 nodes 2007, and to the VM003 nodes 2008, respectively. Thus, the four VM000-VM003 nodes may each be individually reached as specified by a NLF instruction, such as the 11-bit NLF instruction 1725 and by the store instructions illustrated in FIG. 9E.

FIG. 22B illustrates an exemplary quad core node symbol 2250 using internal S nodes such as the S000 node 2200 of FIG. 22A in accordance with an embodiment of the present invention. The quad core node symbol 2250 is similar to the quad core node symbol 2060 of FIG. 20C with the addition of cross coupled connections 2252 between the diagonal elements of the quad core.

Figures 23A, 23B:
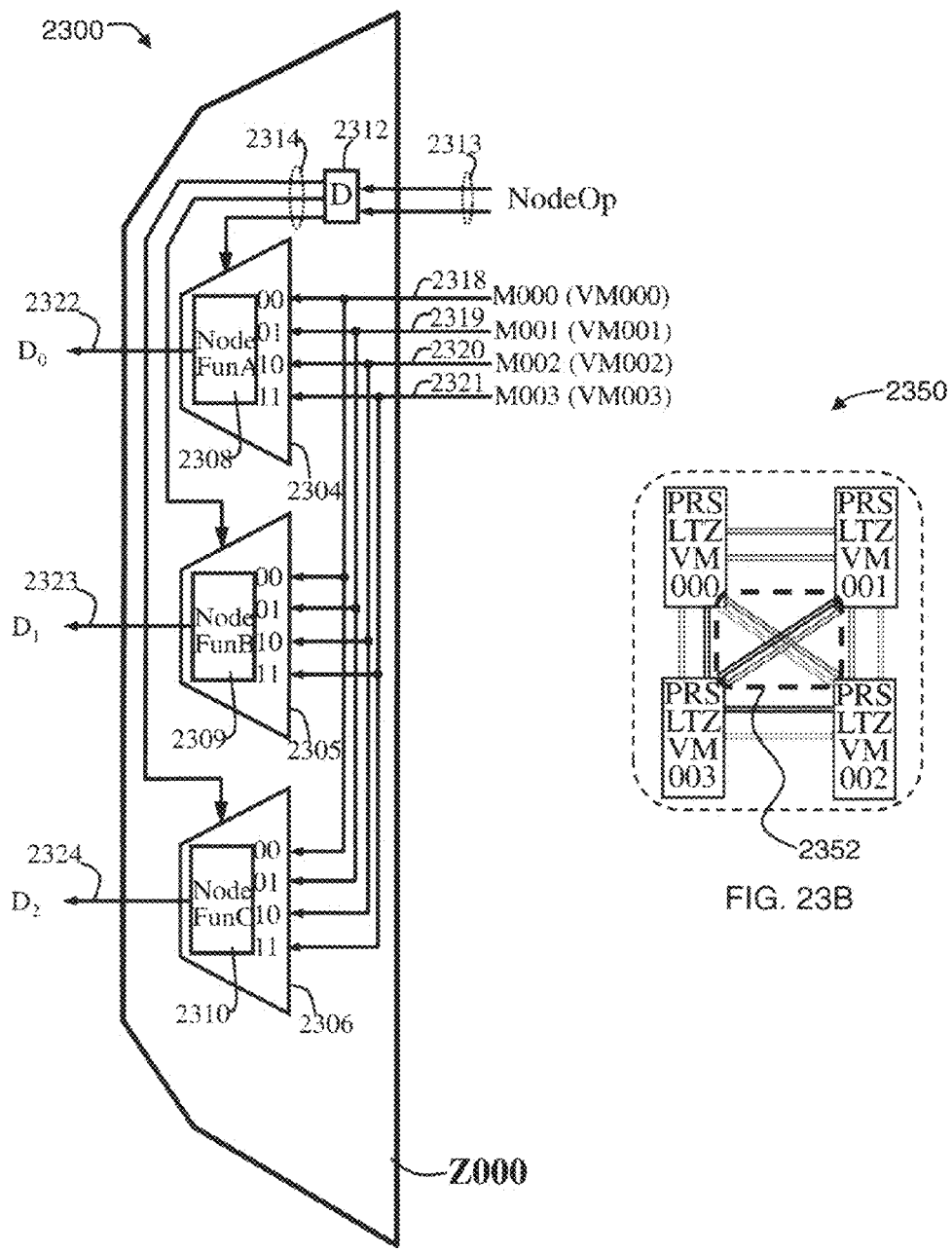
FIG. 23A illustrates a Z000 node for use in a WAM load network with quad memory node connections in accordance with an embodiment of the present invention.
FIG. 23B illustrates an exemplary quad core node symbol using internal S nodes such as the S000 node of FIG. 22A and Z nodes such as the Z000 node of FIG. 23A in accordance with an embodiment of the present invention.

FIG. 23A illustrates a Z000 node 2300 for use in a WAM load network with quad memory node connections in accordance with an embodiment of the present invention. The Z000 node 2300 is constructed using three sub-node units 2304-2306 each sub-node unit comprising input and output interfaces and node function units (NodeFuns) 2308-2310, respectively. Since there are three NodeFuns 2308-2310 in the Z000 node 2300, a decoder 2312 is configured to receive a NodeOp code 2313 or a Netlevel function instruction, such the 11-bit NLF instruction 1725 of FIG. 17 with the net level select bit 1704 in bit 21 set to a "1" to indicate the third level of the network, for example. The NLF instruction 1725 is decoded to generate three sets of control signals 2314 to appropriately control the three NodeFuns 2308-2310. External inputs 2318-2321 may be sent from a memory node in the network, the Mxxx nodes, for example. In one embodiment, input 2318 from an M000 node, internal to VM000 nodes 2075 of FIG. 20D, may be selected by NodeFunA 2308, input 2319 from an M001 node, internal to VM001 nodes 2076, may be selected by NodeFunB 2309, input 2320 from an M002 node, internal to VM002 nodes 2077, may be selected by NodeFunC 2310, and input 2321 from an M003 node, internal to VM003 nodes 2078, may be selected by one of the three NodeFun units individually or in combination with one or more of the other inputs. In other embodiments, the inputs 2318-2321 may be selected by the NodeFuns 2308-2310 in a different order or in different combinations, such as inputs 2318-2321 selected in each of the NodeFuns 2318-2310 and with the same operations or different operations configured in each of the NodeFun units. Each of the three NodeFuns 2308-2310 may be appropriately configured with a function as required or as selected for a particular implementation. Each output 2322-2324 is separately sourced by its associated NodeFuns 2308-2310 and coupled to an associated Txxx node. Thus, the four VM000-VM003 nodes may each be individually accessed as specified by a NLF instruction, such as the 11-bit NLF instruction 1725 and the load instructions illustrated in FIGS. 9A-9D.

FIG. 23B illustrates an exemplary quad core node symbol 2350 using internal S nodes such as the S000 node 2200 of FIG. 22A and Z nodes such as the Z000 node 2300 of FIG. 23A in accordance with an embodiment of the present invention. The quad core node symbol 2350 is similar to the quad core node symbol 2080 of FIG. 20E with the addition of cross coupled connections 2352 between the diagonal elements of the quad core and support for both store and load networks.

Figure 24:
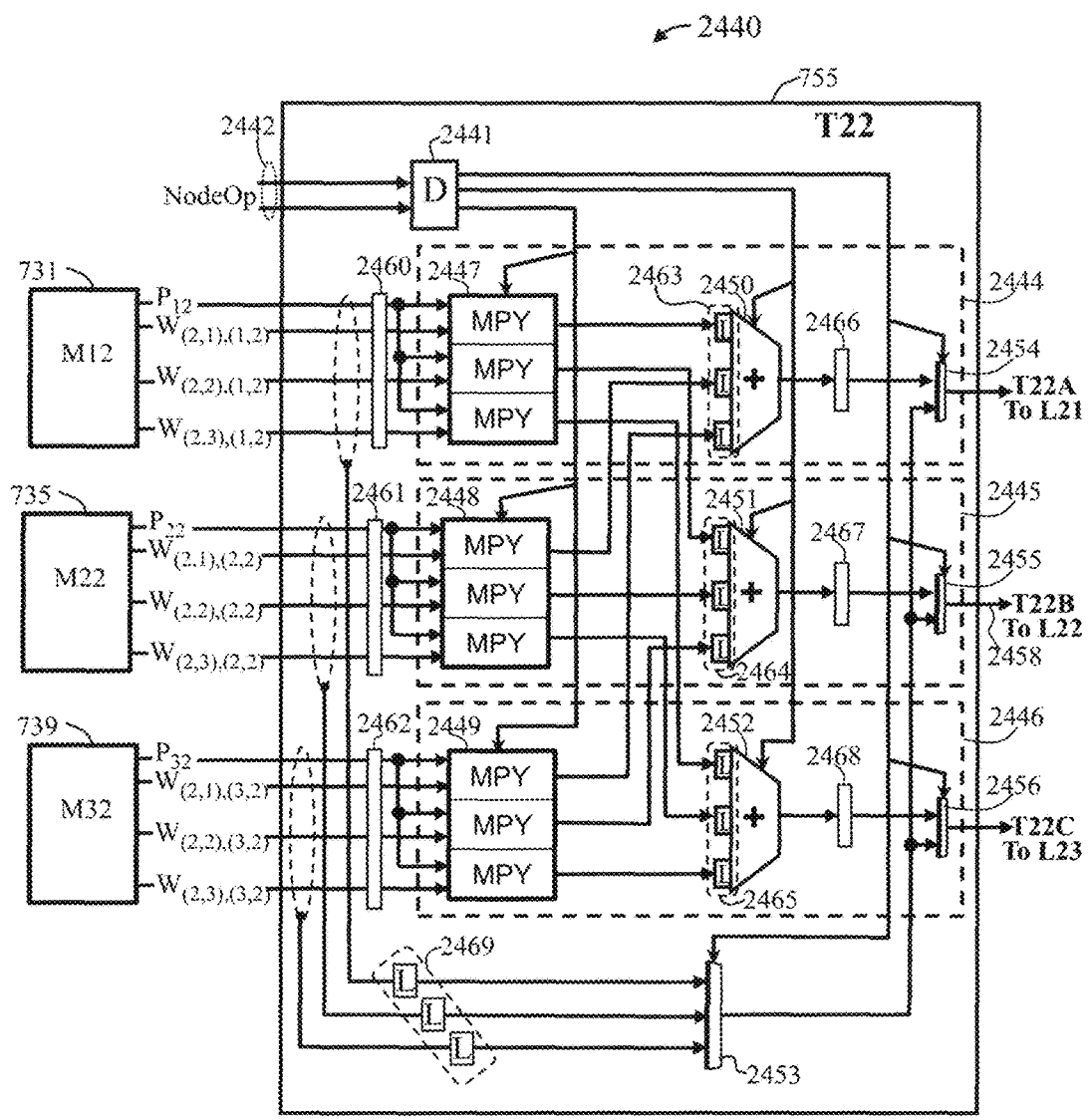
FIG. 24 illustrates a exemplary first memory T node system for a $T_{g=2,h=2}$ node with a first set of pipeline latches in accordance with an embodiment of the present invention.

FIG. 24 illustrates a exemplary first memory T node system 2440 for a $T_{g=2,h=2}$ node with a first set of pipeline latches in accordance with an embodiment of the present invention. Reference is made to the WAM16L network 700 of FIG. 7 and FIGS. 17 and 20A-20E and corresponding text of U.S. patent application entitled "Interconnection Network Connecting Operation-Configurable Nodes According to One or More Levels of Adjacency in Multiple Dimensions of Communication in a Multi-Processor and a Neural processor" U.S. application Ser. No. 13/792,039 filed on Mar. 9, 2013 (Ser. No. 13/792,039). The T node system 2440 comprises expanded details of exemplary node T22 755 of FIG. 7 of application Ser. No. 13/792,039, for example, and memory nodes M12 731, M22 735, and M32 739, also of FIG. 7. The T node system 2440 comprises a decoder 2441 having node operation (NodeOp) inputs 2442, three node function units 2444-2446 and a multiplexer 2453. The three node function units 2444-2446 comprises three groups of three two-input multipliers 2447-2449, three three-input adders 2450-2452, and three multiplexers 2454-2456. The node T22 755 is coupled to the three memory nodes 731, 735, and 739 which supply the weights and a current neuron value for processing neural functions in a neural network. As controlled by the NodeOp inputs 2442 and decoder 2441, the multipliers 2447-2449 are configured to multiply their input values and provide the results as input to the corresponding three-input adders 2450-2452 that are configured to provide a sum of the weighted neuron node results. The three-input adders 2450-2452 are coupled to corresponding multiplexers 2454-2456. The multiplexer 2453 may be configured to select at least one output from the memories M12 731, M22 735, and M32 739 which is applied as an input to multiplexers 2454-2456. Under control of the decoder 2441, the multiplexers 2454-2456 are configured to select an output of the three-input adders 2450-2452, respectively, or an output from the multiplexer 2453.

Current neuron values and weight values are stored in the memory nodes and may be formatted as 8-bit or 16-bit data values or for application specific implementations may be specified as non-power of 2 data values, for example, to meet specific precision requirements in a fixed point implementation. Alternatively, the neuron and weight values may be formatted, for example, as single precision or double precision floating point values. In one embodiment, a current neuron value and three weight values may be formatted as 8-bit data values and stored in a single addressable location in the memory nodes as 32-bits. Byte addressability may also be supported for access to each individual value. In this embodiment, the nine multipliers 2447-2449 may be implemented as 8-bit×8-bit multipliers each producing, for example, a 16-bit result that is input to one of the three three-input adders 2450-2452. For example, the three-input adder 2451 generates, for example, a 16-bit summation of three inputs, which may be a rounded or saturating fixed point result. In a different embodiment, floating point arithmetic units may be used in a system appropriately configured for floating point data types.

An exemplary neuron P22 node of a 2D neural network operates according to:

$$P_{2,2}=F(W_{(2,2),(1,1)}*P_{1,1}+W_{(2,2),(2,1)}*P_{2,1}+W_{(2,2),(3,1)}*P_{3,1}+W_{(2,2),(1,2)}*P_{1,2}+W_{(2,2),(2,2)}*P_{2,2}+W_{(2,2),(3,2)}*P_{3,2}+W_{(2,2),(1,3)}*P_{1,3}+W_{(2,2),(2,3)}*P_{2,3}+W_{(2,2),(3,3)}*P_{3,3})$$

The above equation for $P_{2,2}$ can be viewed as a function F that operates on a summation of three parts. The portion $W_{(2,2),(1,2)}*P_{1,2}+W_{(2,2),(2,2)}*P_{2,2}+W_{(2,2),(3,2)}*P_{3,2}$ is generated by T node system 2440 of FIG. 24. The other portions, $W_{(2,2),(1,1)}*P_{1,1}+W_{(2,2),(2,1)}*P_{2,1}+W_{(2,2),(3,1)}*P_{3,1}$ and $W_{(2,2),(1,3)}*P_{1,3}+W_{(2,2),(2,3)}*P_{2,3}+W_{(2,2),(3,3)}*P_{3,3}$ are generated by second and third nodes; see U.S. application Ser. No. 13/792,039 for further details. Pipeline operation of the first memory T node system 2440 is described next.

Figure 25:
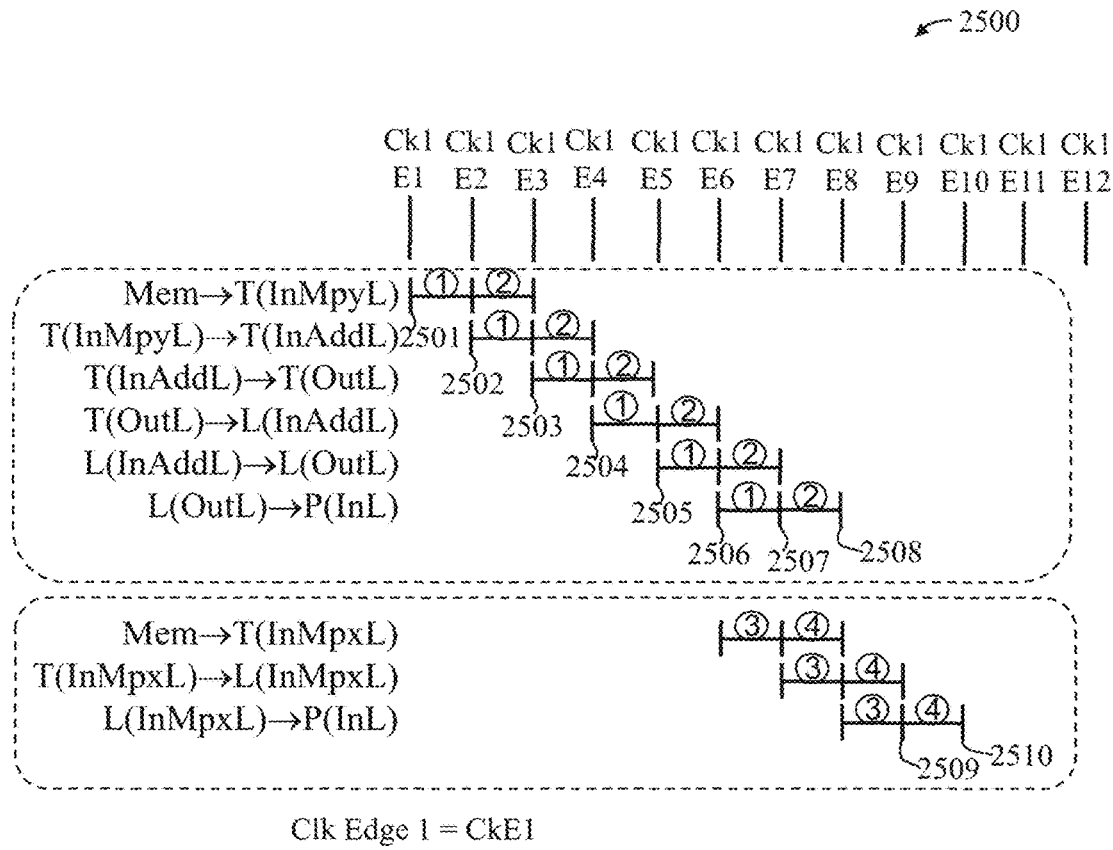
FIG. 25 illustrates an exemplary pipeline timing diagram for the first memory T node system of FIG. 24 in accordance with an embodiment of the present invention.

FIG. 25 illustrates an exemplary pipeline timing diagram 2500 for the first memory T node system 2440 of FIG. 24 in accordance with an embodiment of the present invention. In a high performance system, the fetched memory values are temporarily stored in memory pipe input multiply latches (InMpyL) 2460-2462, the multiplication results are temporarily stored in input adder latches (InAddL) 2463-2465, and the three input summation values are stored in T node function output latches (OutL) 2466-2468. Also, a second set of memory pipe input multiplexor latches (InMpxL) 2469 may be included for the memory inputs to multiplexor 2453.

In the first memory T node system 2440, three memory fetch operations are initiated to memory nodes M12 731, M22 735 and M32 739 at clock 1 edge 1 (Ck1E1) 2501. In response to the fetch operations, the memory node M12 731 provides a current neuron value for P12, and weights $W_{(2,1),(1,2)}$, $W_{(2,2),(1,2)}$, and $W_{(2,3),(1,2)}$ which are latched in T(InMpyL) 2460 at Ck1E2 2502. Memory node M22 735 provides a current neuron value for P22 and weights $W_{(2,1),(2,2)}$, $W_{(2,2),(2,2)}$, and $W_{(2,3),(2,2)}$ which are latched in T(InMpyL) 2461 also at Ck1E2 2502. Memory node M32 739 provides a current neuron value for P32 and weights $W_{(2,1),(3,2)}$, $W_{(2,2),(3,2)}$, and $W_{(2,3),(3,2)}$ which are latched in T(InMpyL) 2462 also at Ck1E2 2502. The operation path for P22 includes a multiplication $W_{(2,2),(1,2)}*P_{1,2}$ which is generated in the multiply group 2447 and latched in T(InAddL) 2464 at Ck1E3 2503, a multiplication $W_{(2,2),(2,2)}*P_{2,2}$ which is generated in the multiply group 2448 and latched in T(InAddL) 2464 at Ck1E3 2503, and another multiplication $W_{(2,2),(3,2)}*P_{3,2}$ which is generated in the multiply group 2449 and latched in T(InAddL) 2464 at Ck1E3 2503. The three multiplication results are latched in the input adder latch 2464 and in the next pipe stage the latched multiplication results are added in the three input adder 2451 to generate $W_{(2,2),(1,2)}*P_{1,2}+W_{(2,2),(2,2)}*P_{2,2}+W_{(2,2),(3,2)}*P_{3,2}$ which is latched in T(OutL) 2467 at Ck1E4 2504. The summation result from the T(OutL) 2467 is selected for output through multiplexer 2455 on T22B to L22 output 2458 and latched at an L node input adder latches (L(InAdd) in a coupled L node (not shown) at Ck1E5 2505. An addition function in the L node provides a summation of three T node outputs and latched at Ck1E6 2506. The summation from the L node is latched at a P node input P(InL) in a coupled P node (not shown) at Ck1E7 2507. By pipelining, the network multiply summation described above is identified by a "circled 1" and a second network multiply summation, identified by a "circled 2" is latched at Ck1E8 2508 at the P node input.

In response to a third fetch operation, the memory node M12 731 may be selected to provide a current neuron value for P12, and weights $W_{(2,1),(1,2)}$, $W_{(2,2),(1,2)}$, and $W_{(2,3),(1,2)}$ which are latched in the input multiplexer latches T(InMpxL) 2469, Mem→T(InMpxL), at Ck1E7 2507. The output of the multiplexor 2453 is selected for output from the T node and latched at the input of multiplexors in the L node, T(InMpxL)→L(InMpxL), at Ck1E8 2508. The output of the L node is latched at the input of the P node, L(InMpxL)→P(InL), at Ck1E9 2509. By pipelining, the next multiplexor selected memory value, identified by a "circled 4" is latched at Ck1E10 2510 at the P node input.

Figure 26:
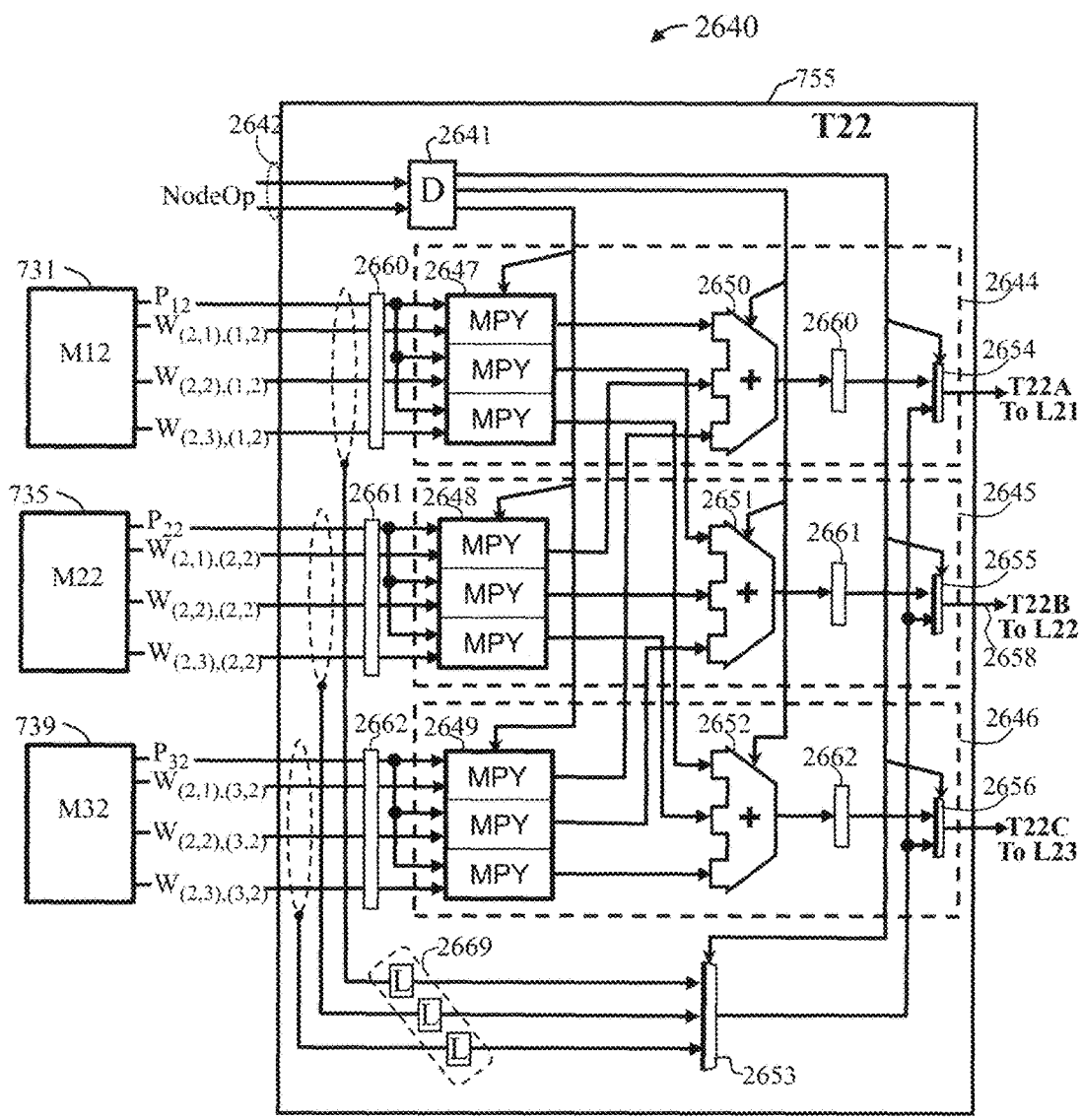
FIG. 26 illustrates an exemplary second memory T node system for a $T_{g=2,h=2}$ node with a second set of pipeline latches in accordance with an embodiment of the present invention.

FIG. 26 illustrates an exemplary second memory T node system 2640 for a $T_{g=2,h=2}$ node with a second set of pipeline latches in accordance with an embodiment of the present invention. The exemplary second memory T node system 2640 of FIG. 26 does not have the input adder latches T(InAddL) 2463-2465 of the exemplary first memory T node system 2440 of FIG. 24. The clock used for the systems shown in FIGS. 24 and 25 may be a high performance clock such as a one gigahertz clock depending on the system clock timing analysis. The clock used in FIGS. 26 and 27 may be a clock that is slower than the clock used in FIGS. 24 and 25, such as a 500 MHz clock. In such a system, the number of stages of pipeline latches may be reduced depending upon the implementation technology. The clock and timing delay through the elements will vary depending on function complexity at each node, network adjacency and depth, memory access delays, and technology thus affecting the design of pipelining in a system.

Figure 27:
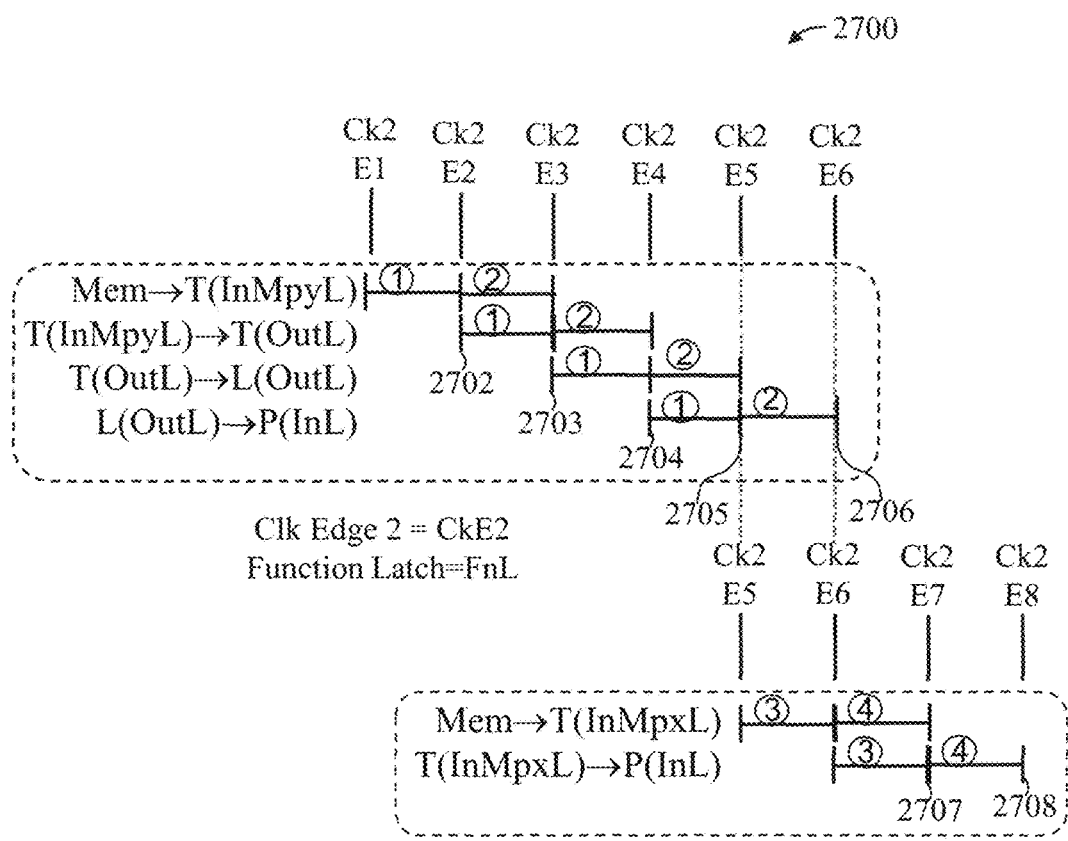
FIG. 27 illustrates an exemplary pipeline timing diagram for the second memory T node system of FIG. 26 in accordance with an embodiment of the present invention.

FIG. 27 illustrates an exemplary pipeline timing diagram 2700 for the second memory T node system 2640 of FIG. 26 in accordance with an embodiment of the present invention.

With this configuration in FIG. 26, a memory fetch Mem→T(InMpyL) completes at Ck2E2 2702, a multiply add T(InMpyL)→T(OutL) finishes execution at Ck2E3 2703, a first network path which includes an addition function in the L node T(OutL)→L(OutL) completes at Ck2E4 2704, and a second network path L(OutL)→P(InL) completes at Ck2E5 2705. For some configurations, such as the neural example with 8-bit multiplication and three 16-bit input addition, such a pipeline stage delay can be implemented depending on design of the particular functions, technology, and signal routing with a system clock timed to meet the rest of the system requirements. By pipelining, the next network multiply summation, identified by a "circled 2", is latched at Ck2E6 2706 at the P node input.

In response to a third fetch operation, the memory node M12 731 may be selected to provide data which is latched in the input multiplexer latches T(InMpxL) 2669, Mem→T(InMpxL), at Ck2E6 2706. The output of the multiplexor 2653 is selected for output from the T node and latched at the input of the P node, T(InMpxL)→P(InL), at Ck2E7 2707. By pipelining, the next multiplexor selected memory value, identified by a "circled 4" is latched at Ck2E8 2708 at the P node input.

The WAM 16 quad core network 2100 of FIG. 21 may be extended by replacing each quad core node, such as the exemplary quad core node symbol 2080 of FIG. 20E, with the quad core node symbol 2350 of FIG. 23B. Also, the technique of increasing the connectivity within the core nodes, as described between the S and V nodes and the M and Z nodes as shown for the 4×4×4 array using the quad core node symbol 2350 of FIG. 23B, allows layering of different number of planes. For example, a 4×4×5 array reorganized and connected based on the elements and wiring of FIGS. 22A and 23A to provide for a 4×4 5-core array. Also, rectangular arrays are supported using the present invention as described herein, such as a 5×4×6 array reorganized and connected as using 13 level adjacency buses between the PRS nodes and between the LTZ nodes and then using S nodes such as the S000 node 2200 of FIG. 22A and Z node such as the Z000 node 2300 of FIG. 23A to provide for a 5×4 6-core array.

Figure 28:
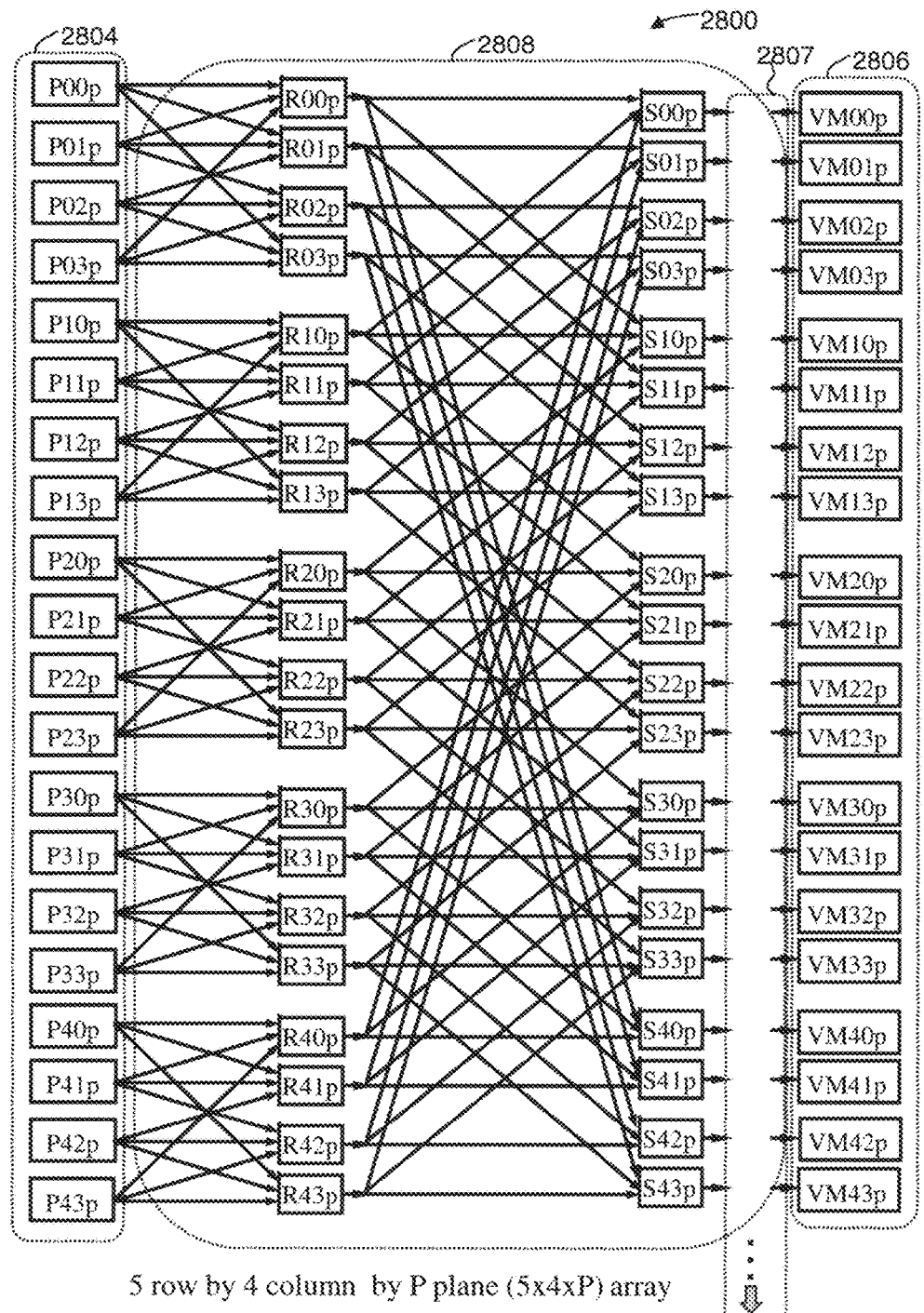
FIG. 28 illustrates an exemplary five row by four column by P plane (5×4×P) array for store operations in accordance with an embodiment of the present invention.

FIG. 28 illustrates an exemplary five row by four column by P plane (5×4×P) array 2800 for store operations in accordance with an embodiment of the present invention. A processor array 2804 of twenty processors P00p-P43p are illustrated with nodes in each plane that each can initiate a store operation to store data in a memory location in a Wings array memory 2806 consisting of twenty memory blocks M00p-M43p that are part of VM00p-VM43p nodes, respectively. Each plane of these elements are connected by an S to V network 2807 utilizing 1→N adjacency networks or a completely connected network such as using S nodes, such as the S000 node 2200 of FIG. 22A extended as required to support the number of planes in the array, and the Z000 node 2300 of FIG. 23A extended as required to support the number of planes in the array. The processor and memory block nodes are organized in linear arrays and identified according to a row by column by plane (R×C×P) matrix where, in this example, R equals five representing the number of rows in the matrix, C equals four representing the number of columns, P equals a plane number which may vary according to system requirement, such as having P=2 or P=4, for example. A processor $P_{r,c,p}$, a memory block $M_{r,c,p}$, and internal nodes of the network are labeled in a row r by column c by plane p format where $r \in \{0, 1, \ldots, R-1\}$, $c \in \{0, 1, \ldots, C-1\}$, and $p \in \{0, 1, \ldots, P-1\}$. The processors are not directly connected to each other nor are the memory blocks directly connected to any of the other memory blocks. The processors are connected to the memory blocks over a three stage network 2808.

Figure 29A:
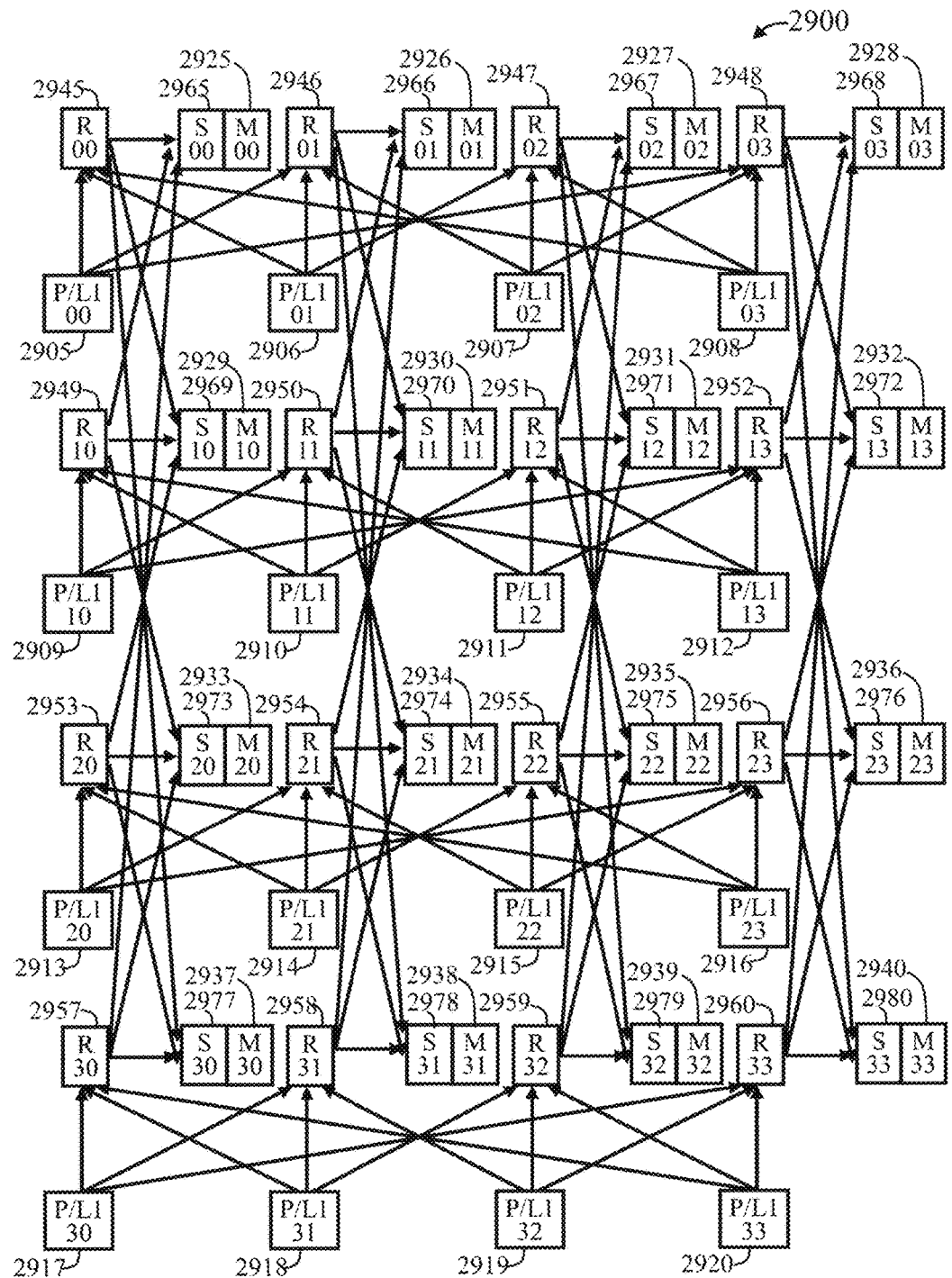
FIG. 29A illustrates an exemplary WAM16S network in a physical layout form in accordance with an embodiment of the present invention.

FIG. 29A illustrates an exemplary WAM16S network 2900 in a 2D organization of elements in accordance with the present invention. The P/L1 nodes 2905-2920, M nodes 2925-2940, network R nodes 2945-292960, and network S nodes 2965-2980 are arranged according to a G×H matrix where G=H=4. Each node is identified by a row (r) and column (c) subscripts format where r∈{0,1,2,3} and c∈{0,1,2,3}. In one embodiment, each P/L1 node may be a processor of the P/L1 nodes 2905-2920 that interconnect with the M nodes 2925-2940 across the WAM network. In another embodiment, each P/L1 node may be a processor and level 1 cache (L1) where the P/L1s nodes 2905-2920 interconnect with M nodes 2925-2940 that are configured as level 2 caches (L2s) across the WAM network. The P/L1$_{r,c}$ nodes 2905-2920 and first stage nodes R$_{r,c}$ 2945-2960 are separately coupled across each row r. The first stage nodes R$_{r,c}$ 2945-2960 and the second stage nodes S$_{r,c}$ 2965-2980 are separately coupled across each column c.

FIG. 29B illustrates various selectors 2985 for a 1→3 adjacency network that interconnects the P/L1 nodes and memory nodes in the exemplary WAM16S network of FIG. 29A in accordance with an embodiment of the present invention. For example, a first P/L1 output control circuit 2986 may be used by each of the P/L1 nodes, an alternative second P/L1 output control circuit 2992 may be used by each of the P/L1 nodes, an R node circuit 2989, and an S node circuit 2990 may be coupled with each of the memory nodes in accordance with an embodiment of the present invention.

The first P/L1 output control circuit 2986 receives a single output 2993 from a P/L1 node and also receives a West enable output signal (W$_{EO}$), an identity (A) enable output signal (A$_{EO}$), and an East enable output signal (E$_{EO}$) from the P/L1 node, for West output (W$_O$), A output (A$_O$), and East output (E$_O$) couplings. Each P/L1 node provides two control bits that are decoded to generate the W$_{EO}$, A$_{EO}$, and E$_{EO}$ signals 2994. For East couplings, a "01" is decoded to control an East selector to transmit on East output (E$_O$) a value received on the single output 2993. For identity couplings, a "00" is decoded to control an A selector to transmit on A output (A$_O$) a value received on the single output 2993. For west couplings, a "10" is decoded to control a West selector to transmit on West output (W$_O$) a value received on the single output 2993. A "11" is decoded to select all three selectors to transmit on W$_O$, A$_O$, and E$_O$ the value received on the single output 2993.

The second P output control circuit 2992 receives three outputs 2995 from a P/L1 node and also receives a West enable output signal (W$_{EO}$), an identity (A) enable output signal (A$_{EO}$), and an East enable output signal (E$_{EO}$) from the PE node, for W$_O$, A$_O$, and E$_O$ couplings. Each P/L1 node provides two control bits that are decoded to generate the W$_{EO}$, A$_{EO}$, and E$_{EO}$ signals 2994. For East couplings, a "01" is decoded to control an East selector to transmit on East output (E$_O$) a value received on one of the three output 2995. For identity couplings, a "00" is decoded to control an A selector to transmit on A output (A$_O$) a value received a different one of the tree outputs 2995. For west couplings, a "10" is decoded to control a West selector to transmit on West output (W$_O$) a value received on a different one of the three outputs. A "11" is decoded to select all three selectors and to each transmit a value received on each of the three outputs 2995.

The R node circuit 2989 receives four bits comprising two control bits for RxxMuxSel 2996 that are decoded to select one of the multiplexer N$_{mux}$, B$_{mux}$, and S$_{mux}$, and two bits for RxxMuxINSel 2997 that are decoded to select an input, one of W$_{rcv}$, A$_{rcv}$, and E$_{rcv}$, to a selected multiplexer. For example, RxxMuxSel="10" selects the N$_{mux}$, RxxMuxSel="00" selects the B$_{mux}$, and RxxMuxSel="01" selects the S$_{mux}$. A "11" is decoded to select all three selectors, the N$_{mux}$, the B$_{mux}$, and the S$_{mux}$, and to transmit each separate value received on each of the three inputs, W$_{rev}$, A$_{rcv}$, and E$_{rcv}$. Also, for example, RxxMuxINSel="01" selects the E$_{rcv}$ input, RxxMuxINSel="00" selects the A$_{rcv}$ input, and RxxMuxINSel="10" selects the W$_{rcv}$ input.

The S node circuit 2990 receives 2 control bits for selecting an input, one of N$_{rcv}$, B$_{rcv}$, and S$_{rcv}$, to be output on the Sxx node output to a V node, for a network with a larger number of stages, or a memory node, as shown in FIG. 29A. If appropriate, in a particular implementation, buffers may be included in various selectors, such as the S nodes 2965-2980 of FIG. 29A. Also, each S node circuit 2990 may be expanded to allow three selectable outputs from each S node to allow an N$_{rcv}$ signal, a B$_{rcv}$ signal and an S$_{rcv}$ signal to be received at each M node, which may be configured internally with three blocks of memory each with a separate input port and a separate output port.

Figure 30:
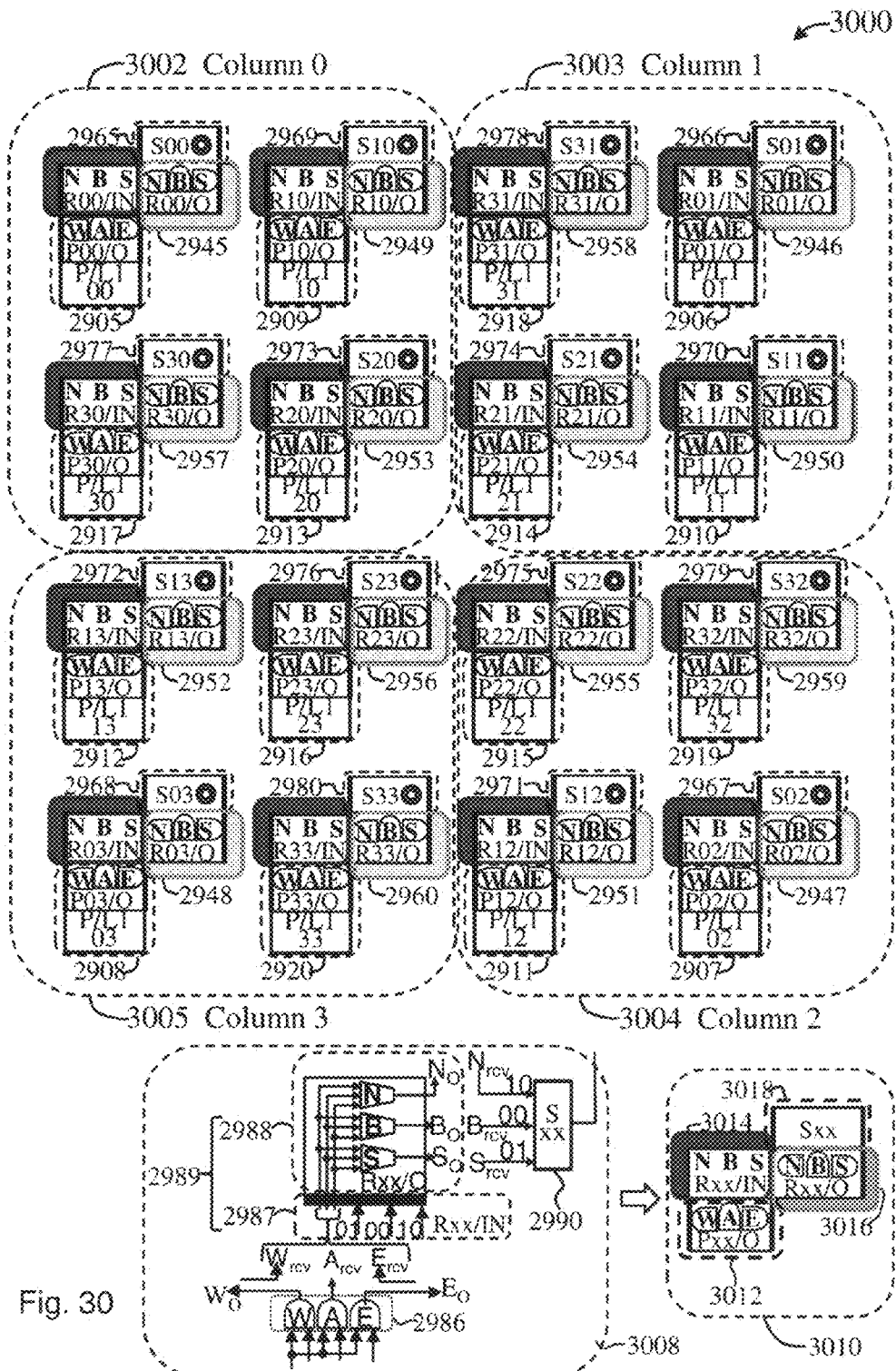
FIG. 30 illustrates a first layer in a 3D physical implementation comprising the P/L1 nodes and various selectors for the 1→3 adjacency network of FIGS. 29A and 29B in accordance with an embodiment of the present invention.

FIG. 30 illustrates a first layer in a 3D physical implementation 3000 comprising the P/L1 nodes and various selectors 2985 for the 1→3 adjacency network of FIGS. 29A and 29B in accordance with an embodiment of the present invention. The P/L1xx, Rxx, Sxx, and Mxx nodes are arranged by grouping the nodes in a column together. For example, P/L1-00 node 2905, P/L1-10 node 2909, P/L1-20 node 2913, P/L1-30 node 2917, R00 node 2945, R10 node 2949, R20 node 2953, R30 node 2957, S00 node 2965, S10 node 2969, S20 node 2973, and S30 node 2977 are the nodes in column 0 of FIG. 29A and grouped together in the first layer as column 0 group 3002 in FIG. 30. Corresponding nodes in column 1 of FIG. 29A are grouped together in the first layer as column 1 group 3003. Corresponding nodes in column 2 of FIG. 29A are grouped together in the first layer as column 2 group 3004. Also, corresponding nodes in column 3 of FIG. 29A are grouped together in the first layer as column 3 group 3005.

In FIG. 30, the block 3008 shows an exemplary connection of the first P/L1 output control circuit 2986 coupled to the Rxx node circuit 2989 by the A$_O$ output to A$_{RCV}$ input, made up of an Rxx node input (Rxx/IN) circuit 2987 and an Rxx node output (Rxx/O) circuit 2988, which is coupled to the S node circuit 2990, also shown in FIG. 29B. The A$_O$ output of the Rxx node circuit 2986 is connected to the A$_{RCV}$ input and the B$_O$ output of the Rxx node output (Rxx/O) circuit 2988 is connected to the B$_{RCV}$ input of the S node circuit 2990 on the first layer in a 3D physical implementation 3000. Also, the first P/L1 output control circuit 2986 has a West output path (W$_O$) that is coupled to a West node at an East receive (E$_{RCV}$) input and an East output path (E$_O$) that is coupled to an East node at a West receive (W$_{RCV}$) input. A symbolic representation of block 3008 is shown in block 3010 and then used in the 3D physical implementation 3000. In block 3010, the block 3012 corresponds to the first P/L1 output control circuit 2986, the block 3014 in a dark blue corresponds to the Rxx/IN circuit 2987, the block 3016 in a lighter blue corresponds to the Rxx/O circuit 2988, and the block 3018 corresponds to the S node circuit 2990. The Rxx node circuit 2989 comprises the Rxx node input (Rxx/IN) circuit 2987 and the Rxx node output (Rxx/O) circuit 2988. For example, R23 2956 in column 3 group 3005 comprises an R23/IN circuit, such as the block 3014 and an R23/O circuit, such as the block 3016.

It is noted that in a single instruction multiple data (SIMD) mode of operation, each node when transmitting to the East ($E_O$), receives from the West ($W_{rcv}$), when transmitting to the West ($W_O$), receives from the East ($E_{rcv}$), when transmitting to the North ($N_O$), receives from the South ($S_{rcv}$), and when transmitting to the South ($S_O$), receives from the North ($N_{rcv}$). In other modes of operation, the various selectors 2985 may be more independently controlled depending upon the destination. For example, the first P/L1 output control circuit 2986 coupled to the R node circuit 2989 may be configured to transmit on a North output ($N_O$) path from a North multiplexor in the R node circuit 2988 by receiving an output $A_O$ from the first P/L1 output control circuit 2986 and selecting the North multiplexor and the $A_{RCV}$ input to the North multiplexor. In the same cycle, the R node circuit 2989 may be further configured to transmit on an identity output ($B_O$) path from a B multiplexor in the R node circuit 2988 by receiving an output $W_O$ from an East node that is transmitting West and selecting the B multiplexor and the $E_{RCV}$ input to the B multiplexor. Also, for example, as can be seen in FIG. 29A, M-11 2930 may be reached from P/L1-00, P/L1-01, P/L1-02, P/L1-10, P/L1-11, P/L1-12, P/L1-20, P/L1-21, and P/L1-22. It is noted that all of these P/L1 nodes together cannot transmit to the same memory node, such as M-11, in the same transmission cycle. Also, with proper selector controls, P/L1-11 2910 may broadcast to M-00, M-01, M-02, M-10, M-11, M-12, M-20, M-21, and M-22 in the same transmission cycle. Further, other configurations and communication paths may be enabled with appropriate selector controls as required by a particular application.

Figure 31:
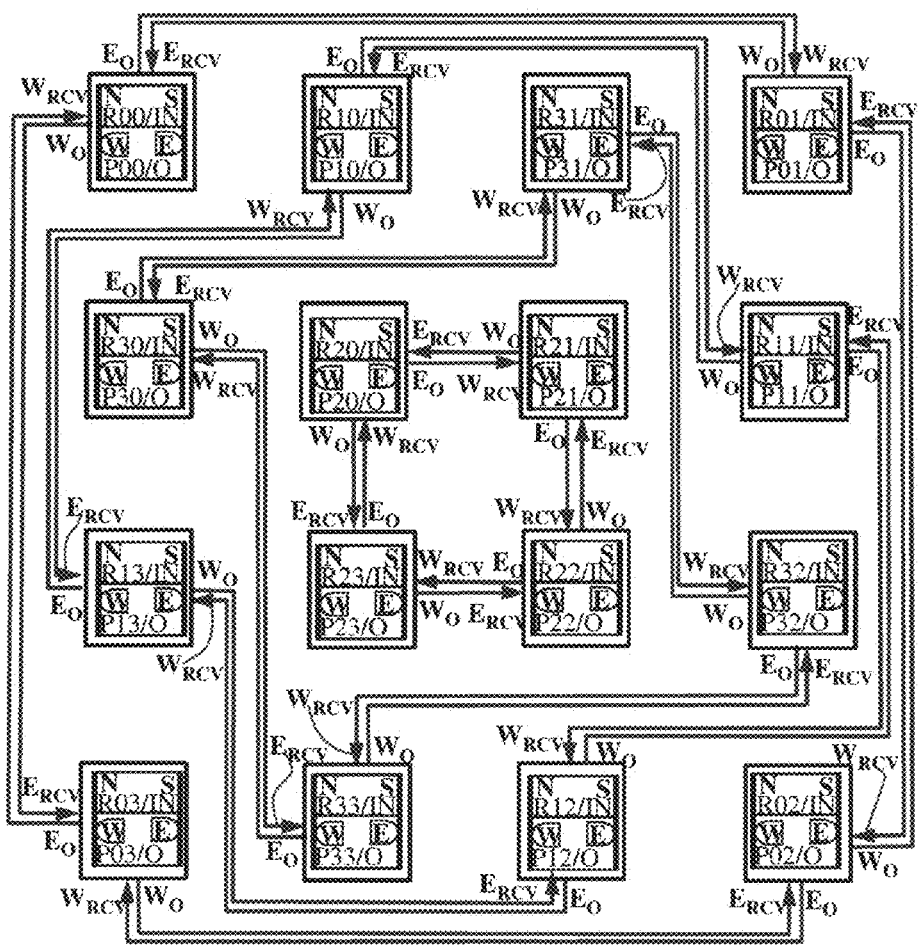
FIG. 31 illustrates a wiring plane P to R horizontal connection paths in a second layer in the 3D physical implementation that overlays the first layer in the 3D physical implementation of FIG. 30 in accordance with an embodiment of the present invention.

FIG. 31 illustrates a wiring plane P to R horizontal connection paths 3100 in a second layer, for example, in the 3D physical implementation that overlays the first layer in the 3D physical implementation of FIG. 30 in accordance with an embodiment of the present invention. A SIMD notation is used where a transmit $W_O$ output is connected to an $E_{RCV}$ input and a transmit $E_O$ output is connected to a $W_{RCV}$ input. By placing the columns in groups utilizing the first layer and the second layer as shown in FIGS. 30 and 31, for example, it is possible to make the horizontal connections without wire crossings in an implementation. Also, the layout shown in FIG. 31 equalizes horizontal wrap around connections. Since, an $A_O$ output is connected to an $A_{RCV}$ input and a $B_O$ output is connected to a $B_{RCV}$ input on the first layer in a 3D physical implementation 3000, there is no need to provide those connection paths on the second layer in the 3D physical implementation.

FIG. 32 illustrates a wiring plane R to S vertical connection paths in a third layer, for example, in the 3D physical implementation that overlays the second layer in the 3D physical implementation of FIG. 31 in accordance with an embodiment of the present invention. A SIMD notation is used where a transmit $S_O$ output is connected to an $N_{RCV}$ input and a transmit $N_O$ output is connected to an $S_{RCV}$ input. By placing the columns in groups as shown, it is possible to make the vertical connections without wire crossings in an implementation. Also, the layout shown in FIG. 32 equalizes vertical wrap around connections. Since, an $A_O$ output is connected to an $A_{RCV}$ input and a $B_O$ output is connected to a $B_{RCV}$ input on the first layer in a 3D physical implementation 3000, there is no need to provide those connection paths on the third layer in the 3D physical implementation. The Sxx output from a first layer Sxx node is indicated by a via connector symbol "⊙" which indicates the Sxx output passes from the first layer, with the connector symbol "⊙" shown in FIG. 30, through each successive layer to the memory plane 3300, shown in FIG. 33.

FIG. 33 illustrates a memory plane 3300 in a fourth layer in the 3D physical implementation that overlays the third layer in the 3D physical implementation of FIG. 32 in accordance with an embodiment of the present invention. The Sxx output from a first layer Sxx node is indicated by a via connector symbol "⊙" which indicates the Sxx output passes from the first layer through each successive layer to connect to the appropriate memory block on the memory plane 3300.

Figure 34:
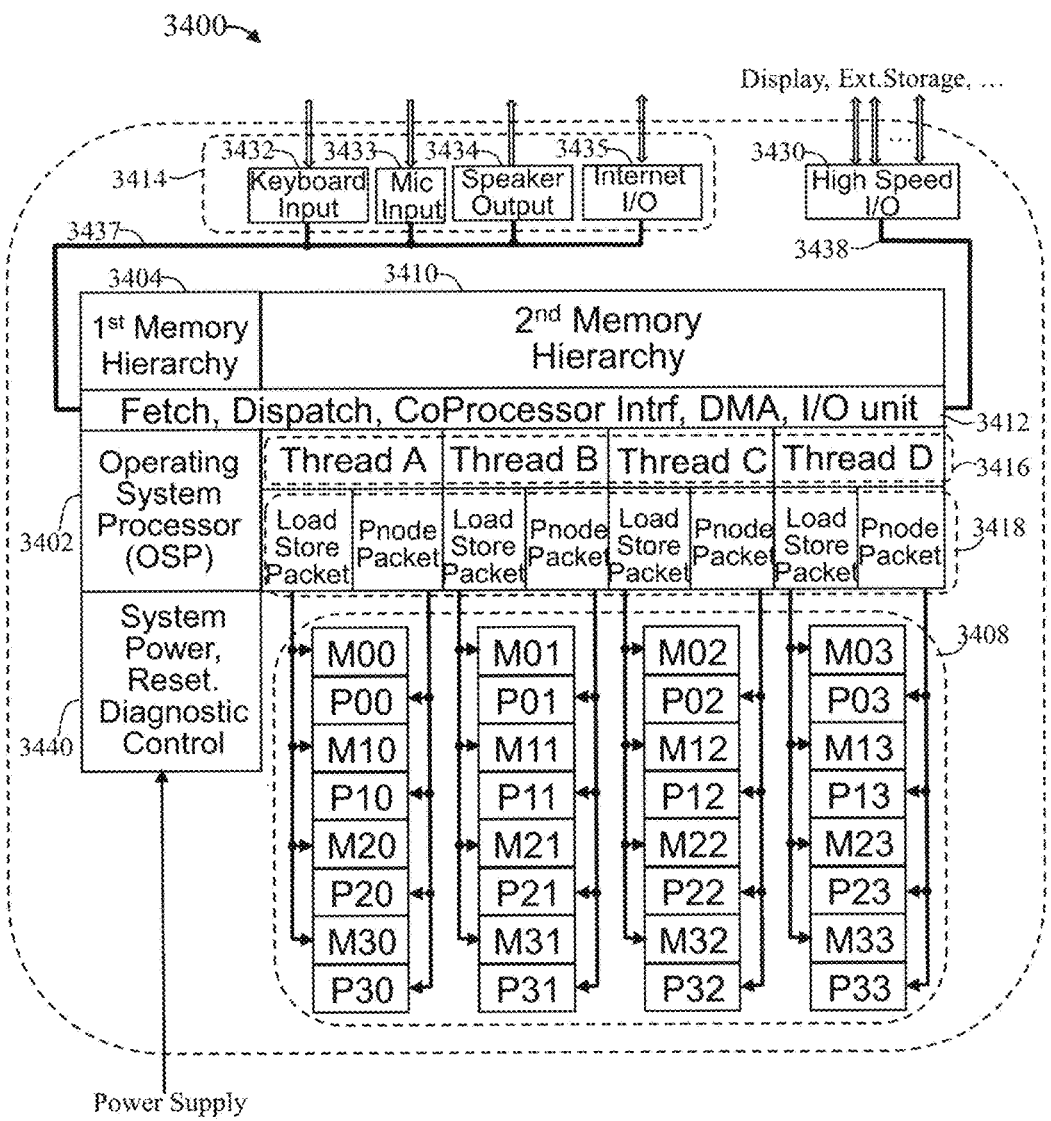
FIG. 34 illustrates an exemplary Wings Array Memory (WAM) system design in accordance with an embodiment of the present invention.

FIG. 34 illustrates an exemplary Wings Array Memory (WAM) system design 3400 in accordance with an embodiment of the present invention. The WAM system design 3400 comprises an operating system processor (OSP) 3402, a first memory hierarchy 3404, a processor memory array 3408, a second memory hierarchy 3410, a fetch, dispatch, coprocessor interface (Intrf), direct memory access (DMA) input/output (I/O) unit 3412, a plurality of thread control units 3416, and a plurality of load store packet and processor node (Pnode) packet units 3418. The first memory hierarchy 3404 may be primarily used by the OSP 3402. The processor memory array 3408 is illustrated as an exemplary 4×4 organization, such as the exemplary WAM16S network 200 of FIG. 2, though not limited to such an organization and larger multi-dimensional array organizations may be utilized. For example, the processor memory array 3408 may be organized with the 4×4×4 exemplary WAM 16 quad core network 2100 of FIG. 21 in which each processor node may comprise a 4×3 arrangement of execution units and storage elements in a physical layout form with a one to three level adjacency as shown in the first processor node 400 of FIG. 4. The thread control units 3416 may be configured to operate the processor memory array 3408 with a single thread control for single instruction multiple data (SIMD) operation. The thread control units 3416 may be alternatively programmed to operate with multiple threads, such as four threads A-D. The memories in the second memory hierarchy 3410 may be global memories supporting the WAM system design 3400.

The fetch, dispatch, coprocessor Intrf DMA I/O unit 3412 may also be configured to provide an interface bus or buses 3437 to an I/O subsystem 3414. The I/O subsystem 3414 comprises a keyboard input 3432, a microphone (Mic) input 3433, a speaker output 3434, and an Internet I/O unit 3435. The fetch, dispatch, coprocessor Intrf DMA I/O unit 3412 may also be configured to provide a high speed interface bus or buses 3438 to a high speed I/O unit 3430 to provide a data path to external displays, external storage, and the like. Also, the WAM system design 3400 may be partitioned into multiple power control domains each having their own regulated supply voltage and separate reset controls such as may be provided by a system power, reset, and diagnostic control unit 3440 which receives system power from an external power supply.

A program, such as illustrated in FIGS. 10 and 11, comprising instructions such as illustrated in FIGS. 7B, 7C, 8A-8D, 9A-9E, 16, 17, and the like, may be loaded to a packet instruction memory, such as the packet instruction memory 1402 of FIG. 14 or the separate CEP memory or CEP memories supported by the hardware X (CHX) 26-bit instruction 1600 of FIG. 16. The program or programs, such as illustrated in FIGS. 10 and 11 or the like are configured to operate each node of a system, such as the nine node processing system 300 of FIG. 3 and such as the 4×4×4 array organized into 16 quad core nodes 2100 of FIG. 21. The program or programs are also configured to operate nodes such as the S000 node 2200 of FIG. 22A used in the nodes in the quad core node symbol 2250 of FIG. 22B, the Z000 node 2300 of FIG. 23A used in the nodes in the quad core node symbol 2350 of FIG. 23B, and other nodes, such as the first memory T node system 2440 of FIG. 24 and the second memory T node system 2640 of FIG. 26. The program or programs are further configured to access data for transfer to and from nodes of a system, such as the nine node processing system 300 of FIG. 3 and such as the 4×4×4 array organized into 16 quad core nodes 2100 of FIG. 21. For example, a P node, such as a processor from processors 104 of FIG. 1 and from a $P_{rcp}$ node from PRS planes 1810-1813 of FIG. 18, may access data generated from an execution unit, such as the arithmetic unit A00 558 of FIG. 5B, and may also access data from a local file storage, such as the local file (LF) 565 of FIG. 5B. Also, data may be accessed from a memory, such as from one or more of the memory blocks 106 of FIG. 1 and from an $M_{rcp}$ node from VM planes 1820-1823 of FIG. 18. The program or programs may be loaded from a computer readable non-transitory medium, such as disk, storage units and the like by an attachment mechanism, such as through a coupled wire or wireless network, to the appropriate destination memory in the system, such as the nine node processing system 300 or the 4×4×4 array organized into 16 quad core nodes 2100 of FIG. 21 which may be expanded by nodes, such as the S000 node 2200 of FIG. 22A and the Z000 node 2300 of FIG. 23A. The nine node processing system 300 or the 4×4×4 array organized into 16 quad core nodes 2100 of FIG. 21 or other various array sizes using 1→N adjacency networks as described herein may be included in a processing chip in a personal computer, a lap top computer, a tablet computer, a smart phone, or a special purpose processor and interconnected to an intranet or the Internet by wired or wireless connections. In another embodiment, the nine node processing system 300 or the 4×4×4 array organized into 16 quad core nodes 2100 of FIG. 21 or other various array sizes using 1→N adjacency networks as described herein may be included in a processing chip that interconnects to a personal computer, a lap top computer, a tablet computer, a smart phone, or a special purpose processor to augment the processing on such devices and also may be interconnected to an intranet or the Internet by wired or wireless connections.

While the present invention is disclosed in a presently preferred context, it will be recognized that the teachings of the present invention may be variously embodied consistent with the disclosure and claims. It will be recognized that the present teachings may be adapted to other present and future architectures to which they may be beneficial.

I claim:

1. A method of executing a chain of instructions as part of a program executed by an array processing unit, the method comprising:

receiving a chain of instructions that includes a load instruction and, in the chain of instructions, a destination instruction having a dependency on the load instruction, wherein the load instruction identifies a first memory node, a fetch address of a first data operand in the first memory node, and a position of the destination instruction in the chain of instructions, and wherein the destination instruction identifies a function that takes the first data operand as an input;

executing the load instruction to access the first data operand from the first memory node at the fetch address for delivery through a load network to a destination register included in a destination node associated with the position of the destination instruction, wherein according to a G×H matrix, a G×H array of memory nodes is connected by the load network to a G×H array of destination nodes, the load network comprising N-input by N-output multiplexing (N×N) elements organized into stages for corresponding dimensions of the G×H matrix, and in each stage having wiring configured according to a 1 to N adjacency of connections to the N×N elements which includes wrap around adjacent N×N elements and connections between memory nodes, N×N elements, and destination nodes in the same position in the G×H matrix, N an odd integer, N>1, G≥N and H≥N; and executing the destination instruction in the destination node to access the first data operand from the destination register, to input the accessed first data operand to the function specified by the destination instruction, and to produce a result for use in the program.

2. The method of claim 1, wherein an N×N element of the N×N elements includes N multiplexers, each multiplexer individually operable to select from N inputs and generate an output, whereby N outputs are generated by the N×N element.

3. The method of claim 1, wherein a first stage of a first corresponding dimension of the G×H matrix comprises wiring configured according to a 1 to N adjacency of connections to G×H N×N elements, each N×N element of the first stage includes N inputs, N multiplexors, and N outputs, each multiplexor individually operable to select from the N inputs and generate an output, whereby the N outputs are generated by each N×N element of the first stage and wherein a second stage of a second corresponding dimension of the G×H matrix comprises wiring configured according to a 1 to N adjacency of connections to G×H N×N elements, each N×N element of the second stage includes N inputs, N multiplexors, and N outputs, each multiplexor individually operable to select a same input from the N inputs and generate a same output on the N outputs, operating as a three-input by 1-output multiplexing (3×1) element with a fan out of three.

4. The method of claim 1, wherein an additional instruction is located in the chain of instructions between the load instruction and the destination instruction.

5. The method of claim 1, wherein the load instruction identifies the first memory node that is selected, according to a select field in the load instruction, from an N×N array of memory nodes included in the G×H array of memory nodes.

6. The method of claim 1 further comprising:

executing the function on a destination execution unit that is selected from a plurality of execution units and that is available to execute the function.

7. The method of claim 1, wherein the destination instruction is a store instruction that identifies a second memory node that is selected, according to a select field in the store instruction, from an N×N array of memory nodes included in the G×H array of memory nodes, identifies a store address in the second memory node, and wherein the execution of the function transfers the first data operand through a store network for storage as a result of the store function at the store address in the second memory node from which the result is accessed for use in the program.

8. The method of claim 1, wherein the destination register is an operand input pipe register (OIPR) separate from registers in a register file.

9. The method of claim 1, wherein the destination register is located in a local register file associated with a destination execution unit that is selected from a plurality of execution units and that is available to execute the second load instruction.

10. A method of executing a chain of instructions as part of a program executed by an array processing unit, the method comprising:

receiving a chain of instructions that includes a source instruction and, in the chain of instructions, a store instruction having a dependency on the source instruction, wherein the source instruction identifies a function that generates a data result and a position of the store instruction in the chain of instructions, and wherein the store instruction identifies a first memory node and a store address in the first memory node;

executing the source instruction to generate the data result and deliver the data result to a destination register included in a destination node associated with the position of the store instruction; and executing the store instruction to deliver the data result from the destination register through the store network for storage at the store address in the first memory node from which the data result are accessed for use in the program, wherein according to a G×H matrix, a G×H array of destination nodes is connected by the store network to a G×H array of memory nodes, the store network comprising N-input by N-output multiplexing (N×N) elements organized into stages for corresponding dimensions of the G×H matrix, and in each stage having wiring configured according to a 1 to N adjacency of connections to the N×N elements which includes wrap around adjacent N×N elements and connections between memory nodes, N×N elements, and destination nodes in the same position in the G×H matrix, N an odd integer, N>1, G≥N and H≥N.

11. The method of claim 10, wherein an N×N element of the N×N elements includes N multiplexers each multiplexer individually operable to select from N inputs and generate an output, whereby N outputs are generated by the N×N element.

12. The method of claim 10, wherein the store instruction identifies the first memory node that is selected, according to a select field in the store instruction, from an N×N array of memory nodes included in the G×H array of memory nodes.

13. The method of claim 10 further comprising:

executing the function of the source instruction on an execution unit that is selected from a plurality of execution units and that is available to execute the function.

14. The method of claim 10, wherein the function of the source instruction is a specified arithmetic and logic unit type of function.

15. A method of executing a chain of instructions as part of a program executed by an array processing unit, the method comprising:

receiving a chain of instructions that includes a first instruction and, in the chain of instructions, a second instruction having a dependency on the first instruction;

executing a first instruction selected from the chain of instructions to deliver a first data operand from a first node through a first network through a first joining element to a first destination storage unit in a second node, wherein according to a G×H matrix, a first G×H array of first nodes, including the first node, is connected by the first network to a second G×H array of second nodes, including the second node, the first network comprising first N-input by N-output multiplexing (N×N) elements organized into stages for corresponding dimensions of the G×H matrix, and in each stage having wiring configured according to a 1 to N adjacency of connections to the first N×N elements which includes wrap around adjacent first N×N elements and connections between first nodes of the first G×H array, first N×N elements, and second nodes of the second G×H array in the same position in the G×H matrix, N an odd integer, N>1, G≥N and H≥N and wherein the first G×H array of first nodes is overlaid on the second G×H array of second nodes to create a first folded G×H array with the first nodes of the first G×H array and the second nodes of the second G×H array placed in corresponding positions according to the G×H matrix; and accessing the first data operand from the first destination storage unit for use in the program.

16. The method of claim 15, wherein the first destination storage unit is included in the second node that is determined according to the second instruction's dependency on the first instruction and an ability to execute the second instruction.

17. The method of claim 15, wherein a first N×N element of the first N×N elements includes N multiplexers each multiplexer individually operable to select from N inputs and generate an output, whereby N outputs are generated by the first N×N element.

18. The method of claim 15 further comprising:

executing a second instruction selected from the chain of instructions to deliver a second data operand from a third node through a second network through a second joining element to a second destination storage unit in a fourth node, wherein a third G×H array of third nodes is connected by the second network to a fourth G×H array of fourth nodes, the second network comprising second N×N elements organized into stages for corresponding dimensions of the G×H matrix, and in each stage having wiring configured according to a 1 to N adjacency of connections to the second N×N elements which includes wrap around adjacent second N×N elements and connections between third nodes of the third G×H array, second N×N elements, and fourth nodes of the fourth G×H array in the same position in the G×H matrix and wherein the third G×H array of third nodes is overlaid on the fourth G×H array of fourth nodes to create a second folded G×H array with the third nodes of the third G×H array and the fourth nodes of the fourth G×H array placed in corresponding positions according to the G×H matrix.

19. The method of claim 18, wherein joining elements, including the first joining element and the second joining element, are coupled to the first network and to the second network and wherein the joining elements comprising N×N elements organized into a third stage corresponding to planes of a row G by column H by plane V (G×H×V) matrix and placed in corresponding positions as organized in the first network and in the second network.

20. The method of claim 18, wherein the first folded G×H array is overlaid on the second folded G×H array in corresponding positions according to the G×H matrix to create a G×H array of dual core nodes, and wherein a first core node of the dual core nodes includes the first node configured as a first processing node and the second node configured as a first memory node and the second core node of the dual core nodes includes the third node configured as a second processing node and the fourth node configured as a second memory node.

21. The method of claim 18, wherein the first folded G×H array is overlaid on the second folded G×H array in corresponding positions according to the G×H matrix to create a G×H array of dual core nodes, and wherein a first core node of the dual core nodes includes the first node configured as a first memory node and the second node configured as a first processing node and the second core node of the dual core nodes includes the third node configured as a second memory node and the fourth node configured as a second processing node.

22. The method of claim 20, wherein the dual core nodes are completely connected.

* * * * *